(12) United States Patent
Stein et al.

(10) Patent No.: US 11,236,622 B2
(45) Date of Patent: Feb. 1, 2022

(54) TURBINE NOZZLE AIRFOIL AND/OR TRAILING EDGE PROFILE

(71) Applicant: General Electric Company, Schenectady, NY (US)

(72) Inventors: Alexander Stein, Simpsonville, SC (US); Jacob John Kittleson, Greenville, SC (US); Daniel Robert Burnos, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/812,506

(22) Filed: Mar. 9, 2020

(65) Prior Publication Data

US 2021/0277787 A1 Sep. 9, 2021

(51) Int. Cl.
*F01D 9/02* (2006.01)

(52) U.S. Cl.
CPC ............ *F01D 9/02* (2013.01); *F05D 2220/30* (2013.01); *F05D 2240/122* (2013.01); *F05D 2240/123* (2013.01); *F05D 2240/124* (2013.01); *F05D 2240/128* (2013.01); *F05D 2250/74* (2013.01)

(58) Field of Classification Search
CPC .................. F01D 9/02; F05D 2220/30; F05D 2240/122–124; F05D 2240/128; F05D 2250/74
See application file for complete search history.

(56) References Cited

U.S. PATENT DOCUMENTS

| | | |
|---|---|---|
| 6,503,054 B1 | 1/2003 | Bielek et al. |
| 6,736,599 B1 | 5/2004 | Jacks et al. |
| 7,527,473 B2 | 5/2009 | Humanchuk et al. |
| 7,837,445 B2 * | 11/2010 | Benjamin ............... F01D 9/041 416/223 A |
| 8,070,428 B2 | 12/2011 | Bielek et al. |
| 8,313,291 B2 | 11/2012 | Mariotti et al. |
| 8,807,950 B2 | 8/2014 | Bielek et al. |
| 8,814,511 B2 | 8/2014 | Check et al. |
| 8,876,485 B2 | 11/2014 | Gustafson et al. |
| 10,012,239 B2 | 7/2018 | Dutka et al. |
| 10,041,503 B2 | 8/2018 | McKeever et al. |
| 10,060,443 B2 | 8/2018 | Dutka et al. |
| 10,066,641 B2 | 9/2018 | Modachur Krishnan et al. |
| 10,087,952 B2 | 10/2018 | Dutka et al. |
| 10,125,623 B2 | 11/2018 | Bielek et al. |
| 10,132,330 B2 | 11/2018 | Modachur Krishnan et al. |

(Continued)

*Primary Examiner* — Courtney D Heinle
*Assistant Examiner* — Danielle M. Christensen
(74) *Attorney, Agent, or Firm* — Charlotte Wilson; Hoffman Warnick LLC

(57) ABSTRACT

A turbine nozzle for a gas turbine includes: an airfoil having an airfoil shape having a nominal profile substantially in accordance with at least a portion of Cartesian coordinate values of X, Y and Z set forth in TABLE I. The Cartesian coordinate values are non-dimensional values of from 0% to 100% convertible to distances by multiplying the values by a height of the airfoil expressed in units of distance. The X and Y values are connected by smooth continuing arcs that define airfoil profile sections at each distance Z along at least a portion of the airfoil, and the airfoil profile sections at the Z distances are joined smoothly with one another to form the nominal profile. A trailing edge profile for a turbine nozzle is also disclosed.

15 Claims, 6 Drawing Sheets

(56) References Cited

U.S. PATENT DOCUMENTS

| | | | |
|---|---|---|---|
| 10,156,149 B2 | 12/2018 | Ristau et al. | |
| 10,161,255 B2 | 12/2018 | Brozyna et al. | |
| 10,233,759 B2 | 3/2019 | Blohm et al. | |
| 10,287,886 B2 | 5/2019 | Delvernois et al. | |
| 10,288,086 B2 | 5/2019 | Subramaniyan et al. | |
| 10,393,144 B2 | 8/2019 | Deivernois et al. | |
| 10,415,406 B2 | 9/2019 | Ristau et al. | |
| 10,415,463 B2 | 9/2019 | Blohm et al. | |
| 10,415,464 B2 | 9/2019 | Stampfli et al. | |
| 10,415,585 B2 | 9/2019 | Stampfli et al. | |
| 10,415,593 B2 | 9/2019 | Deivernois et al. | |
| 10,415,594 B2 | 9/2019 | Deivernois et al. | |
| 10,415,595 B2 | 9/2019 | Valliappan et al. | |
| 10,422,342 B2 | 9/2019 | Healy et al. | |
| 10,422,343 B2 | 9/2019 | Blohm et al. | |
| 10,436,214 B2 | 10/2019 | Valliappan et al. | |
| 10,436,215 B2 | 10/2019 | Blohm et al. | |
| 10,443,492 B2 | 10/2019 | Soranna et al. | |
| 10,443,610 B2 | 10/2019 | McKeever et al. | |
| 10,443,611 B2 | 10/2019 | Stampfli et al. | |
| 10,443,618 B2 | 10/2019 | Blohm et al. | |
| 10,465,709 B2 | 11/2019 | Subramaniyan et al. | |
| 10,465,710 B2 | 11/2019 | Subramaniyan et al. | |
| 10,519,972 B2 | 12/2019 | Deivernois et al. | |
| 10,519,973 B2 | 12/2019 | Rajagopal et al. | |
| 2009/0068005 A1* | 3/2009 | Benjamin | F01D 25/285 |
| | | | 415/208.1 |
| 2018/0328196 A1* | 11/2018 | Brozyna | F01D 9/041 |

* cited by examiner

TURBINE NOZZLE AIRFOIL AND/OR TRAILING EDGE PROFILE

TECHNICAL FIELD

The subject matter disclosed herein relates to turbomachines. More particularly, the subject matter disclosed herein relates to a turbine nozzle airfoil profile for a turbine nozzle, and a trailing edge profile for a turbine nozzle.

BACKGROUND

Some jet aircraft and simple cycle or combined cycle power plant systems employ turbines, or so-called turbomachines, in their design and operation. Some of these turbines employ airfoils (e.g., turbine nozzles, blades, airfoils, etc.), which during operation are exposed to fluid flows. These airfoils are configured to aerodynamically interact with the fluid flows and to generate energy from these fluid flows as part of power generation. For example, the airfoils may be used to create thrust, to convert kinetic energy to mechanical energy, and/or to convert thermal energy to mechanical energy. As a result of this interaction and conversion, the aerodynamic characteristics of these airfoils may result in losses that have an impact on system and turbine operation, performance, thrust, efficiency, and power.

BRIEF DESCRIPTION OF THE DISCLOSURE

Various embodiments of the disclosure include turbine nozzles and systems employing such nozzles. Various particular embodiments include a turbine nozzle having: an airfoil having: a suction side; a pressure side opposing the suction side; a leading edge spanning between the pressure side and the suction side; and a trailing edge opposing the leading edge and spanning between the pressure side and the suction side; and at least one endwall connected with the airfoil along the suction side, the pressure side, the trailing edge and the leading edge.

A first aspect of the disclosure includes a turbine nozzle comprising: an airfoil having: a suction side, a pressure side opposing the suction side, a leading edge spanning between the pressure side and the suction side, and a trailing edge opposing the leading edge and spanning between the pressure side and the suction side; and at least one endwall connected with the airfoil along the suction side, the pressure side, the trailing edge and the leading edge, wherein at least one of a suction side or a pressure side of the airfoil has a shape having a nominal profile substantially in accordance with at least a portion of Cartesian coordinate values of X, Y and Z set forth in TABLE I, wherein the Cartesian coordinate values are non-dimensional values of from 0% to 100% convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the nominal profile.

A second aspect of the disclosure includes a static nozzle section for a turbine, the static nozzle section comprising: a set of static nozzles, the set of static nozzles including at least one nozzle having: an airfoil having: a suction side, a pressure side opposing the suction side, a leading edge spanning between the pressure side and the suction side, and a trailing edge opposing the leading edge and spanning between the pressure side and the suction side; and at least one endwall connected with the airfoil along the suction side, the pressure side, the trailing edge and the leading edge, wherein at least one of a suction side or a pressure side of the airfoil has a shape having a nominal profile substantially in accordance with at least a portion of Cartesian coordinate values of X, Y and Z set forth in Table I, wherein the Cartesian coordinate values are non-dimensional values of from 0% to 100% convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the nominal profile.

A third aspect of the disclosure includes a turbine comprising a plurality of turbine nozzles, each of the turbine nozzles comprising: an airfoil having: a suction side, a pressure side opposing the suction side, a leading edge spanning between the pressure side and the suction side, and a trailing edge opposing the leading edge and spanning between the pressure side and the suction side; and at least one endwall connected with the airfoil along the suction side, the pressure side, the trailing edge and the leading edge, wherein at least one of a suction side or a pressure side of the airfoil has a shape having a nominal profile substantially in accordance with at least a portion of Cartesian coordinate values of X, Y and Z set forth in Table I, wherein the Cartesian coordinate values are non-dimensional values of from 0% to 100% convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the nominal profile.

A fourth aspect includes a turbine nozzle comprising: an airfoil having: a suction side, a pressure side opposing the suction side, a leading edge spanning between the pressure side and the suction side, and a trailing edge opposing the leading edge and spanning between the pressure side and the suction side; and at least one endwall connected with the airfoil along the suction side, the pressure side, the trailing edge and the leading edge, wherein at least one of a suction side or a pressure side of the airfoil has a trailing edge shape having a nominal profile substantially in accordance with at least a portion of Cartesian coordinate values of X, Y and Z set forth in Table II, wherein the Cartesian coordinate values are non-dimensional values of from 0% to 100% convertible to distances by multiplying the values by a height of the airfoil expressed in units of distance, and wherein X and Y values connected by smooth continuing arcs define trailing edge profile sections at each distance Z along at least a portion of the airfoil, the trailing edge profile sections at the Z distances being joined smoothly with one another to form the nominal profile of the trailing edge shape.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
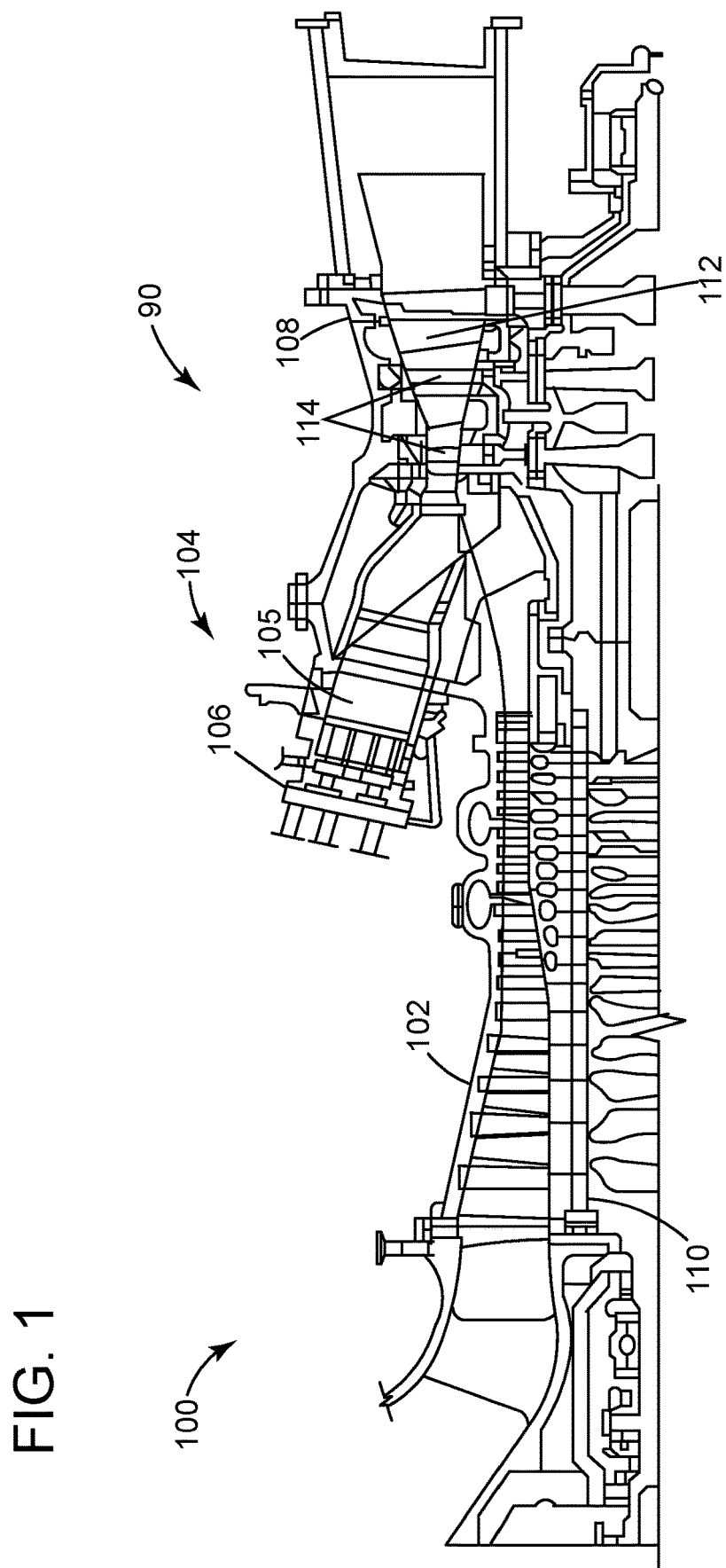
FIG. 1 is a schematic illustration of an illustrative turbomachine.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As noted herein, various aspects of the disclosure are directed toward turbine nozzles. Various embodiments include a turbine nozzle having: an airfoil having an airfoil shape having a nominal profile substantially in accordance with at least a portion of Cartesian coordinate values of X, Y and Z set forth in TABLE I. The Cartesian coordinate values are non-dimensional values of from 0% to 100% convertible to distances by multiplying the values by a height of the airfoil expressed in units of distance. The X and Y values are connected by smooth continuing arcs that define airfoil profile sections at each distance Z along at least a portion of the airfoil, and the profile sections at the Z distances are joined smoothly with one another to form the nominal profile.

Referring to the drawings, FIG. 1 is a schematic view of an illustrative turbomachine 90 in the form of a combustion turbine or gas turbine (GT) system 100 (hereinafter "GT system 100"). GT system 100 includes a compressor 102 and a combustor 104. Combustor 104 includes a combustion region 105 and a fuel nozzle assembly 106. GT system 100 also includes a turbine 108 and a common compressor/turbine shaft 110 (hereinafter referred to as "rotor 110"). In one embodiment, GT system 100 is a 7HA.03 engine, commercially available from General Electric Company, Greenville, S.C. The present disclosure is not limited to any one particular GT system and may be implanted in connection with other engines including, for example, the other HA, F, B, LM, GT, TM and E-class engine models of General Electric Company, and engine models of other companies. Further, the teachings of the disclosure are not necessarily applicable to only a GT system and may be applied to other types of turbomachines, e.g., steam turbines, jet engines, compressors, etc.

Figure 2:
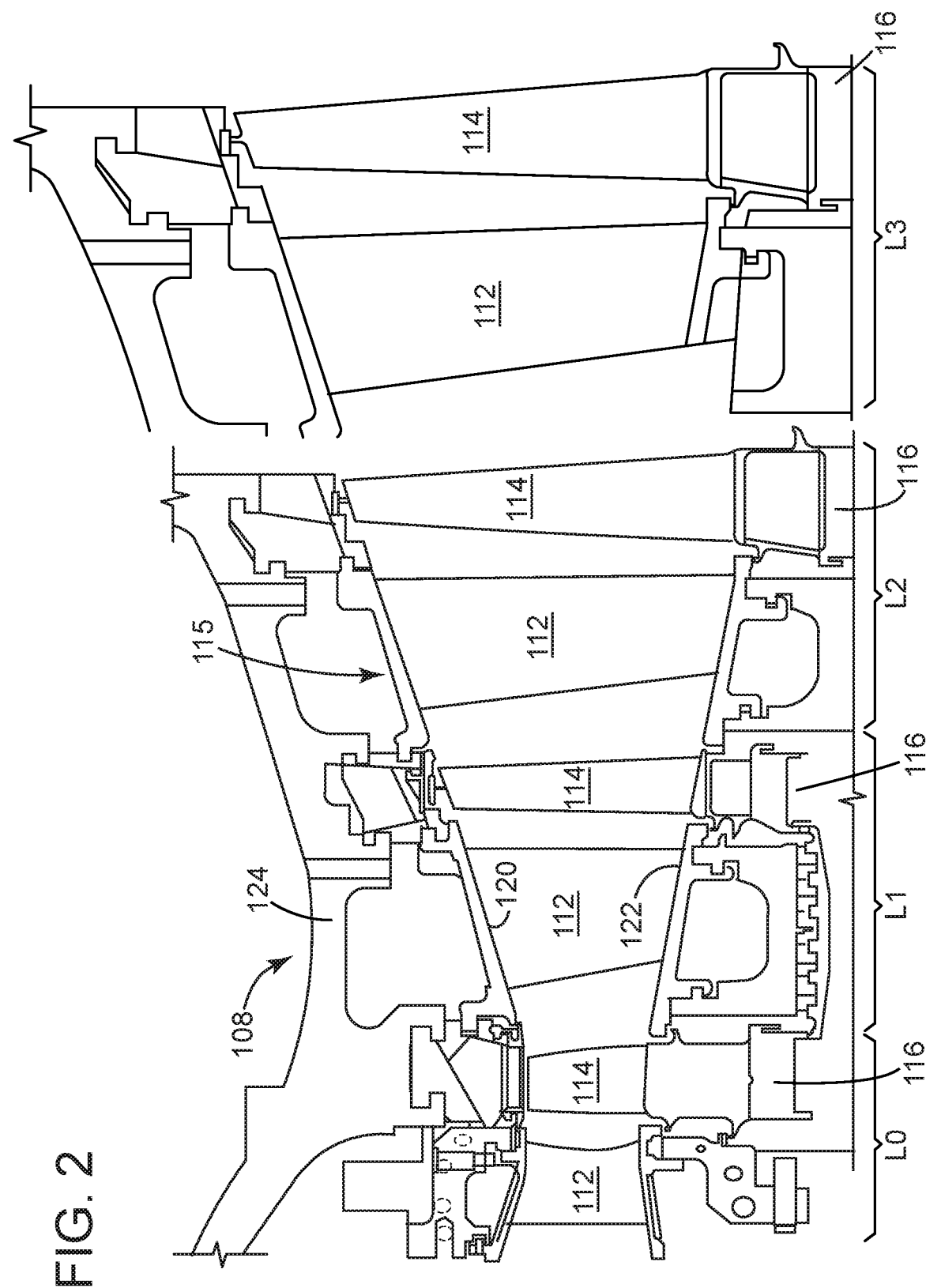
FIG. 2 is a cross-section illustration of a four-stage turbine that may be used with the illustrative turbomachine in FIG. 1.

FIG. 2 shows a cross-section view of an illustrative portion of turbine 108 with four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is the next stage in an axial direction. Stage L2 is the third stage and is the next stage in an axial direction. Stage L3 is the fourth, last stage and is the largest (in a radial direction). It is to be understood that four stages are shown as one example only, and each turbine may have more or less than four stages.

A set of stationary vanes or nozzles 112 cooperate with a set of rotating blades 114 to form each stage L0-L3 of turbine 108 and to define a portion of a flow path through turbine 108. Rotating blades 114 in each set are coupled to a respective rotor wheel 116 that couples them circumferentially to rotor 110. That is, a plurality of rotating blades 114 are mechanically coupled in a circumferentially spaced manner to each rotor wheel 116. A static nozzle section 115 includes a plurality of stationary nozzles 112 circumferentially spaced around rotor 110. Each nozzle 112 may include at least one endwall (or platform) 120, 122 connected with airfoil 130. In the example shown, nozzle 112 includes a radially outer endwall 120 and a radially inner endwall 122. Radially outer endwall 120 couples nozzle(s) 112 to a casing 124 of turbine 108.

In operation, air flows through compressor 102, and compressed air is supplied to combustor 104. Specifically, the compressed air is supplied to fuel nozzle assembly 106 that is integral to combustor 104. Fuel nozzle assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 within which gas stream thermal energy is converted to mechanical rotational energy. Turbine 108 is rotatably coupled to and drives rotor 110. Compressor 102 also is rotatably coupled to rotor 110. In the illustrative embodiment, there is a plurality of combustors 104 and fuel nozzle assemblies 106. In the following discussion, unless otherwise indicated, only one of each component will be discussed. At least one end of rotor 110 may extend axially away from turbine 108 and may be attached to a load or machinery (not shown) such as, but not limited to, a generator, a load compressor, and/or another turbine.

Figure 3:
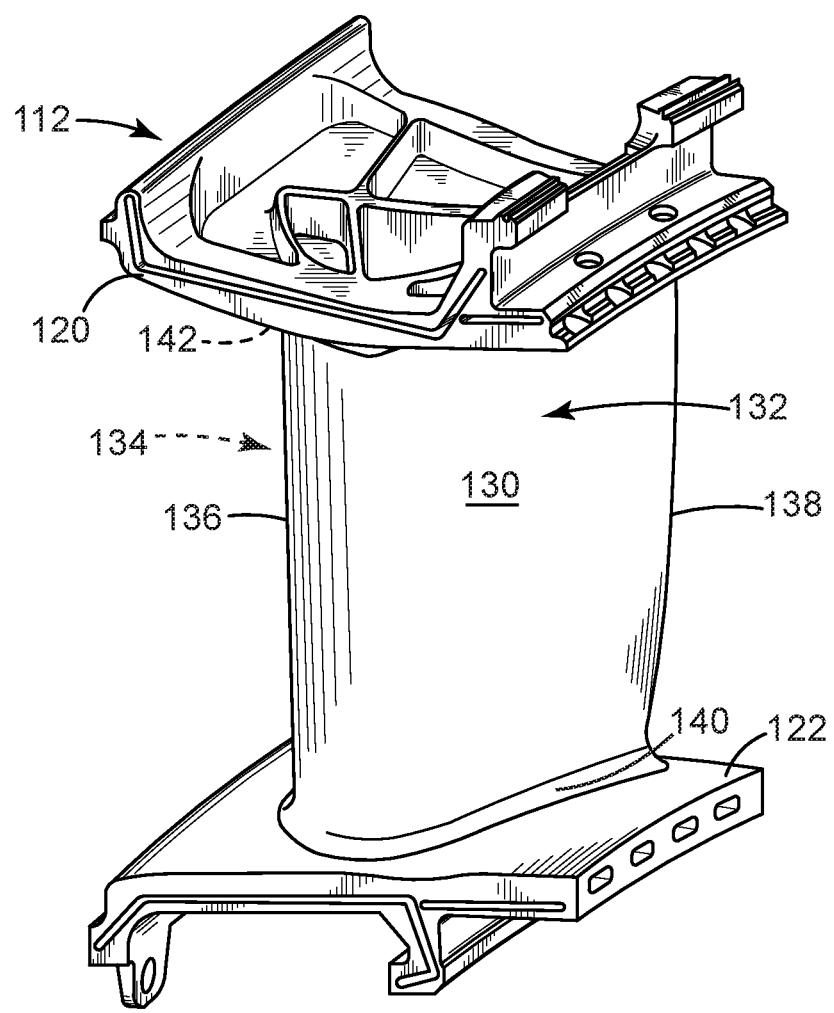
FIG. 3 shows a schematic three-dimensional view of an illustrative turbine nozzle including an airfoil and endwalls, according to various embodiments of the disclosure.

Turning to FIG. 3, a schematic three-dimensional view of a turbine nozzle (or simply, nozzle) 112 is shown, according to various embodiments to better illustrate the parts of a nozzle. Nozzle 112 is a stationary nozzle, which forms part of static nozzle section 115 (FIG. 2) and which forms part of an annulus of stationary nozzles in a stage of a turbine (e.g., turbine 108), as previously described. That is, during operation of a turbine (e.g., turbine 108), nozzle 112 will remain stationary in order to direct the flow of working fluid (e.g., gas or steam) to one or more movable blades (e.g., blades 114), causing those movable blades to initiate rotation of a rotor 110. It is understood that nozzle 112 may be configured to couple (mechanically couple via fasteners, welds, slot/grooves, etc.) with a plurality of similar or distinct nozzles (e.g., nozzles 112 or other nozzles) to form an annulus of nozzles in a stage L0-L3 of turbine 108.

Turbine nozzle 112 can include an airfoil 130 having a convex suction side 132, and a concave pressure side 134 (obstructed in FIG. 3) opposing suction side 132. Nozzle 112 can also include a leading edge 136 spanning between pressure side 134 and suction side 132, and a trailing edge 138 opposing leading edge 136 and spanning between pressure side 134 and suction side 132. As shown, and as previously noted, nozzle 112 can also include at least one endwall 120, 122 (two shown) connected with airfoil 130 along suction side 132, pressure side 134, trailing edge 138 and leading edge 136. In the example shown, nozzle 112 includes a radially outer endwall 120 and a radially inner endwall 122. Radially outer endwalls 120 are configured to align on the radially outer side of the static nozzle section and to couple respective nozzle(s) 112 to casing 124 (FIG. 2) of turbine 108 (FIG. 2). Radially inner endwalls 122 are configured to align on the radially inner side of static nozzle section 115 (FIG. 2).

In various embodiments, nozzle 112 includes a fillet 140, 142 connecting airfoil 130 and each respective endwall 120, 122. Fillet 140 can include a weld or braze fillet, which may be formed via conventional metal-inert gas (MIG) welding, tungsten-inert gas (TIG) welding, brazing, etc. Fillets 140, 142 can overlap a portion of airfoil 130. The extent of overlap can vary from nozzle to nozzle, stage to stage, and/or turbine to turbine.

With reference again to FIG. 2, in various embodiments, nozzle 112 can include a first stage (L0) nozzle, second stage (L1) nozzle, third stage (L2) nozzle, or fourth stage (L3) nozzle. In particular embodiments, nozzle 112 is a first stage (L0) nozzle, and the improved flow profile across the interface between airfoil 130 and endwall 120, 122 allows first stage (L0) nozzle to withstand high-temperature gas at the first stage. In various embodiments, turbine 108 can include a set of nozzles 112 in only first stage (L0) of turbine 108, or in only second stage (L1), or in only third stage (L2) of turbine 108.

Figure 4:
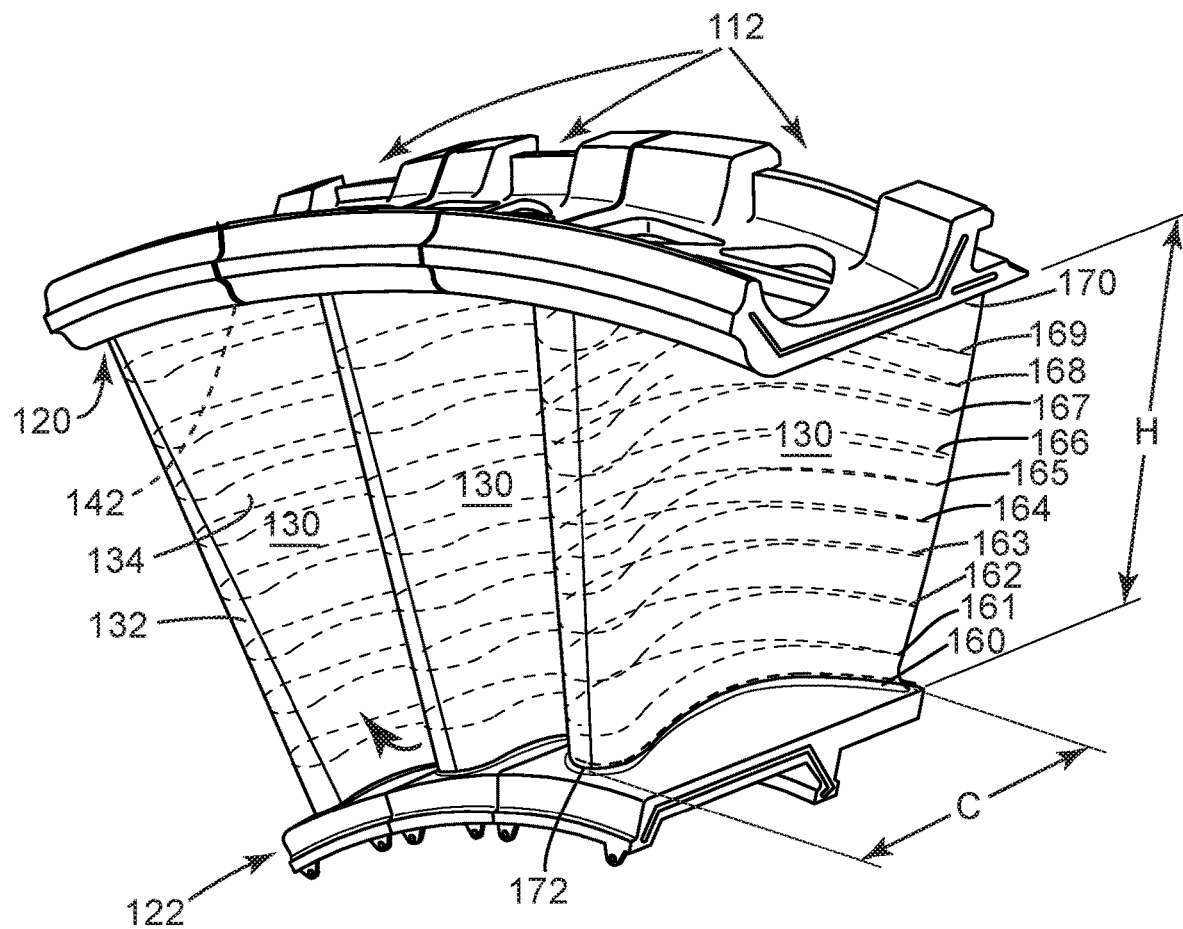
FIG. 4 shows a schematic three-dimensional view of a plurality of turbine nozzles, according to various embodiments of the disclosure.

With reference to FIG. 4 and with continuing reference to FIG. 3, suction side 132 and/or pressure side 134 of airfoil 130 shape has a nominal profile that can be expressed substantially in accordance with at least a portion of Cartesian coordinates, i.e., X, Y, Z coordinates, set forth in TABLE I. A "profile" is the range of the variation between measured points on an airfoil surface and the ideal position listed in TABLE I. The actual profile on a manufactured turbine nozzle will be different than those in Table I and the design is robust to this variation, meaning that mechanical and aerodynamic function are not impaired.

To allow for typical manufacturing tolerances and/or coating thicknesses, ±values can be added to the values listed in TABLE I, particularly to the X and Y values therein. For example, a tolerance of about 10-20 percent of a thickness of trailing edge 138 in a direction normal to any surface location along the airfoil profile can define an airfoil profile envelope for a nozzle airfoil design at cold or room temperature. In other words, a distance of about 10-20 percent of a thickness of the trailing edge in a direction normal to any surface location along the airfoil profile can define a range of variation between measured points on an actual airfoil surface and ideal positions of those points, particularly at a cold or room temperature, as embodied by the disclosure. The nozzle airfoil layout, as embodied by the disclosure, is robust to this range of variation without impairment of mechanical and aerodynamic functions.

The Cartesian coordinate system of X, Y and Z values given in TABLE I below defines the profile of the turbine nozzle airfoil (i.e., airfoil 130) at various locations along its height. To illustrate, FIG. 4 shows a plurality of cross sections 160-170 along span or height H that correspond to Z coordinate values of chord lines. Each cross section 160-170 of airfoil 130 can be described by a respective set of X and Y coordinates (from TABLE I). For example, 100 or more points can be listed for each of the pressure side and the suction side that collectively define each cross section 160-170, though it should be apparent that more or fewer points can be used for the respective sides of each cross section, and more or fewer cross sections can be used, as may be desired and/or appropriate.

The coordinate values are stated as non-dimensional values of from 0% to 100% (percentages in TABLE I) convertible to distances by multiplying the values by a height H of airfoil 130 expressed in units of distance. While the X, Y, and Z coordinate values in TABLE I have been expressed in normalized or non-dimensionalized form, it should be apparent that any or all of the coordinate values could instead be expressed in distance units so long as the proportions are maintained. Specifically, the profile and/or layout can be scaled uniformly up or down, such as geometrically, without impairment of operation, and such scaling can be facilitated by use of normalized coordinate values, i.e., multiplying the normalized values by a common scaling factor, which may be a larger or smaller number of distance units than might have originally been used. For example, the values in TABLE I, particularly the X and Y values, could be multiplied by a scaling factor of 0.5, 2, or any other desired scaling factor, to uniformly geometrically scale. Alternatively, the values could be multiplied by a larger or smaller desired height H.

As discussed above, to convert an X, Y or Z value of TABLE I to a respective X, Y or Z coordinate value in units of distance, such as inches or meters, the non-dimensional X, Y or Z value given in TABLE I can be multiplied by a height H of airfoil 130 in such units of distance. Hence, the profile can be applied to airfoils of different heights H. By connecting the X and Y values with smooth continuing arcs, each profile cross section at each height Z (i.e., cross sections 160-170) can be fixed. The airfoil profiles of the various surface locations between the heights Z (in TABLE I) can be determined by smoothly connecting adjacent profile sections to one another, thus forming the nominal airfoil profile. Further, it is noted that where an airfoil profile section uses Z coordinate values not expressly stated in TABLE I, appropriate coordinate values can be mathematically extrapolated from TABLE I.

Figure 5:
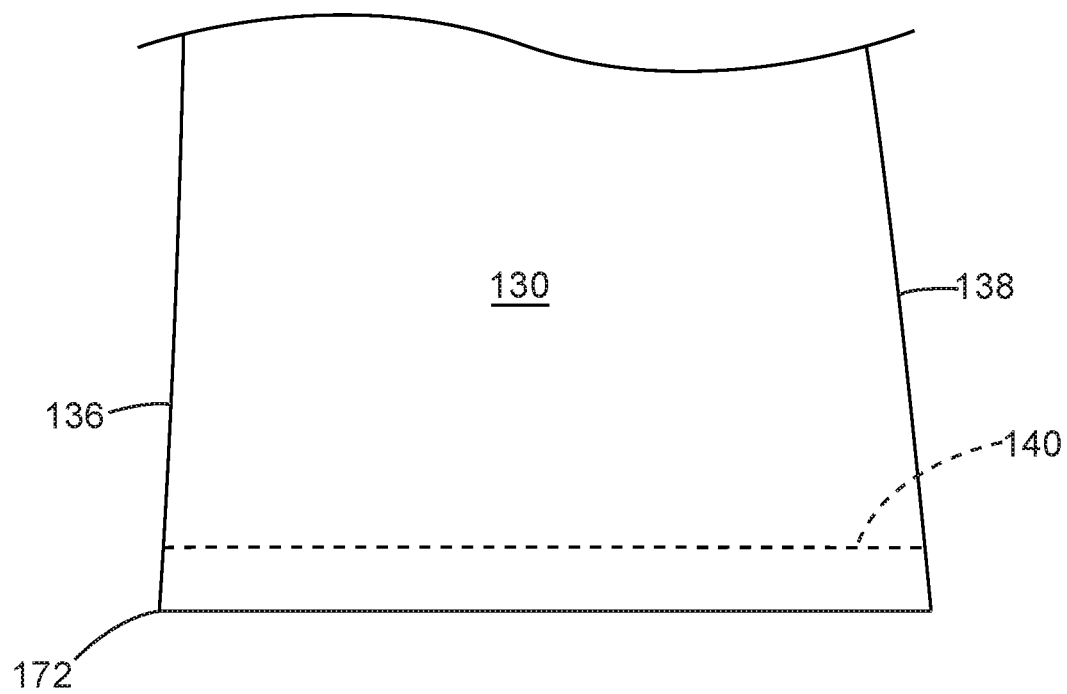
FIG. 5 shows a schematic view of an origin of an airfoil of a turbine nozzle, according to various embodiments of the disclosure.

The values in TABLE I are generated and shown to three decimal places for determining the nominal profile of at least one of a suction side or a pressure side of airfoil 130 at ambient, non-operating, or non-hot conditions and do not take any coatings or fillets 140, 142 (FIG. 3) into account, though embodiments could account for other conditions, coatings, and/or fillets. The Cartesian coordinate values have an origin at an innermost point 172 (FIGS. 4 and 5) of leading edge 136 of airfoil 130 at the junction of airfoil 130 with a top surface of endwall 122. As shown in FIG. 5, it is understood that innermost point 172 may be covered by fillet 140 and that innermost point 172 is one of the points of cross section 160. Further, as shown in FIG. 4, cross sections 160 or 170 may be covered by fillet 140, 142, respectively.

While FIG. 4 shows nozzles 112 that employs all of the data from the Cartesian coordinate values of X, Y, and Z set forth in TABLE I (i.e., all data from 0% to 100%), it is possible that an airfoil profile for a nozzle uses only a selected portion or subset of Cartesian coordinate values of X, Y, and X set forth in TABLE I. For instance, while the Cartesian values in TABLE I provide Z coordinate values at 10% increments between 0% and 100%, only a portion of Cartesian coordinate values set forth in TABLE I may be employed. In one example, the airfoil profile sections may use a portion of Z coordinate values defined within 10% and 90% of the height of the airfoil, i.e., from cross sections 161 to 169. In another example, the airfoil profile sections may use a portion of the Cartesian coordinate values defined within 5% and 95% of the height of the airfoil, i.e., from a plane midway between cross sections 160 and 161 to a plane midway between cross sections 169 and 170. Any portion of Cartesian coordinate values of X, Y and Z set forth in TABLE I may be employed, e.g., from 20% to 30%, 37%-50%, etc.

Figure 6:
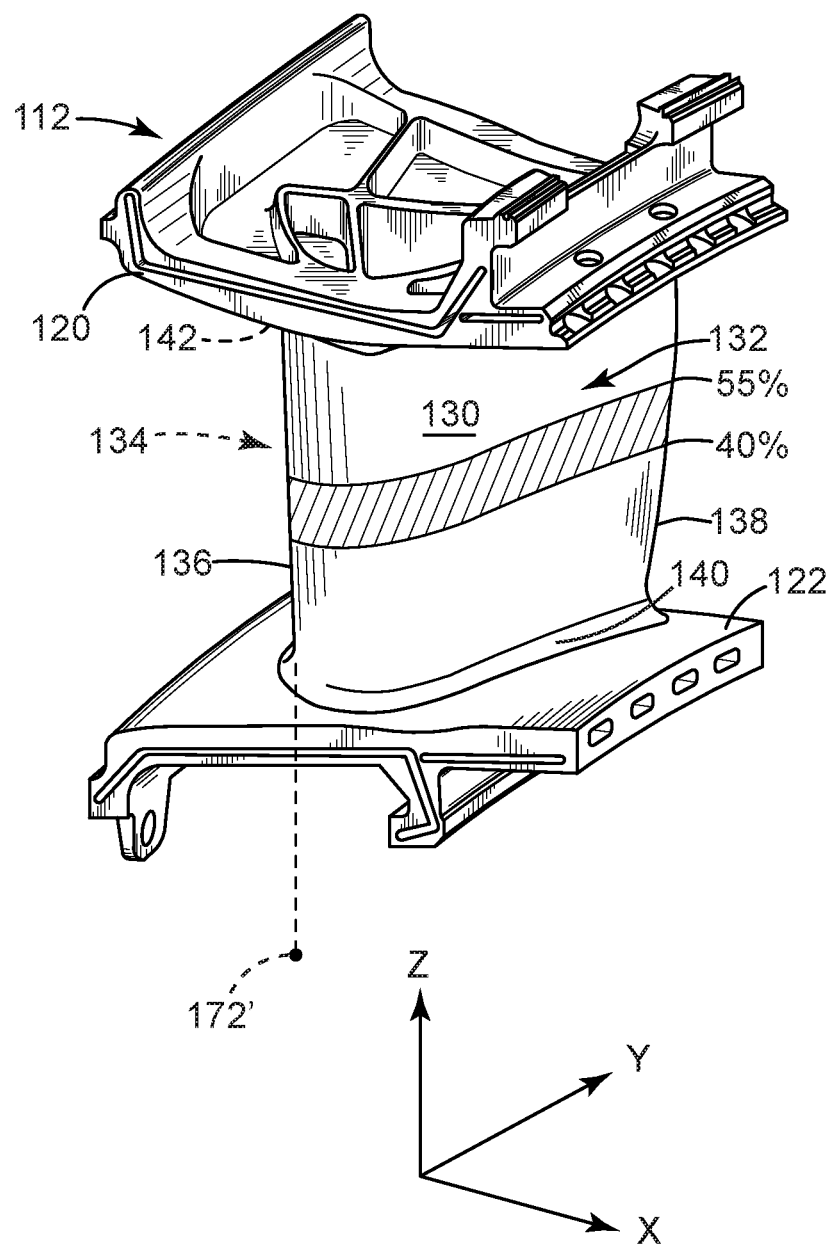
FIG. 6 shows a schematic three-dimensional view of an illustrative turbine nozzle including an airfoil and endwalls, according to various embodiments of the disclosure.

FIG. 6 shows a perspective view of a nozzle 112 that employs only a selected portion of the Cartesian coordinate values of X, Y and Z set forth in TABLE I to define a section of the span of the airfoil of nozzle 112. For example, a nozzle 112 may be made using coordinate values that represent a selected section of airfoil 130, such as from 40% of the height to 55% of the height, as shown by shading in FIG. 6. As shown in FIG. 6, a nozzle 112 that has, for example, a selected section of airfoil 130 may have an origin 172' that dictates the relative position of the selected portion, e.g., 40%-55%, of the Cartesian coordinate values of X, Y and Z set forth in TABLE I. Coordinates other than those provided in TABLE I may be used to define the rest of the span of the airfoil of nozzle 112 (i.e., from 0% to 40% and from 55% to 100%), including the origin 172' at a terminal end of the airfoil at its leading edge.

TABLE I

| | | Non-dimensionalized (%) | | |
|---|---|---|---|---|
| N | Location | X | Y | Z |
| 1 | Suction-Side | 0 | 0 | 0 |
| 2 | Suction-Side | 0.233 | −1.530 | 0 |
| 3 | Suction-Side | 0.809 | −2.966 | 0 |
| 4 | Suction-Side | 1.650 | −4.264 | 0 |
| 5 | Suction-Side | 2.680 | −5.411 | 0 |
| 6 | Suction-Side | 3.850 | −6.423 | 0 |
| 7 | Suction-Side | 5.112 | −7.302 | 0 |
| 8 | Suction-Side | 6.444 | −8.066 | 0 |
| 9 | Suction-Side | 7.837 | −8.730 | 0 |
| 10 | Suction-Side | 9.267 | −9.299 | 0 |
| 11 | Suction-Side | 10.722 | −9.778 | 0 |
| 12 | Suction-Side | 12.196 | −10.177 | 0 |
| 13 | Suction-Side | 13.692 | −10.500 | 0 |
| 14 | Suction-Side | 15.204 | −10.753 | 0 |
| 15 | Suction-Side | 16.734 | −10.938 | 0 |
| 16 | Suction-Side | 18.266 | −11.052 | 0 |
| 17 | Suction-Side | 19.793 | −11.094 | 0 |
| 18 | Suction-Side | 21.317 | −11.058 | 0 |
| 19 | Suction-Side | 22.836 | −10.937 | 0 |
| 20 | Suction-Side | 24.350 | −10.723 | 0 |
| 21 | Suction-Side | 25.860 | −10.410 | 0 |
| 22 | Suction-Side | 27.347 | −9.996 | 0 |
| 23 | Suction-Side | 28.792 | −9.486 | 0 |
| 24 | Suction-Side | 30.194 | −8.879 | 0 |
| 25 | Suction-Side | 31.555 | −8.178 | 0 |
| 26 | Suction-Side | 32.875 | −7.385 | 0 |
| 27 | Suction-Side | 34.147 | −6.511 | 0 |
| 28 | Suction-Side | 35.358 | −5.568 | 0 |
| 29 | Suction-Side | 36.513 | −4.568 | 0 |
| 30 | Suction-Side | 37.617 | −3.514 | 0 |
| 31 | Suction-Side | 38.675 | −2.411 | 0 |
| 32 | Suction-Side | 39.692 | −1.263 | 0 |
| 33 | Suction-Side | 40.668 | −0.074 | 0 |
| 34 | Suction-Side | 41.603 | 1.145 | 0 |
| 35 | Suction-Side | 42.499 | 2.387 | 0 |
| 36 | Suction-Side | 43.358 | 3.647 | 0 |
| 37 | Suction-Side | 44.184 | 4.926 | 0 |
| 38 | Suction-Side | 44.980 | 6.220 | 0 |
| 39 | Suction-Side | 45.750 | 7.527 | 0 |
| 40 | Suction-Side | 46.493 | 8.849 | 0 |

TABLE I-continued

| | | Non-dimensionalized (%) | | |
|---|---|---|---|---|
| N | Location | X | Y | Z |
| 41 | Suction-Side | 47.216 | 10.181 | 0 |
| 42 | Suction-Side | 47.918 | 11.526 | 0 |
| 43 | Suction-Side | 48.600 | 12.880 | 0 |
| 44 | Suction-Side | 49.266 | 14.242 | 0 |
| 45 | Suction-Side | 49.915 | 15.615 | 0 |
| 46 | Suction-Side | 50.550 | 16.995 | 0 |
| 47 | Suction-Side | 51.168 | 18.382 | 0 |
| 48 | Suction-Side | 51.774 | 19.777 | 0 |
| 49 | Suction-Side | 52.367 | 21.179 | 0 |
| 50 | Suction-Side | 52.949 | 22.586 | 0 |
| 51 | Suction-Side | 53.520 | 24.000 | 0 |
| 52 | Suction-Side | 54.080 | 25.418 | 0 |
| 53 | Suction-Side | 54.629 | 26.841 | 0 |
| 54 | Suction-Side | 55.166 | 28.267 | 0 |
| 55 | Suction-Side | 55.694 | 29.696 | 0 |
| 56 | Suction-Side | 56.213 | 31.126 | 0 |
| 57 | Suction-Side | 56.722 | 32.561 | 0 |
| 58 | Suction-Side | 57.224 | 33.997 | 0 |
| 59 | Suction-Side | 57.716 | 35.436 | 0 |
| 60 | Suction-Side | 58.200 | 36.877 | 0 |
| 61 | Suction-Side | 58.676 | 38.321 | 0 |
| 62 | Suction-Side | 59.147 | 39.766 | 0 |
| 63 | Suction-Side | 59.608 | 41.214 | 0 |
| 64 | Suction-Side | 60.064 | 42.664 | 0 |
| 65 | Suction-Side | 60.512 | 44.116 | 0 |
| 66 | Suction-Side | 60.954 | 45.570 | 0 |
| 67 | Suction-Side | 61.388 | 47.026 | 0 |
| 68 | Suction-Side | 61.819 | 48.483 | 0 |
| 69 | Suction-Side | 62.242 | 49.941 | 0 |
| 70 | Suction-Side | 62.660 | 51.403 | 0 |
| 71 | Suction-Side | 63.073 | 52.866 | 0 |
| 72 | Suction-Side | 63.479 | 54.329 | 0 |
| 73 | Suction-Side | 63.880 | 55.795 | 0 |
| 74 | Suction-Side | 64.276 | 57.262 | 0 |
| 75 | Suction-Side | 64.666 | 58.731 | 0 |
| 76 | Suction-Side | 65.052 | 60.201 | 0 |
| 77 | Suction-Side | 65.433 | 61.673 | 0 |
| 78 | Suction-Side | 65.809 | 63.147 | 0 |
| 79 | Suction-Side | 66.180 | 64.620 | 0 |
| 80 | Suction-Side | 66.546 | 66.096 | 0 |
| 81 | Suction-Side | 66.907 | 67.574 | 0 |
| 82 | Suction-Side | 67.264 | 69.052 | 0 |
| 83 | Suction-Side | 67.617 | 70.533 | 0 |
| 84 | Suction-Side | 67.964 | 72.014 | 0 |
| 85 | Suction-Side | 68.309 | 73.496 | 0 |
| 86 | Suction-Side | 68.647 | 74.980 | 0 |
| 87 | Suction-Side | 68.982 | 76.465 | 0 |
| 88 | Suction-Side | 69.313 | 77.952 | 0 |
| 89 | Suction-Side | 69.640 | 79.438 | 0 |
| 90 | Suction-Side | 69.962 | 80.926 | 0 |
| 91 | Suction-Side | 70.281 | 82.415 | 0 |
| 92 | Suction-Side | 70.594 | 83.904 | 0 |
| 93 | Suction-Side | 70.904 | 85.395 | 0 |
| 94 | Suction-Side | 71.209 | 86.887 | 0 |
| 95 | Suction-Side | 71.511 | 88.379 | 0 |
| 96 | Suction-Side | 71.809 | 89.872 | 0 |
| 97 | Suction-Side | 72.103 | 91.366 | 0 |
| 98 | Suction-Side | 72.392 | 92.860 | 0 |
| 99 | Suction-Side | 72.677 | 94.356 | 0 |
| 100 | Suction-Side | 72.959 | 95.851 | 0 |
| 101 | Suction-Side | 73.054 | 96.362 | 0 |
| 102 | Suction-Side | 73.149 | 96.871 | 0 |
| 103 | Suction-Side | 73.242 | 97.380 | 0 |
| 104 | Suction-Side | 73.336 | 97.889 | 0 |
| 105 | Suction-Side | 73.425 | 98.399 | 0 |
| 106 | Suction-Side | 73.465 | 98.917 | 0 |
| 107 | Suction-Side | 73.423 | 99.429 | 0 |
| 108 | Suction-Side | 73.276 | 99.926 | 0 |
| 109 | Suction-Side | 72.938 | 100.315 | 0 |
| 110 | Pressure-Side | 0 | 0 | 0 |
| 111 | Pressure-Side | 0.085 | 1.229 | 0 |
| 112 | Pressure-Side | 0.404 | 2.423 | 0 |
| 113 | Pressure-Side | 0.923 | 3.548 | 0 |
| 114 | Pressure-Side | 1.601 | 4.583 | 0 |
| 115 | Pressure-Side | 2.404 | 5.525 | 0 |
| 116 | Pressure-Side | 3.300 | 6.380 | 0 |
| 117 | Pressure-Side | 4.269 | 7.152 | 0 |
| 118 | Pressure-Side | 5.297 | 7.843 | 0 |
| 119 | Pressure-Side | 6.368 | 8.466 | 0 |
| 120 | Pressure-Side | 7.453 | 9.063 | 0 |
| 121 | Pressure-Side | 8.529 | 9.677 | 0 |
| 122 | Pressure-Side | 9.592 | 10.311 | 0 |
| 123 | Pressure-Side | 10.647 | 10.959 | 0 |
| 124 | Pressure-Side | 11.692 | 11.622 | 0 |
| 125 | Pressure-Side | 12.728 | 12.303 | 0 |
| 126 | Pressure-Side | 13.751 | 12.998 | 0 |
| 127 | Pressure-Side | 14.766 | 13.707 | 0 |
| 128 | Pressure-Side | 15.771 | 14.431 | 0 |
| 129 | Pressure-Side | 16.765 | 15.170 | 0 |
| 130 | Pressure-Side | 17.750 | 15.921 | 0 |
| 131 | Pressure-Side | 18.723 | 16.686 | 0 |
| 132 | Pressure-Side | 19.688 | 17.462 | 0 |
| 133 | Pressure-Side | 20.642 | 18.253 | 0 |
| 134 | Pressure-Side | 21.586 | 19.054 | 0 |
| 135 | Pressure-Side | 22.520 | 19.867 | 0 |
| 136 | Pressure-Side | 23.445 | 20.691 | 0 |
| 137 | Pressure-Side | 24.359 | 21.526 | 0 |
| 138 | Pressure-Side | 25.264 | 22.372 | 0 |
| 139 | Pressure-Side | 26.158 | 23.227 | 0 |
| 140 | Pressure-Side | 27.044 | 24.092 | 0 |
| 141 | Pressure-Side | 27.921 | 24.967 | 0 |
| 142 | Pressure-Side | 28.788 | 25.851 | 0 |
| 143 | Pressure-Side | 29.645 | 26.745 | 0 |
| 144 | Pressure-Side | 30.494 | 27.647 | 0 |
| 145 | Pressure-Side | 31.334 | 28.558 | 0 |
| 146 | Pressure-Side | 32.163 | 29.476 | 0 |
| 147 | Pressure-Side | 32.985 | 30.402 | 0 |
| 148 | Pressure-Side | 33.798 | 31.335 | 0 |
| 149 | Pressure-Side | 34.602 | 32.277 | 0 |
| 150 | Pressure-Side | 35.399 | 33.226 | 0 |
| 151 | Pressure-Side | 36.187 | 34.181 | 0 |
| 152 | Pressure-Side | 36.966 | 35.144 | 0 |
| 153 | Pressure-Side | 37.738 | 36.113 | 0 |
| 154 | Pressure-Side | 38.500 | 37.088 | 0 |
| 155 | Pressure-Side | 39.255 | 38.068 | 0 |
| 156 | Pressure-Side | 40.003 | 39.057 | 0 |
| 157 | Pressure-Side | 40.742 | 40.049 | 0 |
| 158 | Pressure-Side | 41.474 | 41.049 | 0 |
| 159 | Pressure-Side | 42.199 | 42.052 | 0 |
| 160 | Pressure-Side | 42.916 | 43.063 | 0 |
| 161 | Pressure-Side | 43.625 | 44.078 | 0 |
| 162 | Pressure-Side | 44.327 | 45.097 | 0 |
| 163 | Pressure-Side | 45.023 | 46.122 | 0 |
| 164 | Pressure-Side | 45.711 | 47.152 | 0 |
| 165 | Pressure-Side | 46.392 | 48.185 | 0 |
| 166 | Pressure-Side | 47.067 | 49.223 | 0 |
| 167 | Pressure-Side | 47.735 | 50.266 | 0 |
| 168 | Pressure-Side | 48.395 | 51.314 | 0 |
| 169 | Pressure-Side | 49.050 | 52.366 | 0 |
| 170 | Pressure-Side | 49.698 | 53.421 | 0 |
| 171 | Pressure-Side | 50.339 | 54.480 | 0 |
| 172 | Pressure-Side | 50.974 | 55.543 | 0 |
| 173 | Pressure-Side | 51.603 | 56.609 | 0 |
| 174 | Pressure-Side | 52.226 | 57.679 | 0 |
| 175 | Pressure-Side | 52.842 | 58.753 | 0 |
| 176 | Pressure-Side | 53.453 | 59.831 | 0 |
| 177 | Pressure-Side | 54.059 | 60.911 | 0 |
| 178 | Pressure-Side | 54.657 | 61.995 | 0 |
| 179 | Pressure-Side | 55.250 | 63.083 | 0 |
| 180 | Pressure-Side | 55.838 | 64.172 | 0 |
| 181 | Pressure-Side | 56.419 | 65.266 | 0 |
| 182 | Pressure-Side | 56.995 | 66.362 | 0 |
| 183 | Pressure-Side | 57.566 | 67.460 | 0 |
| 184 | Pressure-Side | 58.132 | 68.562 | 0 |
| 185 | Pressure-Side | 58.691 | 69.666 | 0 |
| 186 | Pressure-Side | 59.246 | 70.775 | 0 |
| 187 | Pressure-Side | 59.795 | 71.885 | 0 |
| 188 | Pressure-Side | 60.339 | 72.996 | 0 |
| 189 | Pressure-Side | 60.878 | 74.112 | 0 |
| 190 | Pressure-Side | 61.412 | 75.229 | 0 |
| 191 | Pressure-Side | 61.940 | 76.348 | 0 |
| 192 | Pressure-Side | 62.464 | 77.471 | 0 |

TABLE I-continued

Non-dimensionalized (%)

| N | Location | X | Y | Z |
|---|---|---|---|---|
| 193 | Pressure-Side | 62.984 | 78.594 | 0 |
| 194 | Pressure-Side | 63.498 | 79.720 | 0 |
| 195 | Pressure-Side | 64.007 | 80.849 | 0 |
| 196 | Pressure-Side | 64.512 | 81.980 | 0 |
| 197 | Pressure-Side | 65.013 | 83.113 | 0 |
| 198 | Pressure-Side | 65.509 | 84.247 | 0 |
| 199 | Pressure-Side | 65.998 | 85.385 | 0 |
| 200 | Pressure-Side | 66.485 | 86.523 | 0 |
| 201 | Pressure-Side | 66.967 | 87.664 | 0 |
| 202 | Pressure-Side | 67.445 | 88.807 | 0 |
| 203 | Pressure-Side | 67.918 | 89.951 | 0 |
| 204 | Pressure-Side | 68.387 | 91.098 | 0 |
| 205 | Pressure-Side | 68.852 | 92.244 | 0 |
| 206 | Pressure-Side | 69.312 | 93.394 | 0 |
| 207 | Pressure-Side | 69.767 | 94.546 | 0 |
| 208 | Pressure-Side | 70.220 | 95.699 | 0 |
| 209 | Pressure-Side | 70.669 | 96.853 | 0 |
| 210 | Pressure-Side | 70.844 | 97.307 | 0 |
| 211 | Pressure-Side | 71.018 | 97.763 | 0 |
| 212 | Pressure-Side | 71.190 | 98.220 | 0 |
| 213 | Pressure-Side | 71.364 | 98.675 | 0 |
| 214 | Pressure-Side | 71.552 | 99.125 | 0 |
| 215 | Pressure-Side | 71.788 | 99.550 | 0 |
| 216 | Pressure-Side | 72.092 | 99.932 | 0 |
| 217 | Pressure-Side | 72.471 | 100.234 | 0 |
| 218 | Pressure-Side | 72.938 | 100.315 | 0 |
| 1 | Suction-Side | −0.540 | −0.445 | 10 |
| 2 | Suction-Side | −0.301 | −1.991 | 10 |
| 3 | Suction-Side | 0.288 | −3.438 | 10 |
| 4 | Suction-Side | 1.145 | −4.744 | 10 |
| 5 | Suction-Side | 2.196 | −5.895 | 10 |
| 6 | Suction-Side | 3.387 | −6.907 | 10 |
| 7 | Suction-Side | 4.668 | −7.781 | 10 |
| 8 | Suction-Side | 6.021 | −8.540 | 10 |
| 9 | Suction-Side | 7.437 | −9.198 | 10 |
| 10 | Suction-Side | 8.886 | −9.756 | 10 |
| 11 | Suction-Side | 10.360 | −10.223 | 10 |
| 12 | Suction-Side | 11.855 | −10.607 | 10 |
| 13 | Suction-Side | 13.369 | −10.914 | 10 |
| 14 | Suction-Side | 14.904 | −11.149 | 10 |
| 15 | Suction-Side | 16.452 | −11.314 | 10 |
| 16 | Suction-Side | 17.998 | −11.404 | 10 |
| 17 | Suction-Side | 19.541 | −11.417 | 10 |
| 18 | Suction-Side | 21.080 | −11.351 | 10 |
| 19 | Suction-Side | 22.614 | −11.195 | 10 |
| 20 | Suction-Side | 24.144 | −10.943 | 10 |
| 21 | Suction-Side | 25.664 | −10.589 | 10 |
| 22 | Suction-Side | 27.147 | −10.140 | 10 |
| 23 | Suction-Side | 28.584 | −9.594 | 10 |
| 24 | Suction-Side | 29.978 | −8.954 | 10 |
| 25 | Suction-Side | 31.329 | −8.224 | 10 |
| 26 | Suction-Side | 32.639 | −7.405 | 10 |
| 27 | Suction-Side | 33.908 | −6.502 | 10 |
| 28 | Suction-Side | 35.122 | −5.531 | 10 |
| 29 | Suction-Side | 36.276 | −4.505 | 10 |
| 30 | Suction-Side | 37.379 | −3.427 | 10 |
| 31 | Suction-Side | 38.432 | −2.304 | 10 |
| 32 | Suction-Side | 39.444 | −1.140 | 10 |
| 33 | Suction-Side | 40.414 | 0.065 | 10 |
| 34 | Suction-Side | 41.349 | 1.304 | 10 |
| 35 | Suction-Side | 42.247 | 2.568 | 10 |
| 36 | Suction-Side | 43.107 | 3.852 | 10 |
| 37 | Suction-Side | 43.934 | 5.150 | 10 |
| 38 | Suction-Side | 44.730 | 6.465 | 10 |
| 39 | Suction-Side | 45.498 | 7.791 | 10 |
| 40 | Suction-Side | 46.239 | 9.131 | 10 |
| 41 | Suction-Side | 46.959 | 10.483 | 10 |
| 42 | Suction-Side | 47.658 | 11.843 | 10 |
| 43 | Suction-Side | 48.337 | 13.213 | 10 |
| 44 | Suction-Side | 48.998 | 14.593 | 10 |
| 45 | Suction-Side | 49.642 | 15.980 | 10 |
| 46 | Suction-Side | 50.271 | 17.375 | 10 |
| 47 | Suction-Side | 50.884 | 18.777 | 10 |
| 48 | Suction-Side | 51.482 | 20.185 | 10 |
| 49 | Suction-Side | 52.068 | 21.600 | 10 |
| 50 | Suction-Side | 52.642 | 23.022 | 10 |
| 51 | Suction-Side | 53.203 | 24.449 | 10 |
| 52 | Suction-Side | 53.753 | 25.881 | 10 |
| 53 | Suction-Side | 54.293 | 27.319 | 10 |
| 54 | Suction-Side | 54.823 | 28.761 | 10 |
| 55 | Suction-Side | 55.344 | 30.208 | 10 |
| 56 | Suction-Side | 55.854 | 31.659 | 10 |
| 57 | Suction-Side | 56.354 | 33.113 | 10 |
| 58 | Suction-Side | 56.847 | 34.568 | 10 |
| 59 | Suction-Side | 57.329 | 36.027 | 10 |
| 60 | Suction-Side | 57.804 | 37.488 | 10 |
| 61 | Suction-Side | 58.270 | 38.951 | 10 |
| 62 | Suction-Side | 58.728 | 40.416 | 10 |
| 63 | Suction-Side | 59.179 | 41.883 | 10 |
| 64 | Suction-Side | 59.623 | 43.352 | 10 |
| 65 | Suction-Side | 60.059 | 44.822 | 10 |
| 66 | Suction-Side | 60.489 | 46.296 | 10 |
| 67 | Suction-Side | 60.912 | 47.769 | 10 |
| 68 | Suction-Side | 61.328 | 49.246 | 10 |
| 69 | Suction-Side | 61.739 | 50.723 | 10 |
| 70 | Suction-Side | 62.144 | 52.203 | 10 |
| 71 | Suction-Side | 62.541 | 53.683 | 10 |
| 72 | Suction-Side | 62.935 | 55.167 | 10 |
| 73 | Suction-Side | 63.322 | 56.651 | 10 |
| 74 | Suction-Side | 63.703 | 58.136 | 10 |
| 75 | Suction-Side | 64.079 | 59.623 | 10 |
| 76 | Suction-Side | 64.449 | 61.111 | 10 |
| 77 | Suction-Side | 64.814 | 62.601 | 10 |
| 78 | Suction-Side | 65.175 | 64.092 | 10 |
| 79 | Suction-Side | 65.531 | 65.585 | 10 |
| 80 | Suction-Side | 65.881 | 67.079 | 10 |
| 81 | Suction-Side | 66.227 | 68.573 | 10 |
| 82 | Suction-Side | 66.568 | 70.070 | 10 |
| 83 | Suction-Side | 66.904 | 71.567 | 10 |
| 84 | Suction-Side | 67.236 | 73.066 | 10 |
| 85 | Suction-Side | 67.562 | 74.566 | 10 |
| 86 | Suction-Side | 67.886 | 76.067 | 10 |
| 87 | Suction-Side | 68.203 | 77.570 | 10 |
| 88 | Suction-Side | 68.518 | 79.073 | 10 |
| 89 | Suction-Side | 68.827 | 80.578 | 10 |
| 90 | Suction-Side | 69.132 | 82.084 | 10 |
| 91 | Suction-Side | 69.433 | 83.590 | 10 |
| 92 | Suction-Side | 69.730 | 85.097 | 10 |
| 93 | Suction-Side | 70.022 | 86.606 | 10 |
| 94 | Suction-Side | 70.310 | 88.115 | 10 |
| 95 | Suction-Side | 70.595 | 89.624 | 10 |
| 96 | Suction-Side | 70.876 | 91.135 | 10 |
| 97 | Suction-Side | 71.152 | 92.647 | 10 |
| 98 | Suction-Side | 71.423 | 94.158 | 10 |
| 99 | Suction-Side | 71.690 | 95.670 | 10 |
| 100 | Suction-Side | 71.954 | 97.184 | 10 |
| 101 | Suction-Side | 72.045 | 97.703 | 10 |
| 102 | Suction-Side | 72.134 | 98.221 | 10 |
| 103 | Suction-Side | 72.221 | 98.739 | 10 |
| 104 | Suction-Side | 72.310 | 99.258 | 10 |
| 105 | Suction-Side | 72.395 | 99.777 | 10 |
| 106 | Suction-Side | 72.435 | 100.303 | 10 |
| 107 | Suction-Side | 72.393 | 100.831 | 10 |
| 108 | Suction-Side | 72.247 | 101.341 | 10 |
| 109 | Suction-Side | 71.907 | 101.742 | 10 |
| 110 | Pressure-Side | −0.540 | −0.445 | 10 |
| 111 | Pressure-Side | −0.453 | 0.801 | 10 |
| 112 | Pressure-Side | −0.126 | 2.008 | 10 |
| 113 | Pressure-Side | 0.405 | 3.140 | 10 |
| 114 | Pressure-Side | 1.098 | 4.181 | 10 |
| 115 | Pressure-Side | 1.917 | 5.126 | 10 |
| 116 | Pressure-Side | 2.831 | 5.981 | 10 |
| 117 | Pressure-Side | 3.818 | 6.751 | 10 |
| 118 | Pressure-Side | 4.861 | 7.441 | 10 |
| 119 | Pressure-Side | 5.947 | 8.064 | 10 |
| 120 | Pressure-Side | 7.042 | 8.670 | 10 |
| 121 | Pressure-Side | 8.126 | 9.294 | 10 |
| 122 | Pressure-Side | 9.198 | 9.941 | 10 |
| 123 | Pressure-Side | 10.259 | 10.604 | 10 |
| 124 | Pressure-Side | 11.311 | 11.284 | 10 |
| 125 | Pressure-Side | 12.351 | 11.980 | 10 |
| 126 | Pressure-Side | 13.379 | 12.693 | 10 |

TABLE I-continued

| | | Non-dimensionalized (%) | | |
|---|---|---|---|---|
| N | Location | X | Y | Z |
| 127 | Pressure-Side | 14.398 | 13.420 | 10 |
| 128 | Pressure-Side | 15.406 | 14.164 | 10 |
| 129 | Pressure-Side | 16.401 | 14.921 | 10 |
| 130 | Pressure-Side | 17.387 | 15.692 | 10 |
| 131 | Pressure-Side | 18.361 | 16.477 | 10 |
| 132 | Pressure-Side | 19.326 | 17.275 | 10 |
| 133 | Pressure-Side | 20.278 | 18.087 | 10 |
| 134 | Pressure-Side | 21.222 | 18.910 | 10 |
| 135 | Pressure-Side | 22.154 | 19.746 | 10 |
| 136 | Pressure-Side | 23.075 | 20.591 | 10 |
| 137 | Pressure-Side | 23.986 | 21.449 | 10 |
| 138 | Pressure-Side | 24.888 | 22.319 | 10 |
| 139 | Pressure-Side | 25.779 | 23.197 | 10 |
| 140 | Pressure-Side | 26.660 | 24.086 | 10 |
| 141 | Pressure-Side | 27.531 | 24.985 | 10 |
| 142 | Pressure-Side | 28.393 | 25.893 | 10 |
| 143 | Pressure-Side | 29.245 | 26.810 | 10 |
| 144 | Pressure-Side | 30.086 | 27.736 | 10 |
| 145 | Pressure-Side | 30.918 | 28.670 | 10 |
| 146 | Pressure-Side | 31.742 | 29.613 | 10 |
| 147 | Pressure-Side | 32.556 | 30.564 | 10 |
| 148 | Pressure-Side | 33.362 | 31.521 | 10 |
| 149 | Pressure-Side | 34.159 | 32.487 | 10 |
| 150 | Pressure-Side | 34.947 | 33.460 | 10 |
| 151 | Pressure-Side | 35.726 | 34.439 | 10 |
| 152 | Pressure-Side | 36.496 | 35.426 | 10 |
| 153 | Pressure-Side | 37.258 | 36.419 | 10 |
| 154 | Pressure-Side | 38.012 | 37.417 | 10 |
| 155 | Pressure-Side | 38.758 | 38.422 | 10 |
| 156 | Pressure-Side | 39.496 | 39.434 | 10 |
| 157 | Pressure-Side | 40.226 | 40.450 | 10 |
| 158 | Pressure-Side | 40.947 | 41.472 | 10 |
| 159 | Pressure-Side | 41.662 | 42.500 | 10 |
| 160 | Pressure-Side | 42.368 | 43.533 | 10 |
| 161 | Pressure-Side | 43.069 | 44.570 | 10 |
| 162 | Pressure-Side | 43.760 | 45.613 | 10 |
| 163 | Pressure-Side | 44.446 | 46.661 | 10 |
| 164 | Pressure-Side | 45.124 | 47.713 | 10 |
| 165 | Pressure-Side | 45.794 | 48.771 | 10 |
| 166 | Pressure-Side | 46.458 | 49.832 | 10 |
| 167 | Pressure-Side | 47.115 | 50.895 | 10 |
| 168 | Pressure-Side | 47.765 | 51.965 | 10 |
| 169 | Pressure-Side | 48.409 | 53.038 | 10 |
| 170 | Pressure-Side | 49.047 | 54.115 | 10 |
| 171 | Pressure-Side | 49.677 | 55.197 | 10 |
| 172 | Pressure-Side | 50.302 | 56.281 | 10 |
| 173 | Pressure-Side | 50.921 | 57.369 | 10 |
| 174 | Pressure-Side | 51.533 | 58.461 | 10 |
| 175 | Pressure-Side | 52.140 | 59.556 | 10 |
| 176 | Pressure-Side | 52.740 | 60.654 | 10 |
| 177 | Pressure-Side | 53.335 | 61.755 | 10 |
| 178 | Pressure-Side | 53.924 | 62.860 | 10 |
| 179 | Pressure-Side | 54.505 | 63.967 | 10 |
| 180 | Pressure-Side | 55.084 | 65.079 | 10 |
| 181 | Pressure-Side | 55.655 | 66.191 | 10 |
| 182 | Pressure-Side | 56.222 | 67.307 | 10 |
| 183 | Pressure-Side | 56.783 | 68.426 | 10 |
| 184 | Pressure-Side | 57.338 | 69.548 | 10 |
| 185 | Pressure-Side | 57.888 | 70.672 | 10 |
| 186 | Pressure-Side | 58.433 | 71.798 | 10 |
| 187 | Pressure-Side | 58.973 | 72.928 | 10 |
| 188 | Pressure-Side | 59.509 | 74.060 | 10 |
| 189 | Pressure-Side | 60.038 | 75.193 | 10 |
| 190 | Pressure-Side | 60.562 | 76.330 | 10 |
| 191 | Pressure-Side | 61.083 | 77.468 | 10 |
| 192 | Pressure-Side | 61.598 | 78.609 | 10 |
| 193 | Pressure-Side | 62.108 | 79.751 | 10 |
| 194 | Pressure-Side | 62.614 | 80.897 | 10 |
| 195 | Pressure-Side | 63.116 | 82.042 | 10 |
| 196 | Pressure-Side | 63.613 | 83.192 | 10 |
| 197 | Pressure-Side | 64.104 | 84.342 | 10 |
| 198 | Pressure-Side | 64.592 | 85.495 | 10 |
| 199 | Pressure-Side | 65.076 | 86.649 | 10 |
| 200 | Pressure-Side | 65.555 | 87.807 | 10 |
| 201 | Pressure-Side | 66.030 | 88.964 | 10 |
| 202 | Pressure-Side | 66.499 | 90.124 | 10 |
| 203 | Pressure-Side | 66.964 | 91.286 | 10 |
| 204 | Pressure-Side | 67.427 | 92.449 | 10 |
| 205 | Pressure-Side | 67.886 | 93.614 | 10 |
| 206 | Pressure-Side | 68.340 | 94.780 | 10 |
| 207 | Pressure-Side | 68.789 | 95.948 | 10 |
| 208 | Pressure-Side | 69.235 | 97.117 | 10 |
| 209 | Pressure-Side | 69.677 | 98.288 | 10 |
| 210 | Pressure-Side | 69.847 | 98.742 | 10 |
| 211 | Pressure-Side | 70.018 | 99.194 | 10 |
| 212 | Pressure-Side | 70.184 | 99.650 | 10 |
| 213 | Pressure-Side | 70.350 | 100.105 | 10 |
| 214 | Pressure-Side | 70.537 | 100.552 | 10 |
| 215 | Pressure-Side | 70.772 | 100.975 | 10 |
| 216 | Pressure-Side | 71.071 | 101.356 | 10 |
| 217 | Pressure-Side | 71.444 | 101.662 | 10 |
| 218 | Pressure-Side | 71.907 | 101.742 | 10 |
| 1 | Suction-Side | −1.080 | −0.890 | 20 |
| 2 | Suction-Side | −0.843 | −2.430 | 20 |
| 3 | Suction-Side | −0.255 | −3.874 | 20 |
| 4 | Suction-Side | 0.601 | −5.177 | 20 |
| 5 | Suction-Side | 1.653 | −6.330 | 20 |
| 6 | Suction-Side | 2.844 | −7.339 | 20 |
| 7 | Suction-Side | 4.135 | −8.215 | 20 |
| 8 | Suction-Side | 5.499 | −8.975 | 20 |
| 9 | Suction-Side | 6.917 | −9.628 | 20 |
| 10 | Suction-Side | 8.377 | −10.181 | 20 |
| 11 | Suction-Side | 9.867 | −10.646 | 20 |
| 12 | Suction-Side | 11.382 | −11.024 | 20 |
| 13 | Suction-Side | 12.915 | −11.324 | 20 |
| 14 | Suction-Side | 14.461 | −11.547 | 20 |
| 15 | Suction-Side | 16.014 | −11.698 | 20 |
| 16 | Suction-Side | 17.573 | −11.774 | 20 |
| 17 | Suction-Side | 19.134 | −11.771 | 20 |
| 18 | Suction-Side | 20.694 | −11.683 | 20 |
| 19 | Suction-Side | 22.244 | −11.503 | 20 |
| 20 | Suction-Side | 23.781 | −11.229 | 20 |
| 21 | Suction-Side | 25.298 | −10.855 | 20 |
| 22 | Suction-Side | 26.786 | −10.382 | 20 |
| 23 | Suction-Side | 28.239 | −9.811 | 20 |
| 24 | Suction-Side | 29.650 | −9.144 | 20 |
| 25 | Suction-Side | 31.015 | −8.388 | 20 |
| 26 | Suction-Side | 32.331 | −7.546 | 20 |
| 27 | Suction-Side | 33.596 | −6.632 | 20 |
| 28 | Suction-Side | 34.809 | −5.649 | 20 |
| 29 | Suction-Side | 35.970 | −4.606 | 20 |
| 30 | Suction-Side | 37.083 | −3.509 | 20 |
| 31 | Suction-Side | 38.147 | −2.367 | 20 |
| 32 | Suction-Side | 39.168 | −1.184 | 20 |
| 33 | Suction-Side | 40.144 | 0.033 | 20 |
| 34 | Suction-Side | 41.082 | 1.282 | 20 |
| 35 | Suction-Side | 41.984 | 2.556 | 20 |
| 36 | Suction-Side | 42.851 | 3.855 | 20 |
| 37 | Suction-Side | 43.686 | 5.174 | 20 |
| 38 | Suction-Side | 44.493 | 6.512 | 20 |
| 39 | Suction-Side | 45.272 | 7.865 | 20 |
| 40 | Suction-Side | 46.024 | 9.232 | 20 |
| 41 | Suction-Side | 46.754 | 10.613 | 20 |
| 42 | Suction-Side | 47.464 | 12.005 | 20 |
| 43 | Suction-Side | 48.151 | 13.406 | 20 |
| 44 | Suction-Side | 48.820 | 14.817 | 20 |
| 45 | Suction-Side | 49.471 | 16.237 | 20 |
| 46 | Suction-Side | 50.105 | 17.664 | 20 |
| 47 | Suction-Side | 50.723 | 19.097 | 20 |
| 48 | Suction-Side | 51.326 | 20.538 | 20 |
| 49 | Suction-Side | 51.915 | 21.985 | 20 |
| 50 | Suction-Side | 52.490 | 23.436 | 20 |
| 51 | Suction-Side | 53.053 | 24.893 | 20 |
| 52 | Suction-Side | 53.603 | 26.353 | 20 |
| 53 | Suction-Side | 54.142 | 27.819 | 20 |
| 54 | Suction-Side | 54.670 | 29.289 | 20 |
| 55 | Suction-Side | 55.186 | 30.762 | 20 |
| 56 | Suction-Side | 55.694 | 32.239 | 20 |
| 57 | Suction-Side | 56.191 | 33.720 | 20 |
| 58 | Suction-Side | 56.679 | 35.202 | 20 |
| 59 | Suction-Side | 57.157 | 36.689 | 20 |
| 60 | Suction-Side | 57.627 | 38.178 | 20 |

TABLE I-continued

| | | Non-dimensionalized (%) | | |
|---|---|---|---|---|
| N | Location | X | Y | Z |
| 61 | Suction-Side | 58.089 | 39.669 | 20 |
| 62 | Suction-Side | 58.541 | 41.164 | 20 |
| 63 | Suction-Side | 58.986 | 42.661 | 20 |
| 64 | Suction-Side | 59.424 | 44.159 | 20 |
| 65 | Suction-Side | 59.854 | 45.661 | 20 |
| 66 | Suction-Side | 60.277 | 47.164 | 20 |
| 67 | Suction-Side | 60.694 | 48.668 | 20 |
| 68 | Suction-Side | 61.104 | 50.176 | 20 |
| 69 | Suction-Side | 61.506 | 51.683 | 20 |
| 70 | Suction-Side | 61.903 | 53.194 | 20 |
| 71 | Suction-Side | 62.294 | 54.706 | 20 |
| 72 | Suction-Side | 62.678 | 56.219 | 20 |
| 73 | Suction-Side | 63.056 | 57.734 | 20 |
| 74 | Suction-Side | 63.429 | 59.250 | 20 |
| 75 | Suction-Side | 63.795 | 60.768 | 20 |
| 76 | Suction-Side | 64.157 | 62.288 | 20 |
| 77 | Suction-Side | 64.512 | 63.808 | 20 |
| 78 | Suction-Side | 64.863 | 65.329 | 20 |
| 79 | Suction-Side | 65.208 | 66.853 | 20 |
| 80 | Suction-Side | 65.547 | 68.377 | 20 |
| 81 | Suction-Side | 65.883 | 69.902 | 20 |
| 82 | Suction-Side | 66.212 | 71.428 | 20 |
| 83 | Suction-Side | 66.537 | 72.956 | 20 |
| 84 | Suction-Side | 66.858 | 74.484 | 20 |
| 85 | Suction-Side | 67.174 | 76.012 | 20 |
| 86 | Suction-Side | 67.484 | 77.544 | 20 |
| 87 | Suction-Side | 67.789 | 79.075 | 20 |
| 88 | Suction-Side | 68.092 | 80.606 | 20 |
| 89 | Suction-Side | 68.389 | 82.139 | 20 |
| 90 | Suction-Side | 68.683 | 83.673 | 20 |
| 91 | Suction-Side | 68.970 | 85.207 | 20 |
| 92 | Suction-Side | 69.254 | 86.743 | 20 |
| 93 | Suction-Side | 69.534 | 88.280 | 20 |
| 94 | Suction-Side | 69.809 | 89.816 | 20 |
| 95 | Suction-Side | 70.080 | 91.354 | 20 |
| 96 | Suction-Side | 70.347 | 92.893 | 20 |
| 97 | Suction-Side | 70.611 | 94.432 | 20 |
| 98 | Suction-Side | 70.871 | 95.972 | 20 |
| 99 | Suction-Side | 71.123 | 97.512 | 20 |
| 100 | Suction-Side | 71.373 | 99.053 | 20 |
| 101 | Suction-Side | 71.453 | 99.547 | 20 |
| 102 | Suction-Side | 71.534 | 100.040 | 20 |
| 103 | Suction-Side | 71.616 | 100.534 | 20 |
| 104 | Suction-Side | 71.693 | 101.028 | 20 |
| 105 | Suction-Side | 71.754 | 101.524 | 20 |
| 106 | Suction-Side | 71.772 | 102.022 | 20 |
| 107 | Suction-Side | 71.708 | 102.519 | 20 |
| 108 | Suction-Side | 71.551 | 102.994 | 20 |
| 109 | Suction-Side | 71.208 | 103.343 | 20 |
| 110 | Pressure-Side | −1.080 | −0.890 | 20 |
| 111 | Pressure-Side | −0.991 | 0.371 | 20 |
| 112 | Pressure-Side | −0.657 | 1.591 | 20 |
| 113 | Pressure-Side | −0.113 | 2.733 | 20 |
| 114 | Pressure-Side | 0.595 | 3.782 | 20 |
| 115 | Pressure-Side | 1.430 | 4.735 | 20 |
| 116 | Pressure-Side | 2.362 | 5.592 | 20 |
| 117 | Pressure-Side | 3.368 | 6.361 | 20 |
| 118 | Pressure-Side | 4.432 | 7.049 | 20 |
| 119 | Pressure-Side | 5.531 | 7.677 | 20 |
| 120 | Pressure-Side | 6.638 | 8.294 | 20 |
| 121 | Pressure-Side | 7.732 | 8.934 | 20 |
| 122 | Pressure-Side | 8.812 | 9.595 | 20 |
| 123 | Pressure-Side | 9.880 | 10.275 | 20 |
| 124 | Pressure-Side | 10.938 | 10.972 | 20 |
| 125 | Pressure-Side | 11.984 | 11.686 | 20 |
| 126 | Pressure-Side | 13.018 | 12.416 | 20 |
| 127 | Pressure-Side | 14.042 | 13.164 | 20 |
| 128 | Pressure-Side | 15.054 | 13.926 | 20 |
| 129 | Pressure-Side | 16.054 | 14.704 | 20 |
| 130 | Pressure-Side | 17.042 | 15.496 | 20 |
| 131 | Pressure-Side | 18.019 | 16.302 | 20 |
| 132 | Pressure-Side | 18.985 | 17.122 | 20 |
| 133 | Pressure-Side | 19.939 | 17.955 | 20 |
| 134 | Pressure-Side | 20.882 | 18.801 | 20 |
| 135 | Pressure-Side | 21.814 | 19.658 | 20 |
| 136 | Pressure-Side | 22.735 | 20.528 | 20 |
| 137 | Pressure-Side | 23.646 | 21.407 | 20 |
| 138 | Pressure-Side | 24.546 | 22.299 | 20 |
| 139 | Pressure-Side | 25.436 | 23.201 | 20 |
| 140 | Pressure-Side | 26.314 | 24.114 | 20 |
| 141 | Pressure-Side | 27.182 | 25.035 | 20 |
| 142 | Pressure-Side | 28.041 | 25.967 | 20 |
| 143 | Pressure-Side | 28.890 | 26.908 | 20 |
| 144 | Pressure-Side | 29.728 | 27.857 | 20 |
| 145 | Pressure-Side | 30.558 | 28.814 | 20 |
| 146 | Pressure-Side | 31.377 | 29.780 | 20 |
| 147 | Pressure-Side | 32.187 | 30.755 | 20 |
| 148 | Pressure-Side | 32.987 | 31.736 | 20 |
| 149 | Pressure-Side | 33.779 | 32.725 | 20 |
| 150 | Pressure-Side | 34.561 | 33.721 | 20 |
| 151 | Pressure-Side | 35.335 | 34.724 | 20 |
| 152 | Pressure-Side | 36.100 | 35.733 | 20 |
| 153 | Pressure-Side | 36.856 | 36.749 | 20 |
| 154 | Pressure-Side | 37.606 | 37.772 | 20 |
| 155 | Pressure-Side | 38.344 | 38.800 | 20 |
| 156 | Pressure-Side | 39.077 | 39.834 | 20 |
| 157 | Pressure-Side | 39.800 | 40.873 | 20 |
| 158 | Pressure-Side | 40.517 | 41.919 | 20 |
| 159 | Pressure-Side | 41.224 | 42.969 | 20 |
| 160 | Pressure-Side | 41.925 | 44.024 | 20 |
| 161 | Pressure-Side | 42.618 | 45.084 | 20 |
| 162 | Pressure-Side | 43.303 | 46.149 | 20 |
| 163 | Pressure-Side | 43.983 | 47.219 | 20 |
| 164 | Pressure-Side | 44.653 | 48.293 | 20 |
| 165 | Pressure-Side | 45.318 | 49.372 | 20 |
| 166 | Pressure-Side | 45.975 | 50.455 | 20 |
| 167 | Pressure-Side | 46.625 | 51.541 | 20 |
| 168 | Pressure-Side | 47.269 | 52.631 | 20 |
| 169 | Pressure-Side | 47.907 | 53.726 | 20 |
| 170 | Pressure-Side | 48.538 | 54.826 | 20 |
| 171 | Pressure-Side | 49.162 | 55.927 | 20 |
| 172 | Pressure-Side | 49.781 | 57.032 | 20 |
| 173 | Pressure-Side | 50.392 | 58.142 | 20 |
| 174 | Pressure-Side | 50.999 | 59.255 | 20 |
| 175 | Pressure-Side | 51.599 | 60.369 | 20 |
| 176 | Pressure-Side | 52.192 | 61.488 | 20 |
| 177 | Pressure-Side | 52.781 | 62.610 | 20 |
| 178 | Pressure-Side | 53.363 | 63.736 | 20 |
| 179 | Pressure-Side | 53.940 | 64.863 | 20 |
| 180 | Pressure-Side | 54.511 | 65.994 | 20 |
| 181 | Pressure-Side | 55.078 | 67.126 | 20 |
| 182 | Pressure-Side | 55.639 | 68.263 | 20 |
| 183 | Pressure-Side | 56.194 | 69.401 | 20 |
| 184 | Pressure-Side | 56.744 | 70.542 | 20 |
| 185 | Pressure-Side | 57.289 | 71.686 | 20 |
| 186 | Pressure-Side | 57.827 | 72.831 | 20 |
| 187 | Pressure-Side | 58.363 | 73.980 | 20 |
| 188 | Pressure-Side | 58.893 | 75.131 | 20 |
| 189 | Pressure-Side | 59.417 | 76.284 | 20 |
| 190 | Pressure-Side | 59.937 | 77.438 | 20 |
| 191 | Pressure-Side | 60.452 | 78.595 | 20 |
| 192 | Pressure-Side | 60.964 | 79.754 | 20 |
| 193 | Pressure-Side | 61.470 | 80.916 | 20 |
| 194 | Pressure-Side | 61.972 | 82.079 | 20 |
| 195 | Pressure-Side | 62.469 | 83.244 | 20 |
| 196 | Pressure-Side | 62.961 | 84.410 | 20 |
| 197 | Pressure-Side | 63.449 | 85.579 | 20 |
| 198 | Pressure-Side | 63.933 | 86.750 | 20 |
| 199 | Pressure-Side | 64.412 | 87.922 | 20 |
| 200 | Pressure-Side | 64.889 | 89.096 | 20 |
| 201 | Pressure-Side | 65.362 | 90.273 | 20 |
| 202 | Pressure-Side | 65.829 | 91.449 | 20 |
| 203 | Pressure-Side | 66.292 | 92.627 | 20 |
| 204 | Pressure-Side | 66.751 | 93.808 | 20 |
| 205 | Pressure-Side | 67.206 | 94.991 | 20 |
| 206 | Pressure-Side | 67.656 | 96.175 | 20 |
| 207 | Pressure-Side | 68.105 | 97.359 | 20 |
| 208 | Pressure-Side | 68.552 | 98.544 | 20 |
| 209 | Pressure-Side | 68.993 | 99.731 | 20 |
| 210 | Pressure-Side | 69.163 | 100.197 | 20 |
| 211 | Pressure-Side | 69.331 | 100.662 | 20 |
| 212 | Pressure-Side | 69.499 | 101.128 | 20 |

TABLE I-continued

Non-dimensionalized (%)

| N | Location | X | Y | Z |
|---|---|---|---|---|
| 213 | Pressure-Side | 69.669 | 101.592 | 20 |
| 214 | Pressure-Side | 69.856 | 102.051 | 20 |
| 215 | Pressure-Side | 70.079 | 102.491 | 20 |
| 216 | Pressure-Side | 70.374 | 102.889 | 20 |
| 217 | Pressure-Side | 70.742 | 103.220 | 20 |
| 218 | Pressure-Side | 71.208 | 103.343 | 20 |
| 1 | Suction-Side | −1.622 | −1.335 | 30 |
| 2 | Suction-Side | −1.368 | −2.926 | 30 |
| 3 | Suction-Side | −0.746 | −4.413 | 30 |
| 4 | Suction-Side | 0.157 | −5.744 | 30 |
| 5 | Suction-Side | 1.260 | −6.914 | 30 |
| 6 | Suction-Side | 2.505 | −7.932 | 30 |
| 7 | Suction-Side | 3.841 | −8.809 | 30 |
| 8 | Suction-Side | 5.255 | −9.563 | 30 |
| 9 | Suction-Side | 6.729 | −10.210 | 30 |
| 10 | Suction-Side | 8.232 | −10.748 | 30 |
| 11 | Suction-Side | 9.762 | −11.193 | 30 |
| 12 | Suction-Side | 11.312 | −11.549 | 30 |
| 13 | Suction-Side | 12.885 | −11.824 | 30 |
| 14 | Suction-Side | 14.477 | −12.020 | 30 |
| 15 | Suction-Side | 16.075 | −12.140 | 30 |
| 16 | Suction-Side | 17.667 | −12.180 | 30 |
| 17 | Suction-Side | 19.256 | −12.134 | 30 |
| 18 | Suction-Side | 20.841 | −11.999 | 30 |
| 19 | Suction-Side | 22.422 | −11.766 | 30 |
| 20 | Suction-Side | 23.995 | −11.431 | 30 |
| 21 | Suction-Side | 25.531 | −10.996 | 30 |
| 22 | Suction-Side | 27.025 | −10.463 | 30 |
| 23 | Suction-Side | 28.476 | −9.834 | 30 |
| 24 | Suction-Side | 29.886 | −9.113 | 30 |
| 25 | Suction-Side | 31.255 | −8.299 | 30 |
| 26 | Suction-Side | 32.585 | −7.398 | 30 |
| 27 | Suction-Side | 33.856 | −6.428 | 30 |
| 28 | Suction-Side | 35.068 | −5.396 | 30 |
| 29 | Suction-Side | 36.227 | −4.312 | 30 |
| 30 | Suction-Side | 37.337 | −3.177 | 30 |
| 31 | Suction-Side | 38.402 | −1.996 | 30 |
| 32 | Suction-Side | 39.425 | −0.773 | 30 |
| 33 | Suction-Side | 40.410 | 0.487 | 30 |
| 34 | Suction-Side | 41.353 | 1.776 | 30 |
| 35 | Suction-Side | 42.257 | 3.085 | 30 |
| 36 | Suction-Side | 43.124 | 4.413 | 30 |
| 37 | Suction-Side | 43.956 | 5.757 | 30 |
| 38 | Suction-Side | 44.760 | 7.116 | 30 |
| 39 | Suction-Side | 45.536 | 8.490 | 30 |
| 40 | Suction-Side | 46.285 | 9.876 | 30 |
| 41 | Suction-Side | 47.012 | 11.273 | 30 |
| 42 | Suction-Side | 47.716 | 12.683 | 30 |
| 43 | Suction-Side | 48.401 | 14.103 | 30 |
| 44 | Suction-Side | 49.067 | 15.532 | 30 |
| 45 | Suction-Side | 49.714 | 16.968 | 30 |
| 46 | Suction-Side | 50.346 | 18.415 | 30 |
| 47 | Suction-Side | 50.962 | 19.869 | 30 |
| 48 | Suction-Side | 51.562 | 21.330 | 30 |
| 49 | Suction-Side | 52.149 | 22.799 | 30 |
| 50 | Suction-Side | 52.722 | 24.274 | 30 |
| 51 | Suction-Side | 53.283 | 25.756 | 30 |
| 52 | Suction-Side | 53.832 | 27.245 | 30 |
| 53 | Suction-Side | 54.367 | 28.736 | 30 |
| 54 | Suction-Side | 54.893 | 30.231 | 30 |
| 55 | Suction-Side | 55.406 | 31.730 | 30 |
| 56 | Suction-Side | 55.909 | 33.230 | 30 |
| 57 | Suction-Side | 56.402 | 34.733 | 30 |
| 58 | Suction-Side | 56.884 | 36.239 | 30 |
| 59 | Suction-Side | 57.357 | 37.748 | 30 |
| 60 | Suction-Side | 57.820 | 39.258 | 30 |
| 61 | Suction-Side | 58.276 | 40.772 | 30 |
| 62 | Suction-Side | 58.721 | 42.288 | 30 |
| 63 | Suction-Side | 59.160 | 43.805 | 30 |
| 64 | Suction-Side | 59.589 | 45.324 | 30 |
| 65 | Suction-Side | 60.012 | 46.846 | 30 |
| 66 | Suction-Side | 60.427 | 48.370 | 30 |
| 67 | Suction-Side | 60.835 | 49.895 | 30 |
| 68 | Suction-Side | 61.236 | 51.422 | 30 |
| 69 | Suction-Side | 61.629 | 52.950 | 30 |
| 70 | Suction-Side | 62.018 | 54.482 | 30 |
| 71 | Suction-Side | 62.399 | 56.013 | 30 |
| 72 | Suction-Side | 62.773 | 57.547 | 30 |
| 73 | Suction-Side | 63.142 | 59.083 | 30 |
| 74 | Suction-Side | 63.504 | 60.618 | 30 |
| 75 | Suction-Side | 63.862 | 62.157 | 30 |
| 76 | Suction-Side | 64.214 | 63.697 | 30 |
| 77 | Suction-Side | 64.559 | 65.239 | 30 |
| 78 | Suction-Side | 64.899 | 66.782 | 30 |
| 79 | Suction-Side | 65.233 | 68.325 | 30 |
| 80 | Suction-Side | 65.562 | 69.871 | 30 |
| 81 | Suction-Side | 65.887 | 71.419 | 30 |
| 82 | Suction-Side | 66.206 | 72.966 | 30 |
| 83 | Suction-Side | 66.521 | 74.515 | 30 |
| 84 | Suction-Side | 66.829 | 76.066 | 30 |
| 85 | Suction-Side | 67.134 | 77.618 | 30 |
| 86 | Suction-Side | 67.433 | 79.171 | 30 |
| 87 | Suction-Side | 67.729 | 80.726 | 30 |
| 88 | Suction-Side | 68.019 | 82.281 | 30 |
| 89 | Suction-Side | 68.304 | 83.838 | 30 |
| 90 | Suction-Side | 68.586 | 85.395 | 30 |
| 91 | Suction-Side | 68.862 | 86.953 | 30 |
| 92 | Suction-Side | 69.135 | 88.513 | 30 |
| 93 | Suction-Side | 69.402 | 90.072 | 30 |
| 94 | Suction-Side | 69.666 | 91.633 | 30 |
| 95 | Suction-Side | 69.924 | 93.194 | 30 |
| 96 | Suction-Side | 70.180 | 94.756 | 30 |
| 97 | Suction-Side | 70.430 | 96.319 | 30 |
| 98 | Suction-Side | 70.677 | 97.881 | 30 |
| 99 | Suction-Side | 70.919 | 99.447 | 30 |
| 100 | Suction-Side | 71.156 | 101.010 | 30 |
| 101 | Suction-Side | 71.227 | 101.479 | 30 |
| 102 | Suction-Side | 71.297 | 101.948 | 30 |
| 103 | Suction-Side | 71.367 | 102.417 | 30 |
| 104 | Suction-Side | 71.436 | 102.887 | 30 |
| 105 | Suction-Side | 71.488 | 103.358 | 30 |
| 106 | Suction-Side | 71.485 | 103.835 | 30 |
| 107 | Suction-Side | 71.414 | 104.319 | 30 |
| 108 | Suction-Side | 71.241 | 104.788 | 30 |
| 109 | Suction-Side | 70.873 | 105.101 | 30 |
| 110 | Pressure-Side | −1.622 | −1.335 | 30 |
| 111 | Pressure-Side | −1.531 | −0.058 | 30 |
| 112 | Pressure-Side | −1.188 | 1.177 | 30 |
| 113 | Pressure-Side | −0.632 | 2.331 | 30 |
| 114 | Pressure-Side | 0.091 | 3.389 | 30 |
| 115 | Pressure-Side | 0.942 | 4.347 | 30 |
| 116 | Pressure-Side | 1.892 | 5.209 | 30 |
| 117 | Pressure-Side | 2.917 | 5.979 | 30 |
| 118 | Pressure-Side | 4.000 | 6.668 | 30 |
| 119 | Pressure-Side | 5.113 | 7.303 | 30 |
| 120 | Pressure-Side | 6.230 | 7.935 | 30 |
| 121 | Pressure-Side | 7.333 | 8.589 | 30 |
| 122 | Pressure-Side | 8.422 | 9.269 | 30 |
| 123 | Pressure-Side | 9.499 | 9.965 | 30 |
| 124 | Pressure-Side | 10.564 | 10.679 | 30 |
| 125 | Pressure-Side | 11.618 | 11.411 | 30 |
| 126 | Pressure-Side | 12.658 | 12.161 | 30 |
| 127 | Pressure-Side | 13.688 | 12.926 | 30 |
| 128 | Pressure-Side | 14.704 | 13.708 | 30 |
| 129 | Pressure-Side | 15.708 | 14.505 | 30 |
| 130 | Pressure-Side | 16.701 | 15.318 | 30 |
| 131 | Pressure-Side | 17.682 | 16.145 | 30 |
| 132 | Pressure-Side | 18.651 | 16.984 | 30 |
| 133 | Pressure-Side | 19.609 | 17.839 | 30 |
| 134 | Pressure-Side | 20.554 | 18.704 | 30 |
| 135 | Pressure-Side | 21.489 | 19.584 | 30 |
| 136 | Pressure-Side | 22.412 | 20.474 | 30 |
| 137 | Pressure-Side | 23.324 | 21.376 | 30 |
| 138 | Pressure-Side | 24.225 | 22.289 | 30 |
| 139 | Pressure-Side | 25.115 | 23.212 | 30 |
| 140 | Pressure-Side | 25.994 | 24.146 | 30 |
| 141 | Pressure-Side | 26.863 | 25.090 | 30 |
| 142 | Pressure-Side | 27.722 | 26.043 | 30 |
| 143 | Pressure-Side | 28.570 | 27.006 | 30 |
| 144 | Pressure-Side | 29.408 | 27.976 | 30 |
| 145 | Pressure-Side | 30.236 | 28.955 | 30 |
| 146 | Pressure-Side | 31.055 | 29.943 | 30 |

TABLE I-continued

Non-dimensionalized (%)

| N | Location | X | Y | Z |
|---|---|---|---|---|
| 147 | Pressure-Side | 31.863 | 30.939 | 30 |
| 148 | Pressure-Side | 32.663 | 31.942 | 30 |
| 149 | Pressure-Side | 33.454 | 32.953 | 30 |
| 150 | Pressure-Side | 34.234 | 33.969 | 30 |
| 151 | Pressure-Side | 35.007 | 34.994 | 30 |
| 152 | Pressure-Side | 35.770 | 36.024 | 30 |
| 153 | Pressure-Side | 36.525 | 37.061 | 30 |
| 154 | Pressure-Side | 37.272 | 38.104 | 30 |
| 155 | Pressure-Side | 38.009 | 39.155 | 30 |
| 156 | Pressure-Side | 38.739 | 40.210 | 30 |
| 157 | Pressure-Side | 39.460 | 41.269 | 30 |
| 158 | Pressure-Side | 40.174 | 42.336 | 30 |
| 159 | Pressure-Side | 40.880 | 43.405 | 30 |
| 160 | Pressure-Side | 41.578 | 44.483 | 30 |
| 161 | Pressure-Side | 42.269 | 45.563 | 30 |
| 162 | Pressure-Side | 42.951 | 46.649 | 30 |
| 163 | Pressure-Side | 43.628 | 47.738 | 30 |
| 164 | Pressure-Side | 44.297 | 48.833 | 30 |
| 165 | Pressure-Side | 44.959 | 49.932 | 30 |
| 166 | Pressure-Side | 45.613 | 51.035 | 30 |
| 167 | Pressure-Side | 46.262 | 52.142 | 30 |
| 168 | Pressure-Side | 46.903 | 53.252 | 30 |
| 169 | Pressure-Side | 47.538 | 54.366 | 30 |
| 170 | Pressure-Side | 48.167 | 55.485 | 30 |
| 171 | Pressure-Side | 48.789 | 56.606 | 30 |
| 172 | Pressure-Side | 49.404 | 57.731 | 30 |
| 173 | Pressure-Side | 50.014 | 58.860 | 30 |
| 174 | Pressure-Side | 50.618 | 59.992 | 30 |
| 175 | Pressure-Side | 51.216 | 61.126 | 30 |
| 176 | Pressure-Side | 51.808 | 62.264 | 30 |
| 177 | Pressure-Side | 52.396 | 63.405 | 30 |
| 178 | Pressure-Side | 52.976 | 64.549 | 30 |
| 179 | Pressure-Side | 53.551 | 65.696 | 30 |
| 180 | Pressure-Side | 54.120 | 66.844 | 30 |
| 181 | Pressure-Side | 54.685 | 67.997 | 30 |
| 182 | Pressure-Side | 55.243 | 69.151 | 30 |
| 183 | Pressure-Side | 55.796 | 70.307 | 30 |
| 184 | Pressure-Side | 56.345 | 71.468 | 30 |
| 185 | Pressure-Side | 56.888 | 72.629 | 30 |
| 186 | Pressure-Side | 57.427 | 73.794 | 30 |
| 187 | Pressure-Side | 57.961 | 74.960 | 30 |
| 188 | Pressure-Side | 58.489 | 76.128 | 30 |
| 189 | Pressure-Side | 59.014 | 77.299 | 30 |
| 190 | Pressure-Side | 59.534 | 78.472 | 30 |
| 191 | Pressure-Side | 60.047 | 79.647 | 30 |
| 192 | Pressure-Side | 60.558 | 80.824 | 30 |
| 193 | Pressure-Side | 61.064 | 82.002 | 30 |
| 194 | Pressure-Side | 61.565 | 83.183 | 30 |
| 195 | Pressure-Side | 62.061 | 84.366 | 30 |
| 196 | Pressure-Side | 62.553 | 85.550 | 30 |
| 197 | Pressure-Side | 63.041 | 86.737 | 30 |
| 198 | Pressure-Side | 63.527 | 87.924 | 30 |
| 199 | Pressure-Side | 64.006 | 89.114 | 30 |
| 200 | Pressure-Side | 64.484 | 90.305 | 30 |
| 201 | Pressure-Side | 64.955 | 91.497 | 30 |
| 202 | Pressure-Side | 65.423 | 92.691 | 30 |
| 203 | Pressure-Side | 65.887 | 93.887 | 30 |
| 204 | Pressure-Side | 66.347 | 95.084 | 30 |
| 205 | Pressure-Side | 66.803 | 96.283 | 30 |
| 206 | Pressure-Side | 67.255 | 97.484 | 30 |
| 207 | Pressure-Side | 67.705 | 98.685 | 30 |
| 208 | Pressure-Side | 68.151 | 99.887 | 30 |
| 209 | Pressure-Side | 68.595 | 101.091 | 30 |
| 210 | Pressure-Side | 68.778 | 101.592 | 30 |
| 211 | Pressure-Side | 68.959 | 102.092 | 30 |
| 212 | Pressure-Side | 69.137 | 102.594 | 30 |
| 213 | Pressure-Side | 69.316 | 103.095 | 30 |
| 214 | Pressure-Side | 69.505 | 103.594 | 30 |
| 215 | Pressure-Side | 69.724 | 104.077 | 30 |
| 216 | Pressure-Side | 70.016 | 104.522 | 30 |
| 217 | Pressure-Side | 70.387 | 104.907 | 30 |
| 218 | Pressure-Side | 70.873 | 105.101 | 30 |
| 1 | Suction-Side | −2.163 | −1.779 | 40 |
| 2 | Suction-Side | −1.904 | −3.396 | 40 |
| 3 | Suction-Side | −1.264 | −4.904 | 40 |
| 4 | Suction-Side | −0.338 | −6.251 | 40 |
| 5 | Suction-Side | 0.791 | −7.432 | 40 |
| 6 | Suction-Side | 2.064 | −8.457 | 40 |
| 7 | Suction-Side | 3.429 | −9.336 | 40 |
| 8 | Suction-Side | 4.874 | −10.091 | 40 |
| 9 | Suction-Side | 6.377 | −10.733 | 40 |
| 10 | Suction-Side | 7.908 | −11.266 | 40 |
| 11 | Suction-Side | 9.466 | −11.701 | 40 |
| 12 | Suction-Side | 11.048 | −12.045 | 40 |
| 13 | Suction-Side | 12.650 | −12.306 | 40 |
| 14 | Suction-Side | 14.272 | −12.486 | 40 |
| 15 | Suction-Side | 15.894 | −12.584 | 40 |
| 16 | Suction-Side | 17.513 | −12.598 | 40 |
| 17 | Suction-Side | 19.127 | −12.526 | 40 |
| 18 | Suction-Side | 20.737 | −12.357 | 40 |
| 19 | Suction-Side | 22.342 | −12.087 | 40 |
| 20 | Suction-Side | 23.931 | −11.713 | 40 |
| 21 | Suction-Side | 25.479 | −11.239 | 40 |
| 22 | Suction-Side | 26.985 | −10.668 | 40 |
| 23 | Suction-Side | 28.448 | −10.002 | 40 |
| 24 | Suction-Side | 29.872 | −9.242 | 40 |
| 25 | Suction-Side | 31.257 | −8.392 | 40 |
| 26 | Suction-Side | 32.593 | −7.459 | 40 |
| 27 | Suction-Side | 33.872 | −6.460 | 40 |
| 28 | Suction-Side | 35.094 | −5.404 | 40 |
| 29 | Suction-Side | 36.261 | −4.294 | 40 |
| 30 | Suction-Side | 37.383 | −3.134 | 40 |
| 31 | Suction-Side | 38.460 | −1.927 | 40 |
| 32 | Suction-Side | 39.497 | −0.680 | 40 |
| 33 | Suction-Side | 40.496 | 0.604 | 40 |
| 34 | Suction-Side | 41.450 | 1.913 | 40 |
| 35 | Suction-Side | 42.364 | 3.242 | 40 |
| 36 | Suction-Side | 43.242 | 4.591 | 40 |
| 37 | Suction-Side | 44.088 | 5.956 | 40 |
| 38 | Suction-Side | 44.903 | 7.336 | 40 |
| 39 | Suction-Side | 45.690 | 8.732 | 40 |
| 40 | Suction-Side | 46.452 | 10.140 | 40 |
| 41 | Suction-Side | 47.188 | 11.561 | 40 |
| 42 | Suction-Side | 47.903 | 12.995 | 40 |
| 43 | Suction-Side | 48.597 | 14.437 | 40 |
| 44 | Suction-Side | 49.272 | 15.891 | 40 |
| 45 | Suction-Side | 49.930 | 17.354 | 40 |
| 46 | Suction-Side | 50.569 | 18.826 | 40 |
| 47 | Suction-Side | 51.192 | 20.305 | 40 |
| 48 | Suction-Side | 51.799 | 21.793 | 40 |
| 49 | Suction-Side | 52.393 | 23.289 | 40 |
| 50 | Suction-Side | 52.973 | 24.792 | 40 |
| 51 | Suction-Side | 53.538 | 26.301 | 40 |
| 52 | Suction-Side | 54.091 | 27.814 | 40 |
| 53 | Suction-Side | 54.632 | 29.331 | 40 |
| 54 | Suction-Side | 55.158 | 30.852 | 40 |
| 55 | Suction-Side | 55.675 | 32.374 | 40 |
| 56 | Suction-Side | 56.179 | 33.901 | 40 |
| 57 | Suction-Side | 56.672 | 35.429 | 40 |
| 58 | Suction-Side | 57.155 | 36.960 | 40 |
| 59 | Suction-Side | 57.629 | 38.494 | 40 |
| 60 | Suction-Side | 58.092 | 40.030 | 40 |
| 61 | Suction-Side | 58.546 | 41.569 | 40 |
| 62 | Suction-Side | 58.991 | 43.110 | 40 |
| 63 | Suction-Side | 59.427 | 44.653 | 40 |
| 64 | Suction-Side | 59.856 | 46.199 | 40 |
| 65 | Suction-Side | 60.276 | 47.747 | 40 |
| 66 | Suction-Side | 60.688 | 49.296 | 40 |
| 67 | Suction-Side | 61.093 | 50.848 | 40 |
| 68 | Suction-Side | 61.489 | 52.401 | 40 |
| 69 | Suction-Side | 61.881 | 53.956 | 40 |
| 70 | Suction-Side | 62.264 | 55.513 | 40 |
| 71 | Suction-Side | 62.641 | 57.072 | 40 |
| 72 | Suction-Side | 63.012 | 58.632 | 40 |
| 73 | Suction-Side | 63.375 | 60.194 | 40 |
| 74 | Suction-Side | 63.733 | 61.758 | 40 |
| 75 | Suction-Side | 64.084 | 63.322 | 40 |
| 76 | Suction-Side | 64.429 | 64.889 | 40 |
| 77 | Suction-Side | 64.768 | 66.457 | 40 |
| 78 | Suction-Side | 65.102 | 68.027 | 40 |
| 79 | Suction-Side | 65.430 | 69.598 | 40 |
| 80 | Suction-Side | 65.752 | 71.171 | 40 |

TABLE I-continued

| | | Non-dimensionalized (%) | | |
|---|---|---|---|---|
| N | Location | X | Y | Z |
| 81 | Suction-Side | 66.070 | 72.745 | 40 |
| 82 | Suction-Side | 66.381 | 74.319 | 40 |
| 83 | Suction-Side | 66.688 | 75.897 | 40 |
| 84 | Suction-Side | 66.990 | 77.475 | 40 |
| 85 | Suction-Side | 67.286 | 79.054 | 40 |
| 86 | Suction-Side | 67.577 | 80.634 | 40 |
| 87 | Suction-Side | 67.864 | 82.216 | 40 |
| 88 | Suction-Side | 68.145 | 83.799 | 40 |
| 89 | Suction-Side | 68.423 | 85.382 | 40 |
| 90 | Suction-Side | 68.694 | 86.967 | 40 |
| 91 | Suction-Side | 68.962 | 88.553 | 40 |
| 92 | Suction-Side | 69.226 | 90.139 | 40 |
| 93 | Suction-Side | 69.484 | 91.725 | 40 |
| 94 | Suction-Side | 69.738 | 93.313 | 40 |
| 95 | Suction-Side | 69.987 | 94.902 | 40 |
| 96 | Suction-Side | 70.232 | 96.491 | 40 |
| 97 | Suction-Side | 70.472 | 98.080 | 40 |
| 98 | Suction-Side | 70.708 | 99.671 | 40 |
| 99 | Suction-Side | 70.939 | 101.263 | 40 |
| 100 | Suction-Side | 71.168 | 102.853 | 40 |
| 101 | Suction-Side | 71.235 | 103.324 | 40 |
| 102 | Suction-Side | 71.300 | 103.792 | 40 |
| 103 | Suction-Side | 71.365 | 104.263 | 40 |
| 104 | Suction-Side | 71.430 | 104.733 | 40 |
| 105 | Suction-Side | 71.476 | 105.205 | 40 |
| 106 | Suction-Side | 71.466 | 105.683 | 40 |
| 107 | Suction-Side | 71.387 | 106.166 | 40 |
| 108 | Suction-Side | 71.206 | 106.631 | 40 |
| 109 | Suction-Side | 70.825 | 106.920 | 40 |
| 110 | Pressure-Side | −2.163 | −1.779 | 40 |
| 111 | Pressure-Side | −2.070 | −0.482 | 40 |
| 112 | Pressure-Side | −1.718 | 0.770 | 40 |
| 113 | Pressure-Side | −1.148 | 1.939 | 40 |
| 114 | Pressure-Side | −0.407 | 3.009 | 40 |
| 115 | Pressure-Side | 0.464 | 3.976 | 40 |
| 116 | Pressure-Side | 1.433 | 4.846 | 40 |
| 117 | Pressure-Side | 2.481 | 5.617 | 40 |
| 118 | Pressure-Side | 3.586 | 6.306 | 40 |
| 119 | Pressure-Side | 4.717 | 6.954 | 40 |
| 120 | Pressure-Side | 5.844 | 7.606 | 40 |
| 121 | Pressure-Side | 6.959 | 8.279 | 40 |
| 122 | Pressure-Side | 8.058 | 8.977 | 40 |
| 123 | Pressure-Side | 9.146 | 9.695 | 40 |
| 124 | Pressure-Side | 10.222 | 10.429 | 40 |
| 125 | Pressure-Side | 11.284 | 11.182 | 40 |
| 126 | Pressure-Side | 12.334 | 11.952 | 40 |
| 127 | Pressure-Side | 13.372 | 12.739 | 40 |
| 128 | Pressure-Side | 14.397 | 13.542 | 40 |
| 129 | Pressure-Side | 15.409 | 14.361 | 40 |
| 130 | Pressure-Side | 16.409 | 15.197 | 40 |
| 131 | Pressure-Side | 17.397 | 16.045 | 40 |
| 132 | Pressure-Side | 18.373 | 16.907 | 40 |
| 133 | Pressure-Side | 19.336 | 17.784 | 40 |
| 134 | Pressure-Side | 20.289 | 18.673 | 40 |
| 135 | Pressure-Side | 21.228 | 19.574 | 40 |
| 136 | Pressure-Side | 22.157 | 20.488 | 40 |
| 137 | Pressure-Side | 23.074 | 21.412 | 40 |
| 138 | Pressure-Side | 23.980 | 22.348 | 40 |
| 139 | Pressure-Side | 24.874 | 23.293 | 40 |
| 140 | Pressure-Side | 25.758 | 24.250 | 40 |
| 141 | Pressure-Side | 26.630 | 25.218 | 40 |
| 142 | Pressure-Side | 27.494 | 26.193 | 40 |
| 143 | Pressure-Side | 28.345 | 27.178 | 40 |
| 144 | Pressure-Side | 29.187 | 28.172 | 40 |
| 145 | Pressure-Side | 30.019 | 29.173 | 40 |
| 146 | Pressure-Side | 30.840 | 30.184 | 40 |
| 147 | Pressure-Side | 31.653 | 31.203 | 40 |
| 148 | Pressure-Side | 32.454 | 32.228 | 40 |
| 149 | Pressure-Side | 33.248 | 33.263 | 40 |
| 150 | Pressure-Side | 34.031 | 34.303 | 40 |
| 151 | Pressure-Side | 34.806 | 35.349 | 40 |
| 152 | Pressure-Side | 35.571 | 36.402 | 40 |
| 153 | Pressure-Side | 36.330 | 37.462 | 40 |
| 154 | Pressure-Side | 37.077 | 38.528 | 40 |
| 155 | Pressure-Side | 37.818 | 39.600 | 40 |
| 156 | Pressure-Side | 38.549 | 40.677 | 40 |
| 157 | Pressure-Side | 39.273 | 41.760 | 40 |
| 158 | Pressure-Side | 39.988 | 42.848 | 40 |
| 159 | Pressure-Side | 40.696 | 43.941 | 40 |
| 160 | Pressure-Side | 41.397 | 45.039 | 40 |
| 161 | Pressure-Side | 42.088 | 46.143 | 40 |
| 162 | Pressure-Side | 42.773 | 47.250 | 40 |
| 163 | Pressure-Side | 43.451 | 48.363 | 40 |
| 164 | Pressure-Side | 44.122 | 49.478 | 40 |
| 165 | Pressure-Side | 44.785 | 50.600 | 40 |
| 166 | Pressure-Side | 45.443 | 51.725 | 40 |
| 167 | Pressure-Side | 46.093 | 52.853 | 40 |
| 168 | Pressure-Side | 46.735 | 53.985 | 40 |
| 169 | Pressure-Side | 47.372 | 55.121 | 40 |
| 170 | Pressure-Side | 48.002 | 56.261 | 40 |
| 171 | Pressure-Side | 48.625 | 57.405 | 40 |
| 172 | Pressure-Side | 49.243 | 58.552 | 40 |
| 173 | Pressure-Side | 49.854 | 59.701 | 40 |
| 174 | Pressure-Side | 50.459 | 60.854 | 40 |
| 175 | Pressure-Side | 51.060 | 62.010 | 40 |
| 176 | Pressure-Side | 51.654 | 63.169 | 40 |
| 177 | Pressure-Side | 52.241 | 64.332 | 40 |
| 178 | Pressure-Side | 52.823 | 65.497 | 40 |
| 179 | Pressure-Side | 53.400 | 66.665 | 40 |
| 180 | Pressure-Side | 53.971 | 67.834 | 40 |
| 181 | Pressure-Side | 54.538 | 69.008 | 40 |
| 182 | Pressure-Side | 55.097 | 70.183 | 40 |
| 183 | Pressure-Side | 55.654 | 71.361 | 40 |
| 184 | Pressure-Side | 56.204 | 72.542 | 40 |
| 185 | Pressure-Side | 56.749 | 73.724 | 40 |
| 186 | Pressure-Side | 57.289 | 74.908 | 40 |
| 187 | Pressure-Side | 57.825 | 76.097 | 40 |
| 188 | Pressure-Side | 58.356 | 77.285 | 40 |
| 189 | Pressure-Side | 58.882 | 78.477 | 40 |
| 190 | Pressure-Side | 59.403 | 79.670 | 40 |
| 191 | Pressure-Side | 59.920 | 80.866 | 40 |
| 192 | Pressure-Side | 60.433 | 82.063 | 40 |
| 193 | Pressure-Side | 60.940 | 83.262 | 40 |
| 194 | Pressure-Side | 61.443 | 84.464 | 40 |
| 195 | Pressure-Side | 61.942 | 85.667 | 40 |
| 196 | Pressure-Side | 62.437 | 86.872 | 40 |
| 197 | Pressure-Side | 62.929 | 88.078 | 40 |
| 198 | Pressure-Side | 63.415 | 89.286 | 40 |
| 199 | Pressure-Side | 63.898 | 90.495 | 40 |
| 200 | Pressure-Side | 64.377 | 91.706 | 40 |
| 201 | Pressure-Side | 64.852 | 92.920 | 40 |
| 202 | Pressure-Side | 65.322 | 94.133 | 40 |
| 203 | Pressure-Side | 65.789 | 95.350 | 40 |
| 204 | Pressure-Side | 66.252 | 96.567 | 40 |
| 205 | Pressure-Side | 66.711 | 97.785 | 40 |
| 206 | Pressure-Side | 67.166 | 99.006 | 40 |
| 207 | Pressure-Side | 67.619 | 100.227 | 40 |
| 208 | Pressure-Side | 68.068 | 101.450 | 40 |
| 209 | Pressure-Side | 68.513 | 102.672 | 40 |
| 210 | Pressure-Side | 68.702 | 103.196 | 40 |
| 211 | Pressure-Side | 68.890 | 103.718 | 40 |
| 212 | Pressure-Side | 69.076 | 104.242 | 40 |
| 213 | Pressure-Side | 69.261 | 104.764 | 40 |
| 214 | Pressure-Side | 69.451 | 105.287 | 40 |
| 215 | Pressure-Side | 69.671 | 105.797 | 40 |
| 216 | Pressure-Side | 69.959 | 106.270 | 40 |
| 217 | Pressure-Side | 70.333 | 106.684 | 40 |
| 218 | Pressure-Side | 70.825 | 106.920 | 40 |
| 1 | Suction-Side | −2.703 | −2.224 | 50 |
| 2 | Suction-Side | −2.438 | −3.865 | 50 |
| 3 | Suction-Side | −1.783 | −5.393 | 50 |
| 4 | Suction-Side | −0.835 | −6.755 | 50 |
| 5 | Suction-Side | 0.319 | −7.948 | 50 |
| 6 | Suction-Side | 1.619 | −8.980 | 50 |
| 7 | Suction-Side | 3.012 | −9.862 | 50 |
| 8 | Suction-Side | 4.487 | −10.618 | 50 |
| 9 | Suction-Side | 6.017 | −11.257 | 50 |
| 10 | Suction-Side | 7.577 | −11.784 | 50 |
| 11 | Suction-Side | 9.164 | −12.211 | 50 |
| 12 | Suction-Side | 10.773 | −12.545 | 50 |
| 13 | Suction-Side | 12.406 | −12.793 | 50 |
| 14 | Suction-Side | 14.054 | −12.956 | 50 |

TABLE I-continued

| | | Non-dimensionalized (%) | | |
|---|---|---|---|---|
| N | Location | X | Y | Z |
| 15 | Suction-Side | 15.701 | −13.033 | 50 |
| 16 | Suction-Side | 17.344 | −13.021 | 50 |
| 17 | Suction-Side | 18.982 | −12.916 | 50 |
| 18 | Suction-Side | 20.614 | −12.711 | 50 |
| 19 | Suction-Side | 22.241 | −12.400 | 50 |
| 20 | Suction-Side | 23.844 | −11.984 | 50 |
| 21 | Suction-Side | 25.402 | −11.469 | 50 |
| 22 | Suction-Side | 26.918 | −10.857 | 50 |
| 23 | Suction-Side | 28.393 | −10.149 | 50 |
| 24 | Suction-Side | 29.829 | −9.349 | 50 |
| 25 | Suction-Side | 31.225 | −8.459 | 50 |
| 26 | Suction-Side | 32.568 | −7.496 | 50 |
| 27 | Suction-Side | 33.852 | −6.471 | 50 |
| 28 | Suction-Side | 35.082 | −5.387 | 50 |
| 29 | Suction-Side | 36.261 | −4.251 | 50 |
| 30 | Suction-Side | 37.395 | −3.067 | 50 |
| 31 | Suction-Side | 38.485 | −1.837 | 50 |
| 32 | Suction-Side | 39.537 | −0.567 | 50 |
| 33 | Suction-Side | 40.548 | 0.737 | 50 |
| 34 | Suction-Side | 41.515 | 2.065 | 50 |
| 35 | Suction-Side | 42.443 | 3.413 | 50 |
| 36 | Suction-Side | 43.334 | 4.781 | 50 |
| 37 | Suction-Side | 44.193 | 6.165 | 50 |
| 38 | Suction-Side | 45.023 | 7.566 | 50 |
| 39 | Suction-Side | 45.824 | 8.981 | 50 |
| 40 | Suction-Side | 46.599 | 10.410 | 50 |
| 41 | Suction-Side | 47.349 | 11.852 | 50 |
| 42 | Suction-Side | 48.076 | 13.306 | 50 |
| 43 | Suction-Side | 48.783 | 14.772 | 50 |
| 44 | Suction-Side | 49.470 | 16.247 | 50 |
| 45 | Suction-Side | 50.139 | 17.734 | 50 |
| 46 | Suction-Side | 50.789 | 19.229 | 50 |
| 47 | Suction-Side | 51.422 | 20.732 | 50 |
| 48 | Suction-Side | 52.041 | 22.246 | 50 |
| 49 | Suction-Side | 52.643 | 23.767 | 50 |
| 50 | Suction-Side | 53.231 | 25.293 | 50 |
| 51 | Suction-Side | 53.805 | 26.826 | 50 |
| 52 | Suction-Side | 54.364 | 28.363 | 50 |
| 53 | Suction-Side | 54.910 | 29.903 | 50 |
| 54 | Suction-Side | 55.443 | 31.448 | 50 |
| 55 | Suction-Side | 55.964 | 32.994 | 50 |
| 56 | Suction-Side | 56.471 | 34.543 | 50 |
| 57 | Suction-Side | 56.968 | 36.097 | 50 |
| 58 | Suction-Side | 57.455 | 37.652 | 50 |
| 59 | Suction-Side | 57.931 | 39.209 | 50 |
| 60 | Suction-Side | 58.397 | 40.770 | 50 |
| 61 | Suction-Side | 58.853 | 42.334 | 50 |
| 62 | Suction-Side | 59.299 | 43.900 | 50 |
| 63 | Suction-Side | 59.737 | 45.468 | 50 |
| 64 | Suction-Side | 60.166 | 47.038 | 50 |
| 65 | Suction-Side | 60.586 | 48.609 | 50 |
| 66 | Suction-Side | 60.997 | 50.185 | 50 |
| 67 | Suction-Side | 61.402 | 51.760 | 50 |
| 68 | Suction-Side | 61.798 | 53.339 | 50 |
| 69 | Suction-Side | 62.187 | 54.919 | 50 |
| 70 | Suction-Side | 62.568 | 56.501 | 50 |
| 71 | Suction-Side | 62.942 | 58.086 | 50 |
| 72 | Suction-Side | 63.310 | 59.672 | 50 |
| 73 | Suction-Side | 63.670 | 61.258 | 50 |
| 74 | Suction-Side | 64.025 | 62.848 | 50 |
| 75 | Suction-Side | 64.372 | 64.439 | 50 |
| 76 | Suction-Side | 64.715 | 66.031 | 50 |
| 77 | Suction-Side | 65.050 | 67.625 | 50 |
| 78 | Suction-Side | 65.378 | 69.221 | 50 |
| 79 | Suction-Side | 65.702 | 70.818 | 50 |
| 80 | Suction-Side | 66.019 | 72.416 | 50 |
| 81 | Suction-Side | 66.332 | 74.017 | 50 |
| 82 | Suction-Side | 66.638 | 75.618 | 50 |
| 83 | Suction-Side | 66.939 | 77.220 | 50 |
| 84 | Suction-Side | 67.234 | 78.824 | 50 |
| 85 | Suction-Side | 67.524 | 80.429 | 50 |
| 86 | Suction-Side | 67.810 | 82.036 | 50 |
| 87 | Suction-Side | 68.089 | 83.645 | 50 |
| 88 | Suction-Side | 68.365 | 85.255 | 50 |
| 89 | Suction-Side | 68.635 | 86.864 | 50 |
| 90 | Suction-Side | 68.899 | 88.474 | 50 |
| 91 | Suction-Side | 69.160 | 90.086 | 50 |
| 92 | Suction-Side | 69.416 | 91.698 | 50 |
| 93 | Suction-Side | 69.666 | 93.311 | 50 |
| 94 | Suction-Side | 69.913 | 94.926 | 50 |
| 95 | Suction-Side | 70.154 | 96.540 | 50 |
| 96 | Suction-Side | 70.392 | 98.154 | 50 |
| 97 | Suction-Side | 70.625 | 99.770 | 50 |
| 98 | Suction-Side | 70.853 | 101.387 | 50 |
| 99 | Suction-Side | 71.076 | 103.005 | 50 |
| 100 | Suction-Side | 71.295 | 104.622 | 50 |
| 101 | Suction-Side | 71.359 | 105.091 | 50 |
| 102 | Suction-Side | 71.422 | 105.560 | 50 |
| 103 | Suction-Side | 71.484 | 106.028 | 50 |
| 104 | Suction-Side | 71.546 | 106.497 | 50 |
| 105 | Suction-Side | 71.589 | 106.968 | 50 |
| 106 | Suction-Side | 71.579 | 107.444 | 50 |
| 107 | Suction-Side | 71.503 | 107.926 | 50 |
| 108 | Suction-Side | 71.331 | 108.392 | 50 |
| 109 | Suction-Side | 70.966 | 108.708 | 50 |
| 110 | Pressure-Side | −2.703 | −2.224 | 50 |
| 111 | Pressure-Side | −2.607 | −0.902 | 50 |
| 112 | Pressure-Side | −2.243 | 0.372 | 50 |
| 113 | Pressure-Side | −1.656 | 1.561 | 50 |
| 114 | Pressure-Side | −0.892 | 2.646 | 50 |
| 115 | Pressure-Side | 0.003 | 3.625 | 50 |
| 116 | Pressure-Side | 0.999 | 4.502 | 50 |
| 117 | Pressure-Side | 2.076 | 5.276 | 50 |
| 118 | Pressure-Side | 3.206 | 5.971 | 50 |
| 119 | Pressure-Side | 4.356 | 6.634 | 50 |
| 120 | Pressure-Side | 5.497 | 7.312 | 50 |
| 121 | Pressure-Side | 6.626 | 8.011 | 50 |
| 122 | Pressure-Side | 7.739 | 8.732 | 50 |
| 123 | Pressure-Side | 8.840 | 9.474 | 50 |
| 124 | Pressure-Side | 9.929 | 10.233 | 50 |
| 125 | Pressure-Side | 11.003 | 11.012 | 50 |
| 126 | Pressure-Side | 12.066 | 11.808 | 50 |
| 127 | Pressure-Side | 13.115 | 12.621 | 50 |
| 128 | Pressure-Side | 14.152 | 13.449 | 50 |
| 129 | Pressure-Side | 15.176 | 14.294 | 50 |
| 130 | Pressure-Side | 16.186 | 15.155 | 50 |
| 131 | Pressure-Side | 17.185 | 16.029 | 50 |
| 132 | Pressure-Side | 18.170 | 16.918 | 50 |
| 133 | Pressure-Side | 19.143 | 17.820 | 50 |
| 134 | Pressure-Side | 20.105 | 18.735 | 50 |
| 135 | Pressure-Side | 21.054 | 19.663 | 50 |
| 136 | Pressure-Side | 21.992 | 20.602 | 50 |
| 137 | Pressure-Side | 22.918 | 21.553 | 50 |
| 138 | Pressure-Side | 23.832 | 22.514 | 50 |
| 139 | Pressure-Side | 24.736 | 23.488 | 50 |
| 140 | Pressure-Side | 25.627 | 24.470 | 50 |
| 141 | Pressure-Side | 26.507 | 25.464 | 50 |
| 142 | Pressure-Side | 27.378 | 26.466 | 50 |
| 143 | Pressure-Side | 28.237 | 27.477 | 50 |
| 144 | Pressure-Side | 29.086 | 28.497 | 50 |
| 145 | Pressure-Side | 29.926 | 29.525 | 50 |
| 146 | Pressure-Side | 30.754 | 30.562 | 50 |
| 147 | Pressure-Side | 31.573 | 31.607 | 50 |
| 148 | Pressure-Side | 32.381 | 32.659 | 50 |
| 149 | Pressure-Side | 33.181 | 33.718 | 50 |
| 150 | Pressure-Side | 33.972 | 34.785 | 50 |
| 151 | Pressure-Side | 34.752 | 35.858 | 50 |
| 152 | Pressure-Side | 35.525 | 36.938 | 50 |
| 153 | Pressure-Side | 36.288 | 38.022 | 50 |
| 154 | Pressure-Side | 37.042 | 39.115 | 50 |
| 155 | Pressure-Side | 37.788 | 40.212 | 50 |
| 156 | Pressure-Side | 38.525 | 41.316 | 50 |
| 157 | Pressure-Side | 39.255 | 42.425 | 50 |
| 158 | Pressure-Side | 39.977 | 43.539 | 50 |
| 159 | Pressure-Side | 40.689 | 44.659 | 50 |
| 160 | Pressure-Side | 41.395 | 45.782 | 50 |
| 161 | Pressure-Side | 42.092 | 46.912 | 50 |
| 162 | Pressure-Side | 42.784 | 48.045 | 50 |
| 163 | Pressure-Side | 43.466 | 49.183 | 50 |
| 164 | Pressure-Side | 44.141 | 50.326 | 50 |
| 165 | Pressure-Side | 44.811 | 51.473 | 50 |
| 166 | Pressure-Side | 45.472 | 52.623 | 50 |

TABLE I-continued

| | | Non-dimensionalized (%) | | |
|---|---|---|---|---|
| N | Location | X | Y | Z |
| 167 | Pressure-Side | 46.127 | 53.777 | 50 |
| 168 | Pressure-Side | 46.775 | 54.936 | 50 |
| 169 | Pressure-Side | 47.416 | 56.097 | 50 |
| 170 | Pressure-Side | 48.051 | 57.264 | 50 |
| 171 | Pressure-Side | 48.680 | 58.431 | 50 |
| 172 | Pressure-Side | 49.302 | 59.605 | 50 |
| 173 | Pressure-Side | 49.918 | 60.780 | 50 |
| 174 | Pressure-Side | 50.527 | 61.958 | 50 |
| 175 | Pressure-Side | 51.131 | 63.141 | 50 |
| 176 | Pressure-Side | 51.731 | 64.325 | 50 |
| 177 | Pressure-Side | 52.323 | 65.513 | 50 |
| 178 | Pressure-Side | 52.909 | 66.703 | 50 |
| 179 | Pressure-Side | 53.491 | 67.896 | 50 |
| 180 | Pressure-Side | 54.066 | 69.092 | 50 |
| 181 | Pressure-Side | 54.636 | 70.291 | 50 |
| 182 | Pressure-Side | 55.201 | 71.493 | 50 |
| 183 | Pressure-Side | 55.761 | 72.696 | 50 |
| 184 | Pressure-Side | 56.314 | 73.901 | 50 |
| 185 | Pressure-Side | 56.865 | 75.110 | 50 |
| 186 | Pressure-Side | 57.409 | 76.321 | 50 |
| 187 | Pressure-Side | 57.948 | 77.533 | 50 |
| 188 | Pressure-Side | 58.483 | 78.748 | 50 |
| 189 | Pressure-Side | 59.013 | 79.965 | 50 |
| 190 | Pressure-Side | 59.538 | 81.183 | 50 |
| 191 | Pressure-Side | 60.059 | 82.404 | 50 |
| 192 | Pressure-Side | 60.575 | 83.627 | 50 |
| 193 | Pressure-Side | 61.087 | 84.851 | 50 |
| 194 | Pressure-Side | 61.593 | 86.078 | 50 |
| 195 | Pressure-Side | 62.096 | 87.307 | 50 |
| 196 | Pressure-Side | 62.595 | 88.537 | 50 |
| 197 | Pressure-Side | 63.090 | 89.768 | 50 |
| 198 | Pressure-Side | 63.580 | 91.001 | 50 |
| 199 | Pressure-Side | 64.067 | 92.236 | 50 |
| 200 | Pressure-Side | 64.549 | 93.473 | 50 |
| 201 | Pressure-Side | 65.028 | 94.710 | 50 |
| 202 | Pressure-Side | 65.503 | 95.949 | 50 |
| 203 | Pressure-Side | 65.973 | 97.191 | 50 |
| 204 | Pressure-Side | 66.439 | 98.433 | 50 |
| 205 | Pressure-Side | 66.901 | 99.678 | 50 |
| 206 | Pressure-Side | 67.361 | 100.923 | 50 |
| 207 | Pressure-Side | 67.816 | 102.169 | 50 |
| 208 | Pressure-Side | 68.269 | 103.417 | 50 |
| 209 | Pressure-Side | 68.718 | 104.666 | 50 |
| 210 | Pressure-Side | 68.896 | 105.169 | 50 |
| 211 | Pressure-Side | 69.074 | 105.671 | 50 |
| 212 | Pressure-Side | 69.251 | 106.174 | 50 |
| 213 | Pressure-Side | 69.427 | 106.677 | 50 |
| 214 | Pressure-Side | 69.613 | 107.178 | 50 |
| 215 | Pressure-Side | 69.831 | 107.664 | 50 |
| 216 | Pressure-Side | 70.119 | 108.112 | 50 |
| 217 | Pressure-Side | 70.485 | 108.502 | 50 |
| 218 | Pressure-Side | 70.966 | 108.708 | 50 |
| 1 | Suction-Side | −3.242 | −2.668 | 60 |
| 2 | Suction-Side | −2.972 | −4.327 | 60 |
| 3 | Suction-Side | −2.306 | −5.870 | 60 |
| 4 | Suction-Side | −1.343 | −7.244 | 60 |
| 5 | Suction-Side | −0.171 | −8.445 | 60 |
| 6 | Suction-Side | 1.148 | −9.481 | 60 |
| 7 | Suction-Side | 2.561 | −10.365 | 60 |
| 8 | Suction-Side | 4.057 | −11.121 | 60 |
| 9 | Suction-Side | 5.607 | −11.756 | 60 |
| 10 | Suction-Side | 7.187 | −12.278 | 60 |
| 11 | Suction-Side | 8.794 | −12.699 | 60 |
| 12 | Suction-Side | 10.423 | −13.029 | 60 |
| 13 | Suction-Side | 12.076 | −13.268 | 60 |
| 14 | Suction-Side | 13.744 | −13.418 | 60 |
| 15 | Suction-Side | 15.407 | −13.475 | 60 |
| 16 | Suction-Side | 17.066 | −13.438 | 60 |
| 17 | Suction-Side | 18.719 | −13.300 | 60 |
| 18 | Suction-Side | 20.364 | −13.057 | 60 |
| 19 | Suction-Side | 22.004 | −12.704 | 60 |
| 20 | Suction-Side | 23.611 | −12.247 | 60 |
| 21 | Suction-Side | 25.173 | −11.689 | 60 |
| 22 | Suction-Side | 26.694 | −11.036 | 60 |
| 23 | Suction-Side | 28.175 | −10.288 | 60 |
| 24 | Suction-Side | 29.617 | −9.450 | 60 |

TABLE I-continued

| | | Non-dimensionalized (%) | | |
|---|---|---|---|---|
| N | Location | X | Y | Z |
| 25 | Suction-Side | 31.016 | −8.529 | 60 |
| 26 | Suction-Side | 32.356 | −7.540 | 60 |
| 27 | Suction-Side | 33.642 | −6.493 | 60 |
| 28 | Suction-Side | 34.875 | −5.389 | 60 |
| 29 | Suction-Side | 36.062 | −4.235 | 60 |
| 30 | Suction-Side | 37.205 | −3.033 | 60 |
| 31 | Suction-Side | 38.306 | −1.788 | 60 |
| 32 | Suction-Side | 39.370 | −0.502 | 60 |
| 33 | Suction-Side | 40.393 | 0.815 | 60 |
| 34 | Suction-Side | 41.374 | 2.153 | 60 |
| 35 | Suction-Side | 42.318 | 3.515 | 60 |
| 36 | Suction-Side | 43.226 | 4.896 | 60 |
| 37 | Suction-Side | 44.101 | 6.297 | 60 |
| 38 | Suction-Side | 44.947 | 7.713 | 60 |
| 39 | Suction-Side | 45.766 | 9.146 | 60 |
| 40 | Suction-Side | 46.560 | 10.592 | 60 |
| 41 | Suction-Side | 47.329 | 12.054 | 60 |
| 42 | Suction-Side | 48.073 | 13.529 | 60 |
| 43 | Suction-Side | 48.797 | 15.016 | 60 |
| 44 | Suction-Side | 49.501 | 16.514 | 60 |
| 45 | Suction-Side | 50.186 | 18.023 | 60 |
| 46 | Suction-Side | 50.852 | 19.542 | 60 |
| 47 | Suction-Side | 51.502 | 21.071 | 60 |
| 48 | Suction-Side | 52.133 | 22.603 | 60 |
| 49 | Suction-Side | 52.746 | 24.142 | 60 |
| 50 | Suction-Side | 53.344 | 25.685 | 60 |
| 51 | Suction-Side | 53.925 | 27.231 | 60 |
| 52 | Suction-Side | 54.492 | 28.782 | 60 |
| 53 | Suction-Side | 55.045 | 30.337 | 60 |
| 54 | Suction-Side | 55.584 | 31.895 | 60 |
| 55 | Suction-Side | 56.111 | 33.457 | 60 |
| 56 | Suction-Side | 56.626 | 35.022 | 60 |
| 57 | Suction-Side | 57.129 | 36.591 | 60 |
| 58 | Suction-Side | 57.620 | 38.162 | 60 |
| 59 | Suction-Side | 58.101 | 39.736 | 60 |
| 60 | Suction-Side | 58.569 | 41.313 | 60 |
| 61 | Suction-Side | 59.029 | 42.894 | 60 |
| 62 | Suction-Side | 59.479 | 44.477 | 60 |
| 63 | Suction-Side | 59.920 | 46.061 | 60 |
| 64 | Suction-Side | 60.351 | 47.649 | 60 |
| 65 | Suction-Side | 60.774 | 49.240 | 60 |
| 66 | Suction-Side | 61.188 | 50.832 | 60 |
| 67 | Suction-Side | 61.593 | 52.427 | 60 |
| 68 | Suction-Side | 61.991 | 54.025 | 60 |
| 69 | Suction-Side | 62.380 | 55.623 | 60 |
| 70 | Suction-Side | 62.762 | 57.225 | 60 |
| 71 | Suction-Side | 63.138 | 58.828 | 60 |
| 72 | Suction-Side | 63.504 | 60.433 | 60 |
| 73 | Suction-Side | 63.866 | 62.040 | 60 |
| 74 | Suction-Side | 64.219 | 63.648 | 60 |
| 75 | Suction-Side | 64.567 | 65.260 | 60 |
| 76 | Suction-Side | 64.906 | 66.871 | 60 |
| 77 | Suction-Side | 65.242 | 68.485 | 60 |
| 78 | Suction-Side | 65.570 | 70.101 | 60 |
| 79 | Suction-Side | 65.892 | 71.720 | 60 |
| 80 | Suction-Side | 66.206 | 73.339 | 60 |
| 81 | Suction-Side | 66.516 | 74.959 | 60 |
| 82 | Suction-Side | 66.820 | 76.582 | 60 |
| 83 | Suction-Side | 67.120 | 78.205 | 60 |
| 84 | Suction-Side | 67.412 | 79.831 | 60 |
| 85 | Suction-Side | 67.700 | 81.458 | 60 |
| 86 | Suction-Side | 67.984 | 83.085 | 60 |
| 87 | Suction-Side | 68.261 | 84.714 | 60 |
| 88 | Suction-Side | 68.533 | 86.344 | 60 |
| 89 | Suction-Side | 68.800 | 87.973 | 60 |
| 90 | Suction-Side | 69.062 | 89.605 | 60 |
| 91 | Suction-Side | 69.321 | 91.236 | 60 |
| 92 | Suction-Side | 69.573 | 92.869 | 60 |
| 93 | Suction-Side | 69.821 | 94.501 | 60 |
| 94 | Suction-Side | 70.064 | 96.136 | 60 |
| 95 | Suction-Side | 70.303 | 97.770 | 60 |
| 96 | Suction-Side | 70.537 | 99.407 | 60 |
| 97 | Suction-Side | 70.767 | 101.042 | 60 |
| 98 | Suction-Side | 70.994 | 102.678 | 60 |
| 99 | Suction-Side | 71.215 | 104.316 | 60 |
| 100 | Suction-Side | 71.432 | 105.953 | 60 |

TABLE I-continued

| | | Non-dimensionalized (%) | | |
|---|---|---|---|---|
| N | Location | X | Y | Z |
| 101 | Suction-Side | 71.499 | 106.462 | 60 |
| 102 | Suction-Side | 71.565 | 106.971 | 60 |
| 103 | Suction-Side | 71.631 | 107.480 | 60 |
| 104 | Suction-Side | 71.696 | 107.988 | 60 |
| 105 | Suction-Side | 71.757 | 108.497 | 60 |
| 106 | Suction-Side | 71.770 | 109.011 | 60 |
| 107 | Suction-Side | 71.711 | 109.527 | 60 |
| 108 | Suction-Side | 71.555 | 110.038 | 60 |
| 109 | Suction-Side | 71.209 | 110.435 | 60 |
| 110 | Pressure-Side | −3.242 | −2.668 | 60 |
| 111 | Pressure-Side | −3.141 | −1.319 | 60 |
| 112 | Pressure-Side | −2.764 | −0.019 | 60 |
| 113 | Pressure-Side | −2.156 | 1.188 | 60 |
| 114 | Pressure-Side | −1.367 | 2.289 | 60 |
| 115 | Pressure-Side | −0.442 | 3.279 | 60 |
| 116 | Pressure-Side | 0.582 | 4.166 | 60 |
| 117 | Pressure-Side | 1.690 | 4.945 | 60 |
| 118 | Pressure-Side | 2.849 | 5.647 | 60 |
| 119 | Pressure-Side | 4.016 | 6.336 | 60 |
| 120 | Pressure-Side | 5.172 | 7.040 | 60 |
| 121 | Pressure-Side | 6.315 | 7.769 | 60 |
| 122 | Pressure-Side | 7.442 | 8.520 | 60 |
| 123 | Pressure-Side | 8.558 | 9.288 | 60 |
| 124 | Pressure-Side | 9.661 | 10.078 | 60 |
| 125 | Pressure-Side | 10.750 | 10.883 | 60 |
| 126 | Pressure-Side | 11.824 | 11.708 | 60 |
| 127 | Pressure-Side | 12.886 | 12.548 | 60 |
| 128 | Pressure-Side | 13.935 | 13.406 | 60 |
| 129 | Pressure-Side | 14.971 | 14.280 | 60 |
| 130 | Pressure-Side | 15.995 | 15.168 | 60 |
| 131 | Pressure-Side | 17.005 | 16.070 | 60 |
| 132 | Pressure-Side | 18.002 | 16.987 | 60 |
| 133 | Pressure-Side | 18.987 | 17.919 | 60 |
| 134 | Pressure-Side | 19.959 | 18.861 | 60 |
| 135 | Pressure-Side | 20.921 | 19.817 | 60 |
| 136 | Pressure-Side | 21.869 | 20.786 | 60 |
| 137 | Pressure-Side | 22.805 | 21.765 | 60 |
| 138 | Pressure-Side | 23.730 | 22.755 | 60 |
| 139 | Pressure-Side | 24.644 | 23.756 | 60 |
| 140 | Pressure-Side | 25.546 | 24.767 | 60 |
| 141 | Pressure-Side | 26.436 | 25.787 | 60 |
| 142 | Pressure-Side | 27.316 | 26.817 | 60 |
| 143 | Pressure-Side | 28.185 | 27.857 | 60 |
| 144 | Pressure-Side | 29.044 | 28.905 | 60 |
| 145 | Pressure-Side | 29.892 | 29.961 | 60 |
| 146 | Pressure-Side | 30.730 | 31.027 | 60 |
| 147 | Pressure-Side | 31.558 | 32.099 | 60 |
| 148 | Pressure-Side | 32.377 | 33.180 | 60 |
| 149 | Pressure-Side | 33.185 | 34.266 | 60 |
| 150 | Pressure-Side | 33.984 | 35.361 | 60 |
| 151 | Pressure-Side | 34.773 | 36.462 | 60 |
| 152 | Pressure-Side | 35.555 | 37.568 | 60 |
| 153 | Pressure-Side | 36.327 | 38.683 | 60 |
| 154 | Pressure-Side | 37.089 | 39.803 | 60 |
| 155 | Pressure-Side | 37.843 | 40.928 | 60 |
| 156 | Pressure-Side | 38.589 | 42.060 | 60 |
| 157 | Pressure-Side | 39.325 | 43.196 | 60 |
| 158 | Pressure-Side | 40.055 | 44.339 | 60 |
| 159 | Pressure-Side | 40.776 | 45.486 | 60 |
| 160 | Pressure-Side | 41.488 | 46.637 | 60 |
| 161 | Pressure-Side | 42.195 | 47.794 | 60 |
| 162 | Pressure-Side | 42.892 | 48.956 | 60 |
| 163 | Pressure-Side | 43.582 | 50.121 | 60 |
| 164 | Pressure-Side | 44.266 | 51.292 | 60 |
| 165 | Pressure-Side | 44.941 | 52.467 | 60 |
| 166 | Pressure-Side | 45.610 | 53.645 | 60 |
| 167 | Pressure-Side | 46.272 | 54.827 | 60 |
| 168 | Pressure-Side | 46.926 | 56.013 | 60 |
| 169 | Pressure-Side | 47.575 | 57.203 | 60 |
| 170 | Pressure-Side | 48.216 | 58.397 | 60 |
| 171 | Pressure-Side | 48.851 | 59.593 | 60 |
| 172 | Pressure-Side | 49.480 | 60.794 | 60 |
| 173 | Pressure-Side | 50.102 | 61.997 | 60 |
| 174 | Pressure-Side | 50.717 | 63.205 | 60 |
| 175 | Pressure-Side | 51.329 | 64.414 | 60 |
| 176 | Pressure-Side | 51.933 | 65.626 | 60 |
| 177 | Pressure-Side | 52.531 | 66.843 | 60 |
| 178 | Pressure-Side | 53.123 | 68.061 | 60 |
| 179 | Pressure-Side | 53.710 | 69.282 | 60 |
| 180 | Pressure-Side | 54.292 | 70.506 | 60 |
| 181 | Pressure-Side | 54.867 | 71.732 | 60 |
| 182 | Pressure-Side | 55.437 | 72.962 | 60 |
| 183 | Pressure-Side | 56.002 | 74.193 | 60 |
| 184 | Pressure-Side | 56.562 | 75.426 | 60 |
| 185 | Pressure-Side | 57.117 | 76.662 | 60 |
| 186 | Pressure-Side | 57.667 | 77.901 | 60 |
| 187 | Pressure-Side | 58.212 | 79.142 | 60 |
| 188 | Pressure-Side | 58.750 | 80.385 | 60 |
| 189 | Pressure-Side | 59.286 | 81.630 | 60 |
| 190 | Pressure-Side | 59.816 | 82.876 | 60 |
| 191 | Pressure-Side | 60.342 | 84.125 | 60 |
| 192 | Pressure-Side | 60.863 | 85.376 | 60 |
| 193 | Pressure-Side | 61.380 | 86.628 | 60 |
| 194 | Pressure-Side | 61.891 | 87.882 | 60 |
| 195 | Pressure-Side | 62.399 | 89.139 | 60 |
| 196 | Pressure-Side | 62.902 | 90.397 | 60 |
| 197 | Pressure-Side | 63.402 | 91.657 | 60 |
| 198 | Pressure-Side | 63.896 | 92.918 | 60 |
| 199 | Pressure-Side | 64.387 | 94.181 | 60 |
| 200 | Pressure-Side | 64.874 | 95.445 | 60 |
| 201 | Pressure-Side | 65.358 | 96.711 | 60 |
| 202 | Pressure-Side | 65.837 | 97.979 | 60 |
| 203 | Pressure-Side | 66.310 | 99.248 | 60 |
| 204 | Pressure-Side | 66.780 | 100.518 | 60 |
| 205 | Pressure-Side | 67.248 | 101.791 | 60 |
| 206 | Pressure-Side | 67.711 | 103.064 | 60 |
| 207 | Pressure-Side | 68.171 | 104.338 | 60 |
| 208 | Pressure-Side | 68.629 | 105.613 | 60 |
| 209 | Pressure-Side | 69.080 | 106.891 | 60 |
| 210 | Pressure-Side | 69.239 | 107.346 | 60 |
| 211 | Pressure-Side | 69.398 | 107.803 | 60 |
| 212 | Pressure-Side | 69.557 | 108.259 | 60 |
| 213 | Pressure-Side | 69.720 | 108.713 | 60 |
| 214 | Pressure-Side | 69.899 | 109.161 | 60 |
| 215 | Pressure-Side | 70.119 | 109.589 | 60 |
| 216 | Pressure-Side | 70.405 | 109.980 | 60 |
| 217 | Pressure-Side | 70.757 | 110.308 | 60 |
| 218 | Pressure-Side | 71.209 | 110.435 | 60 |
| 1 | Suction-Side | −3.779 | −3.113 | 70 |
| 2 | Suction-Side | −3.512 | −4.763 | 70 |
| 3 | Suction-Side | −2.853 | −6.301 | 70 |
| 4 | Suction-Side | −1.898 | −7.675 | 70 |
| 5 | Suction-Side | −0.731 | −8.879 | 70 |
| 6 | Suction-Side | 0.583 | −9.917 | 70 |
| 7 | Suction-Side | 2.002 | −10.809 | 70 |
| 8 | Suction-Side | 3.497 | −11.567 | 70 |
| 9 | Suction-Side | 5.048 | −12.204 | 70 |
| 10 | Suction-Side | 6.638 | −12.731 | 70 |
| 11 | Suction-Side | 8.260 | −13.158 | 70 |
| 12 | Suction-Side | 9.903 | −13.489 | 70 |
| 13 | Suction-Side | 11.561 | −13.728 | 70 |
| 14 | Suction-Side | 13.232 | −13.872 | 70 |
| 15 | Suction-Side | 14.907 | −13.915 | 70 |
| 16 | Suction-Side | 16.582 | −13.855 | 70 |
| 17 | Suction-Side | 18.250 | −13.688 | 70 |
| 18 | Suction-Side | 19.904 | −13.410 | 70 |
| 19 | Suction-Side | 21.535 | −13.023 | 70 |
| 20 | Suction-Side | 23.136 | −12.530 | 70 |
| 21 | Suction-Side | 24.703 | −11.935 | 70 |
| 22 | Suction-Side | 26.230 | −11.242 | 70 |
| 23 | Suction-Side | 27.713 | −10.460 | 70 |
| 24 | Suction-Side | 29.148 | −9.595 | 70 |
| 25 | Suction-Side | 30.537 | −8.655 | 70 |
| 26 | Suction-Side | 31.875 | −7.647 | 70 |
| 27 | Suction-Side | 33.168 | −6.579 | 70 |
| 28 | Suction-Side | 34.411 | −5.454 | 70 |
| 29 | Suction-Side | 35.610 | −4.282 | 70 |
| 30 | Suction-Side | 36.763 | −3.067 | 70 |
| 31 | Suction-Side | 37.874 | −1.812 | 70 |
| 32 | Suction-Side | 38.947 | −0.522 | 70 |
| 33 | Suction-Side | 39.980 | 0.797 | 70 |
| 34 | Suction-Side | 40.977 | 2.145 | 70 |

TABLE I-continued

Non-dimensionalized (%)

| N | Location | X | Y | Z |
|---|---|---|---|---|
| 35 | Suction-Side | 41.940 | 3.518 | 70 |
| 36 | Suction-Side | 42.868 | 4.913 | 70 |
| 37 | Suction-Side | 43.768 | 6.328 | 70 |
| 38 | Suction-Side | 44.637 | 7.761 | 70 |
| 39 | Suction-Side | 45.478 | 9.211 | 70 |
| 40 | Suction-Side | 46.294 | 10.676 | 70 |
| 41 | Suction-Side | 47.085 | 12.155 | 70 |
| 42 | Suction-Side | 47.851 | 13.645 | 70 |
| 43 | Suction-Side | 48.596 | 15.148 | 70 |
| 44 | Suction-Side | 49.318 | 16.659 | 70 |
| 45 | Suction-Side | 50.020 | 18.182 | 70 |
| 46 | Suction-Side | 50.703 | 19.713 | 70 |
| 47 | Suction-Side | 51.367 | 21.252 | 70 |
| 48 | Suction-Side | 52.014 | 22.799 | 70 |
| 49 | Suction-Side | 52.643 | 24.353 | 70 |
| 50 | Suction-Side | 53.258 | 25.914 | 70 |
| 51 | Suction-Side | 53.856 | 27.479 | 70 |
| 52 | Suction-Side | 54.437 | 29.052 | 70 |
| 53 | Suction-Side | 55.005 | 30.629 | 70 |
| 54 | Suction-Side | 55.560 | 32.211 | 70 |
| 55 | Suction-Side | 56.102 | 33.797 | 70 |
| 56 | Suction-Side | 56.632 | 35.387 | 70 |
| 57 | Suction-Side | 57.148 | 36.982 | 70 |
| 58 | Suction-Side | 57.652 | 38.582 | 70 |
| 59 | Suction-Side | 58.145 | 40.183 | 70 |
| 60 | Suction-Side | 58.627 | 41.790 | 70 |
| 61 | Suction-Side | 59.099 | 43.398 | 70 |
| 62 | Suction-Side | 59.561 | 45.009 | 70 |
| 63 | Suction-Side | 60.012 | 46.624 | 70 |
| 64 | Suction-Side | 60.454 | 48.241 | 70 |
| 65 | Suction-Side | 60.885 | 49.861 | 70 |
| 66 | Suction-Side | 61.310 | 51.483 | 70 |
| 67 | Suction-Side | 61.724 | 53.108 | 70 |
| 68 | Suction-Side | 62.130 | 54.734 | 70 |
| 69 | Suction-Side | 62.528 | 56.363 | 70 |
| 70 | Suction-Side | 62.917 | 57.994 | 70 |
| 71 | Suction-Side | 63.300 | 59.626 | 70 |
| 72 | Suction-Side | 63.673 | 61.259 | 70 |
| 73 | Suction-Side | 64.040 | 62.894 | 70 |
| 74 | Suction-Side | 64.400 | 64.533 | 70 |
| 75 | Suction-Side | 64.754 | 66.172 | 70 |
| 76 | Suction-Side | 65.099 | 67.812 | 70 |
| 77 | Suction-Side | 65.438 | 69.454 | 70 |
| 78 | Suction-Side | 65.771 | 71.097 | 70 |
| 79 | Suction-Side | 66.096 | 72.741 | 70 |
| 80 | Suction-Side | 66.417 | 74.386 | 70 |
| 81 | Suction-Side | 66.731 | 76.033 | 70 |
| 82 | Suction-Side | 67.040 | 77.681 | 70 |
| 83 | Suction-Side | 67.341 | 79.330 | 70 |
| 84 | Suction-Side | 67.638 | 80.980 | 70 |
| 85 | Suction-Side | 67.929 | 82.631 | 70 |
| 86 | Suction-Side | 68.215 | 84.283 | 70 |
| 87 | Suction-Side | 68.496 | 85.936 | 70 |
| 88 | Suction-Side | 68.772 | 87.590 | 70 |
| 89 | Suction-Side | 69.042 | 89.244 | 70 |
| 90 | Suction-Side | 69.307 | 90.899 | 70 |
| 91 | Suction-Side | 69.568 | 92.555 | 70 |
| 92 | Suction-Side | 69.824 | 94.212 | 70 |
| 93 | Suction-Side | 70.074 | 95.869 | 70 |
| 94 | Suction-Side | 70.321 | 97.528 | 70 |
| 95 | Suction-Side | 70.564 | 99.187 | 70 |
| 96 | Suction-Side | 70.803 | 100.846 | 70 |
| 97 | Suction-Side | 71.037 | 102.506 | 70 |
| 98 | Suction-Side | 71.264 | 104.166 | 70 |
| 99 | Suction-Side | 71.488 | 105.828 | 70 |
| 100 | Suction-Side | 71.709 | 107.490 | 70 |
| 101 | Suction-Side | 71.782 | 108.032 | 70 |
| 102 | Suction-Side | 71.855 | 108.572 | 70 |
| 103 | Suction-Side | 71.928 | 109.113 | 70 |
| 104 | Suction-Side | 71.997 | 109.653 | 70 |
| 105 | Suction-Side | 72.058 | 110.196 | 70 |
| 106 | Suction-Side | 72.088 | 110.741 | 70 |
| 107 | Suction-Side | 72.040 | 111.284 | 70 |
| 108 | Suction-Side | 71.890 | 111.811 | 70 |
| 109 | Suction-Side | 71.558 | 112.232 | 70 |
| 110 | Pressure-Side | −3.779 | −3.113 | 70 |
| 111 | Pressure-Side | −3.672 | −1.727 | 70 |
| 112 | Pressure-Side | −3.278 | −0.402 | 70 |
| 113 | Pressure-Side | −2.644 | 0.831 | 70 |
| 114 | Pressure-Side | −1.828 | 1.948 | 70 |
| 115 | Pressure-Side | −0.871 | 2.950 | 70 |
| 116 | Pressure-Side | 0.180 | 3.838 | 70 |
| 117 | Pressure-Side | 1.316 | 4.622 | 70 |
| 118 | Pressure-Side | 2.506 | 5.340 | 70 |
| 119 | Pressure-Side | 3.693 | 6.061 | 70 |
| 120 | Pressure-Side | 4.868 | 6.803 | 70 |
| 121 | Pressure-Side | 6.030 | 7.567 | 70 |
| 122 | Pressure-Side | 7.175 | 8.352 | 70 |
| 123 | Pressure-Side | 8.307 | 9.155 | 70 |
| 124 | Pressure-Side | 9.426 | 9.977 | 70 |
| 125 | Pressure-Side | 10.532 | 10.818 | 70 |
| 126 | Pressure-Side | 11.624 | 11.677 | 70 |
| 127 | Pressure-Side | 12.702 | 12.552 | 70 |
| 128 | Pressure-Side | 13.766 | 13.443 | 70 |
| 129 | Pressure-Side | 14.815 | 14.348 | 70 |
| 130 | Pressure-Side | 15.849 | 15.268 | 70 |
| 131 | Pressure-Side | 16.870 | 16.200 | 70 |
| 132 | Pressure-Side | 17.879 | 17.146 | 70 |
| 133 | Pressure-Side | 18.873 | 18.106 | 70 |
| 134 | Pressure-Side | 19.855 | 19.077 | 70 |
| 135 | Pressure-Side | 20.826 | 20.062 | 70 |
| 136 | Pressure-Side | 21.784 | 21.057 | 70 |
| 137 | Pressure-Side | 22.731 | 22.065 | 70 |
| 138 | Pressure-Side | 23.666 | 23.083 | 70 |
| 139 | Pressure-Side | 24.590 | 24.112 | 70 |
| 140 | Pressure-Side | 25.503 | 25.154 | 70 |
| 141 | Pressure-Side | 26.406 | 26.204 | 70 |
| 142 | Pressure-Side | 27.298 | 27.267 | 70 |
| 143 | Pressure-Side | 28.179 | 28.337 | 70 |
| 144 | Pressure-Side | 29.050 | 29.415 | 70 |
| 145 | Pressure-Side | 29.908 | 30.500 | 70 |
| 146 | Pressure-Side | 30.755 | 31.592 | 70 |
| 147 | Pressure-Side | 31.590 | 32.690 | 70 |
| 148 | Pressure-Side | 32.415 | 33.794 | 70 |
| 149 | Pressure-Side | 33.230 | 34.905 | 70 |
| 150 | Pressure-Side | 34.036 | 36.021 | 70 |
| 151 | Pressure-Side | 34.829 | 37.144 | 70 |
| 152 | Pressure-Side | 35.614 | 38.272 | 70 |
| 153 | Pressure-Side | 36.390 | 39.405 | 70 |
| 154 | Pressure-Side | 37.157 | 40.543 | 70 |
| 155 | Pressure-Side | 37.914 | 41.687 | 70 |
| 156 | Pressure-Side | 38.663 | 42.837 | 70 |
| 157 | Pressure-Side | 39.404 | 43.992 | 70 |
| 158 | Pressure-Side | 40.135 | 45.150 | 70 |
| 159 | Pressure-Side | 40.859 | 46.314 | 70 |
| 160 | Pressure-Side | 41.575 | 47.483 | 70 |
| 161 | Pressure-Side | 42.282 | 48.655 | 70 |
| 162 | Pressure-Side | 42.983 | 49.833 | 70 |
| 163 | Pressure-Side | 43.676 | 51.014 | 70 |
| 164 | Pressure-Side | 44.361 | 52.201 | 70 |
| 165 | Pressure-Side | 45.041 | 53.391 | 70 |
| 166 | Pressure-Side | 45.711 | 54.586 | 70 |
| 167 | Pressure-Side | 46.376 | 55.784 | 70 |
| 168 | Pressure-Side | 47.035 | 56.986 | 70 |
| 169 | Pressure-Side | 47.686 | 58.193 | 70 |
| 170 | Pressure-Side | 48.330 | 59.402 | 70 |
| 171 | Pressure-Side | 48.968 | 60.615 | 70 |
| 172 | Pressure-Side | 49.602 | 61.834 | 70 |
| 173 | Pressure-Side | 50.228 | 63.055 | 70 |
| 174 | Pressure-Side | 50.848 | 64.279 | 70 |
| 175 | Pressure-Side | 51.462 | 65.507 | 70 |
| 176 | Pressure-Side | 52.071 | 66.737 | 70 |
| 177 | Pressure-Side | 52.673 | 67.973 | 70 |
| 178 | Pressure-Side | 53.271 | 69.211 | 70 |
| 179 | Pressure-Side | 53.861 | 70.451 | 70 |
| 180 | Pressure-Side | 54.449 | 71.696 | 70 |
| 181 | Pressure-Side | 55.029 | 72.942 | 70 |
| 182 | Pressure-Side | 55.606 | 74.193 | 70 |
| 183 | Pressure-Side | 56.176 | 75.447 | 70 |
| 184 | Pressure-Side | 56.743 | 76.702 | 70 |
| 185 | Pressure-Side | 57.304 | 77.962 | 70 |
| 186 | Pressure-Side | 57.860 | 79.225 | 70 |

TABLE I-continued

Non-dimensionalized (%)

| N | Location | X | Y | Z |
|---|---|---|---|---|
| 187 | Pressure-Side | 58.411 | 80.489 | 70 |
| 188 | Pressure-Side | 58.958 | 81.754 | 70 |
| 189 | Pressure-Side | 59.500 | 83.023 | 70 |
| 190 | Pressure-Side | 60.035 | 84.293 | 70 |
| 191 | Pressure-Side | 60.566 | 85.566 | 70 |
| 192 | Pressure-Side | 61.095 | 86.841 | 70 |
| 193 | Pressure-Side | 61.617 | 88.117 | 70 |
| 194 | Pressure-Side | 62.135 | 89.394 | 70 |
| 195 | Pressure-Side | 62.650 | 90.673 | 70 |
| 196 | Pressure-Side | 63.159 | 91.954 | 70 |
| 197 | Pressure-Side | 63.663 | 93.237 | 70 |
| 198 | Pressure-Side | 64.165 | 94.522 | 70 |
| 199 | Pressure-Side | 64.660 | 95.808 | 70 |
| 200 | Pressure-Side | 65.154 | 97.096 | 70 |
| 201 | Pressure-Side | 65.644 | 98.384 | 70 |
| 202 | Pressure-Side | 66.129 | 99.675 | 70 |
| 203 | Pressure-Side | 66.610 | 100.969 | 70 |
| 204 | Pressure-Side | 67.086 | 102.263 | 70 |
| 205 | Pressure-Side | 67.558 | 103.558 | 70 |
| 206 | Pressure-Side | 68.028 | 104.855 | 70 |
| 207 | Pressure-Side | 68.497 | 106.153 | 70 |
| 208 | Pressure-Side | 68.960 | 107.451 | 70 |
| 209 | Pressure-Side | 69.416 | 108.754 | 70 |
| 210 | Pressure-Side | 69.573 | 109.207 | 70 |
| 211 | Pressure-Side | 69.730 | 109.659 | 70 |
| 212 | Pressure-Side | 69.889 | 110.112 | 70 |
| 213 | Pressure-Side | 70.052 | 110.563 | 70 |
| 214 | Pressure-Side | 70.230 | 111.008 | 70 |
| 215 | Pressure-Side | 70.454 | 111.432 | 70 |
| 216 | Pressure-Side | 70.745 | 111.817 | 70 |
| 217 | Pressure-Side | 71.103 | 112.139 | 70 |
| 218 | Pressure-Side | 71.558 | 112.232 | 70 |
| 1 | Suction-Side | −4.316 | −3.560 | 80 |
| 2 | Suction-Side | −4.042 | −5.235 | 80 |
| 3 | Suction-Side | −3.368 | −6.794 | 80 |
| 4 | Suction-Side | −2.393 | −8.186 | 80 |
| 5 | Suction-Side | −1.203 | −9.401 | 80 |
| 6 | Suction-Side | 0.137 | −10.450 | 80 |
| 7 | Suction-Side | 1.582 | −11.348 | 80 |
| 8 | Suction-Side | 3.104 | −12.110 | 80 |
| 9 | Suction-Side | 4.681 | −12.747 | 80 |
| 10 | Suction-Side | 6.301 | −13.272 | 80 |
| 11 | Suction-Side | 7.950 | −13.693 | 80 |
| 12 | Suction-Side | 9.621 | −14.017 | 80 |
| 13 | Suction-Side | 11.308 | −14.238 | 80 |
| 14 | Suction-Side | 13.007 | −14.354 | 80 |
| 15 | Suction-Side | 14.708 | −14.355 | 80 |
| 16 | Suction-Side | 16.406 | −14.242 | 80 |
| 17 | Suction-Side | 18.093 | −14.012 | 80 |
| 18 | Suction-Side | 19.759 | −13.665 | 80 |
| 19 | Suction-Side | 21.397 | −13.204 | 80 |
| 20 | Suction-Side | 23.001 | −12.637 | 80 |
| 21 | Suction-Side | 24.566 | −11.968 | 80 |
| 22 | Suction-Side | 26.087 | −11.204 | 80 |
| 23 | Suction-Side | 27.562 | −10.355 | 80 |
| 24 | Suction-Side | 28.989 | −9.428 | 80 |
| 25 | Suction-Side | 30.369 | −8.431 | 80 |
| 26 | Suction-Side | 31.702 | −7.371 | 80 |
| 27 | Suction-Side | 32.987 | −6.255 | 80 |
| 28 | Suction-Side | 34.227 | −5.089 | 80 |
| 29 | Suction-Side | 35.423 | −3.879 | 80 |
| 30 | Suction-Side | 36.577 | −2.628 | 80 |
| 31 | Suction-Side | 37.690 | −1.341 | 80 |
| 32 | Suction-Side | 38.766 | −0.022 | 80 |
| 33 | Suction-Side | 39.806 | 1.326 | 80 |
| 34 | Suction-Side | 40.812 | 2.700 | 80 |
| 35 | Suction-Side | 41.784 | 4.097 | 80 |
| 36 | Suction-Side | 42.723 | 5.517 | 80 |
| 37 | Suction-Side | 43.634 | 6.954 | 80 |
| 38 | Suction-Side | 44.515 | 8.410 | 80 |
| 39 | Suction-Side | 45.370 | 9.882 | 80 |
| 40 | Suction-Side | 46.199 | 11.368 | 80 |
| 41 | Suction-Side | 47.005 | 12.869 | 80 |
| 42 | Suction-Side | 47.787 | 14.380 | 80 |
| 43 | Suction-Side | 48.545 | 15.904 | 80 |
| 44 | Suction-Side | 49.283 | 17.438 | 80 |
| 45 | Suction-Side | 50 | 18.982 | 80 |
| 46 | Suction-Side | 50.698 | 20.534 | 80 |
| 47 | Suction-Side | 51.378 | 22.094 | 80 |
| 48 | Suction-Side | 52.039 | 23.663 | 80 |
| 49 | Suction-Side | 52.683 | 25.239 | 80 |
| 50 | Suction-Side | 53.311 | 26.820 | 80 |
| 51 | Suction-Side | 53.922 | 28.409 | 80 |
| 52 | Suction-Side | 54.520 | 30.003 | 80 |
| 53 | Suction-Side | 55.102 | 31.602 | 80 |
| 54 | Suction-Side | 55.670 | 33.208 | 80 |
| 55 | Suction-Side | 56.224 | 34.818 | 80 |
| 56 | Suction-Side | 56.765 | 36.430 | 80 |
| 57 | Suction-Side | 57.295 | 38.048 | 80 |
| 58 | Suction-Side | 57.811 | 39.671 | 80 |
| 59 | Suction-Side | 58.317 | 41.296 | 80 |
| 60 | Suction-Side | 58.811 | 42.925 | 80 |
| 61 | Suction-Side | 59.293 | 44.557 | 80 |
| 62 | Suction-Side | 59.767 | 46.192 | 80 |
| 63 | Suction-Side | 60.228 | 47.830 | 80 |
| 64 | Suction-Side | 60.681 | 49.471 | 80 |
| 65 | Suction-Side | 61.123 | 51.115 | 80 |
| 66 | Suction-Side | 61.556 | 52.761 | 80 |
| 67 | Suction-Side | 61.981 | 54.409 | 80 |
| 68 | Suction-Side | 62.396 | 56.060 | 80 |
| 69 | Suction-Side | 62.804 | 57.713 | 80 |
| 70 | Suction-Side | 63.203 | 59.368 | 80 |
| 71 | Suction-Side | 63.593 | 61.023 | 80 |
| 72 | Suction-Side | 63.978 | 62.682 | 80 |
| 73 | Suction-Side | 64.353 | 64.343 | 80 |
| 74 | Suction-Side | 64.721 | 66.004 | 80 |
| 75 | Suction-Side | 65.083 | 67.668 | 80 |
| 76 | Suction-Side | 65.438 | 69.332 | 80 |
| 77 | Suction-Side | 65.785 | 70.999 | 80 |
| 78 | Suction-Side | 66.126 | 72.666 | 80 |
| 79 | Suction-Side | 66.460 | 74.336 | 80 |
| 80 | Suction-Side | 66.788 | 76.006 | 80 |
| 81 | Suction-Side | 67.110 | 77.677 | 80 |
| 82 | Suction-Side | 67.426 | 79.349 | 80 |
| 83 | Suction-Side | 67.737 | 81.023 | 80 |
| 84 | Suction-Side | 68.042 | 82.698 | 80 |
| 85 | Suction-Side | 68.340 | 84.373 | 80 |
| 86 | Suction-Side | 68.634 | 86.050 | 80 |
| 87 | Suction-Side | 68.923 | 87.728 | 80 |
| 88 | Suction-Side | 69.206 | 89.406 | 80 |
| 89 | Suction-Side | 69.484 | 91.086 | 80 |
| 90 | Suction-Side | 69.758 | 92.765 | 80 |
| 91 | Suction-Side | 70.027 | 94.446 | 80 |
| 92 | Suction-Side | 70.291 | 96.127 | 80 |
| 93 | Suction-Side | 70.551 | 97.810 | 80 |
| 94 | Suction-Side | 70.804 | 99.493 | 80 |
| 95 | Suction-Side | 71.055 | 101.177 | 80 |
| 96 | Suction-Side | 71.303 | 102.861 | 80 |
| 97 | Suction-Side | 71.545 | 104.546 | 80 |
| 98 | Suction-Side | 71.784 | 106.230 | 80 |
| 99 | Suction-Side | 72.017 | 107.917 | 80 |
| 100 | Suction-Side | 72.245 | 109.604 | 80 |
| 101 | Suction-Side | 72.318 | 110.137 | 80 |
| 102 | Suction-Side | 72.390 | 110.670 | 80 |
| 103 | Suction-Side | 72.463 | 111.202 | 80 |
| 104 | Suction-Side | 72.534 | 111.735 | 80 |
| 105 | Suction-Side | 72.595 | 112.269 | 80 |
| 106 | Suction-Side | 72.622 | 112.805 | 80 |
| 107 | Suction-Side | 72.570 | 113.340 | 80 |
| 108 | Suction-Side | 72.420 | 113.858 | 80 |
| 109 | Suction-Side | 72.085 | 114.265 | 80 |
| 110 | Pressure-Side | −4.316 | −3.560 | 80 |
| 111 | Pressure-Side | −4.202 | −2.129 | 80 |
| 112 | Pressure-Side | −3.779 | −0.751 | 80 |
| 113 | Pressure-Side | −3.107 | 0.519 | 80 |
| 114 | Pressure-Side | −2.239 | 1.671 | 80 |
| 115 | Pressure-Side | −1.246 | 2.678 | 80 |
| 116 | Pressure-Side | −0.159 | 3.570 | 80 |
| 117 | Pressure-Side | 1.015 | 4.358 | 80 |
| 118 | Pressure-Side | 2.227 | 5.098 | 80 |
| 119 | Pressure-Side | 3.427 | 5.855 | 80 |
| 120 | Pressure-Side | 4.614 | 6.634 | 80 |

TABLE I-continued

| | | Non-dimensionalized (%) | | |
|---|---|---|---|---|
| N | Location | X | Y | Z |
| 121 | Pressure-Side | 5.785 | 7.432 | 80 |
| 122 | Pressure-Side | 6.944 | 8.253 | 80 |
| 123 | Pressure-Side | 8.089 | 9.091 | 80 |
| 124 | Pressure-Side | 9.219 | 9.947 | 80 |
| 125 | Pressure-Side | 10.333 | 10.821 | 80 |
| 126 | Pressure-Side | 11.434 | 11.710 | 80 |
| 127 | Pressure-Side | 12.520 | 12.616 | 80 |
| 128 | Pressure-Side | 13.593 | 13.538 | 80 |
| 129 | Pressure-Side | 14.651 | 14.474 | 80 |
| 130 | Pressure-Side | 15.697 | 15.425 | 80 |
| 131 | Pressure-Side | 16.731 | 16.391 | 80 |
| 132 | Pressure-Side | 17.752 | 17.370 | 80 |
| 133 | Pressure-Side | 18.760 | 18.363 | 80 |
| 134 | Pressure-Side | 19.758 | 19.369 | 80 |
| 135 | Pressure-Side | 20.743 | 20.388 | 80 |
| 136 | Pressure-Side | 21.715 | 21.418 | 80 |
| 137 | Pressure-Side | 22.673 | 22.458 | 80 |
| 138 | Pressure-Side | 23.618 | 23.505 | 80 |
| 139 | Pressure-Side | 24.550 | 24.560 | 80 |
| 140 | Pressure-Side | 25.468 | 25.626 | 80 |
| 141 | Pressure-Side | 26.375 | 26.697 | 80 |
| 142 | Pressure-Side | 27.270 | 27.777 | 80 |
| 143 | Pressure-Side | 28.153 | 28.865 | 80 |
| 144 | Pressure-Side | 29.025 | 29.960 | 80 |
| 145 | Pressure-Side | 29.886 | 31.062 | 80 |
| 146 | Pressure-Side | 30.734 | 32.171 | 80 |
| 147 | Pressure-Side | 31.574 | 33.286 | 80 |
| 148 | Pressure-Side | 32.402 | 34.408 | 80 |
| 149 | Pressure-Side | 33.221 | 35.536 | 80 |
| 150 | Pressure-Side | 34.031 | 36.671 | 80 |
| 151 | Pressure-Side | 34.831 | 37.812 | 80 |
| 152 | Pressure-Side | 35.622 | 38.959 | 80 |
| 153 | Pressure-Side | 36.402 | 40.110 | 80 |
| 154 | Pressure-Side | 37.175 | 41.269 | 80 |
| 155 | Pressure-Side | 37.939 | 42.432 | 80 |
| 156 | Pressure-Side | 38.695 | 43.601 | 80 |
| 157 | Pressure-Side | 39.442 | 44.775 | 80 |
| 158 | Pressure-Side | 40.181 | 45.955 | 80 |
| 159 | Pressure-Side | 40.913 | 47.139 | 80 |
| 160 | Pressure-Side | 41.637 | 48.329 | 80 |
| 161 | Pressure-Side | 42.354 | 49.523 | 80 |
| 162 | Pressure-Side | 43.061 | 50.722 | 80 |
| 163 | Pressure-Side | 43.763 | 51.925 | 80 |
| 164 | Pressure-Side | 44.457 | 53.134 | 80 |
| 165 | Pressure-Side | 45.144 | 54.347 | 80 |
| 166 | Pressure-Side | 45.825 | 55.563 | 80 |
| 167 | Pressure-Side | 46.499 | 56.786 | 80 |
| 168 | Pressure-Side | 47.167 | 58.011 | 80 |
| 169 | Pressure-Side | 47.827 | 59.242 | 80 |
| 170 | Pressure-Side | 48.481 | 60.475 | 80 |
| 171 | Pressure-Side | 49.130 | 61.713 | 80 |
| 172 | Pressure-Side | 49.772 | 62.955 | 80 |
| 173 | Pressure-Side | 50.407 | 64.200 | 80 |
| 174 | Pressure-Side | 51.038 | 65.450 | 80 |
| 175 | Pressure-Side | 51.663 | 66.703 | 80 |
| 176 | Pressure-Side | 52.281 | 67.960 | 80 |
| 177 | Pressure-Side | 52.894 | 69.220 | 80 |
| 178 | Pressure-Side | 53.501 | 70.484 | 80 |
| 179 | Pressure-Side | 54.103 | 71.751 | 80 |
| 180 | Pressure-Side | 54.700 | 73.023 | 80 |
| 181 | Pressure-Side | 55.292 | 74.297 | 80 |
| 182 | Pressure-Side | 55.878 | 75.573 | 80 |
| 183 | Pressure-Side | 56.459 | 76.852 | 80 |
| 184 | Pressure-Side | 57.035 | 78.134 | 80 |
| 185 | Pressure-Side | 57.605 | 79.417 | 80 |
| 186 | Pressure-Side | 58.170 | 80.704 | 80 |
| 187 | Pressure-Side | 58.731 | 81.990 | 80 |
| 188 | Pressure-Side | 59.286 | 83.281 | 80 |
| 189 | Pressure-Side | 59.836 | 84.572 | 80 |
| 190 | Pressure-Side | 60.383 | 85.866 | 80 |
| 191 | Pressure-Side | 60.923 | 87.161 | 80 |
| 192 | Pressure-Side | 61.458 | 88.459 | 80 |
| 193 | Pressure-Side | 61.991 | 89.759 | 80 |
| 194 | Pressure-Side | 62.518 | 91.060 | 80 |
| 195 | Pressure-Side | 63.041 | 92.363 | 80 |
| 196 | Pressure-Side | 63.561 | 93.667 | 80 |
| 197 | Pressure-Side | 64.074 | 94.975 | 80 |
| 198 | Pressure-Side | 64.584 | 96.283 | 80 |
| 199 | Pressure-Side | 65.090 | 97.592 | 80 |
| 200 | Pressure-Side | 65.593 | 98.905 | 80 |
| 201 | Pressure-Side | 66.092 | 100.217 | 80 |
| 202 | Pressure-Side | 66.586 | 101.531 | 80 |
| 203 | Pressure-Side | 67.079 | 102.847 | 80 |
| 204 | Pressure-Side | 67.565 | 104.165 | 80 |
| 205 | Pressure-Side | 68.049 | 105.485 | 80 |
| 206 | Pressure-Side | 68.527 | 106.806 | 80 |
| 207 | Pressure-Side | 69.003 | 108.128 | 80 |
| 208 | Pressure-Side | 69.479 | 109.450 | 80 |
| 209 | Pressure-Side | 69.951 | 110.772 | 80 |
| 210 | Pressure-Side | 70.108 | 111.225 | 80 |
| 211 | Pressure-Side | 70.264 | 111.677 | 80 |
| 212 | Pressure-Side | 70.419 | 112.131 | 80 |
| 213 | Pressure-Side | 70.580 | 112.582 | 80 |
| 214 | Pressure-Side | 70.763 | 113.024 | 80 |
| 215 | Pressure-Side | 70.988 | 113.449 | 80 |
| 216 | Pressure-Side | 71.273 | 113.833 | 80 |
| 217 | Pressure-Side | 71.629 | 114.158 | 80 |
| 218 | Pressure-Side | 72.085 | 114.265 | 80 |
| 1 | Suction-Side | −4.855 | −4.006 | 90 |
| 2 | Suction-Side | −4.573 | −5.712 | 90 |
| 3 | Suction-Side | −3.883 | −7.300 | 90 |
| 4 | Suction-Side | −2.884 | −8.717 | 90 |
| 5 | Suction-Side | −1.668 | −9.951 | 90 |
| 6 | Suction-Side | −0.300 | −11.015 | 90 |
| 7 | Suction-Side | 1.177 | −11.925 | 90 |
| 8 | Suction-Side | 2.730 | −12.695 | 90 |
| 9 | Suction-Side | 4.341 | −13.339 | 90 |
| 10 | Suction-Side | 5.993 | −13.867 | 90 |
| 11 | Suction-Side | 7.675 | −14.286 | 90 |
| 12 | Suction-Side | 9.383 | −14.593 | 90 |
| 13 | Suction-Side | 11.106 | −14.784 | 90 |
| 14 | Suction-Side | 12.839 | −14.852 | 90 |
| 15 | Suction-Side | 14.573 | −14.791 | 90 |
| 16 | Suction-Side | 16.296 | −14.603 | 90 |
| 17 | Suction-Side | 18.002 | −14.287 | 90 |
| 18 | Suction-Side | 19.680 | −13.849 | 90 |
| 19 | Suction-Side | 21.323 | −13.296 | 90 |
| 20 | Suction-Side | 22.927 | −12.636 | 90 |
| 21 | Suction-Side | 24.486 | −11.877 | 90 |
| 22 | Suction-Side | 26.000 | −11.029 | 90 |
| 23 | Suction-Side | 27.464 | −10.100 | 90 |
| 24 | Suction-Side | 28.880 | −9.098 | 90 |
| 25 | Suction-Side | 30.249 | −8.033 | 90 |
| 26 | Suction-Side | 31.571 | −6.911 | 90 |
| 27 | Suction-Side | 32.849 | −5.738 | 90 |
| 28 | Suction-Side | 34.082 | −4.518 | 90 |
| 29 | Suction-Side | 35.275 | −3.258 | 90 |
| 30 | Suction-Side | 36.427 | −1.962 | 90 |
| 31 | Suction-Side | 37.542 | −0.632 | 90 |
| 32 | Suction-Side | 38.619 | 0.727 | 90 |
| 33 | Suction-Side | 39.663 | 2.111 | 90 |
| 34 | Suction-Side | 40.675 | 3.521 | 90 |
| 35 | Suction-Side | 41.655 | 4.953 | 90 |
| 36 | Suction-Side | 42.604 | 6.404 | 90 |
| 37 | Suction-Side | 43.526 | 7.873 | 90 |
| 38 | Suction-Side | 44.419 | 9.359 | 90 |
| 39 | Suction-Side | 45.288 | 10.861 | 90 |
| 40 | Suction-Side | 46.131 | 12.377 | 90 |
| 41 | Suction-Side | 46.952 | 13.906 | 90 |
| 42 | Suction-Side | 47.748 | 15.446 | 90 |
| 43 | Suction-Side | 48.523 | 16.998 | 90 |
| 44 | Suction-Side | 49.277 | 18.560 | 90 |
| 45 | Suction-Side | 50.011 | 20.131 | 90 |
| 46 | Suction-Side | 50.726 | 21.712 | 90 |
| 47 | Suction-Side | 51.422 | 23.301 | 90 |
| 48 | Suction-Side | 52.102 | 24.897 | 90 |
| 49 | Suction-Side | 52.763 | 26.500 | 90 |
| 50 | Suction-Side | 53.409 | 28.111 | 90 |
| 51 | Suction-Side | 54.038 | 29.727 | 90 |
| 52 | Suction-Side | 54.652 | 31.349 | 90 |
| 53 | Suction-Side | 55.252 | 32.976 | 90 |
| 54 | Suction-Side | 55.838 | 34.610 | 90 |

TABLE I-continued

Non-dimensionalized (%)

| N | Location | X | Y | Z |
|---|---|---|---|---|
| 55 | Suction-Side | 56.409 | 36.246 | 90 |
| 56 | Suction-Side | 56.968 | 37.889 | 90 |
| 57 | Suction-Side | 57.514 | 39.536 | 90 |
| 58 | Suction-Side | 58.049 | 41.186 | 90 |
| 59 | Suction-Side | 58.569 | 42.840 | 90 |
| 60 | Suction-Side | 59.081 | 44.498 | 90 |
| 61 | Suction-Side | 59.580 | 46.158 | 90 |
| 62 | Suction-Side | 60.069 | 47.823 | 90 |
| 63 | Suction-Side | 60.547 | 49.490 | 90 |
| 64 | Suction-Side | 61.016 | 51.160 | 90 |
| 65 | Suction-Side | 61.475 | 52.833 | 90 |
| 66 | Suction-Side | 61.924 | 54.508 | 90 |
| 67 | Suction-Side | 62.363 | 56.186 | 90 |
| 68 | Suction-Side | 62.795 | 57.866 | 90 |
| 69 | Suction-Side | 63.218 | 59.549 | 90 |
| 70 | Suction-Side | 63.632 | 61.233 | 90 |
| 71 | Suction-Side | 64.038 | 62.920 | 90 |
| 72 | Suction-Side | 64.436 | 64.608 | 90 |
| 73 | Suction-Side | 64.826 | 66.298 | 90 |
| 74 | Suction-Side | 65.211 | 67.990 | 90 |
| 75 | Suction-Side | 65.586 | 69.683 | 90 |
| 76 | Suction-Side | 65.955 | 71.377 | 90 |
| 77 | Suction-Side | 66.317 | 73.074 | 90 |
| 78 | Suction-Side | 66.672 | 74.772 | 90 |
| 79 | Suction-Side | 67.021 | 76.471 | 90 |
| 80 | Suction-Side | 67.364 | 78.171 | 90 |
| 81 | Suction-Side | 67.699 | 79.873 | 90 |
| 82 | Suction-Side | 68.030 | 81.576 | 90 |
| 83 | Suction-Side | 68.353 | 83.280 | 90 |
| 84 | Suction-Side | 68.672 | 84.984 | 90 |
| 85 | Suction-Side | 68.985 | 86.691 | 90 |
| 86 | Suction-Side | 69.292 | 88.399 | 90 |
| 87 | Suction-Side | 69.594 | 90.106 | 90 |
| 88 | Suction-Side | 69.890 | 91.816 | 90 |
| 89 | Suction-Side | 70.183 | 93.525 | 90 |
| 90 | Suction-Side | 70.469 | 95.236 | 90 |
| 91 | Suction-Side | 70.752 | 96.948 | 90 |
| 92 | Suction-Side | 71.028 | 98.660 | 90 |
| 93 | Suction-Side | 71.301 | 100.372 | 90 |
| 94 | Suction-Side | 71.568 | 102.086 | 90 |
| 95 | Suction-Side | 71.833 | 103.801 | 90 |
| 96 | Suction-Side | 72.092 | 105.515 | 90 |
| 97 | Suction-Side | 72.347 | 107.232 | 90 |
| 98 | Suction-Side | 72.598 | 108.948 | 90 |
| 99 | Suction-Side | 72.843 | 110.665 | 90 |
| 100 | Suction-Side | 73.088 | 112.382 | 90 |
| 101 | Suction-Side | 73.158 | 112.869 | 90 |
| 102 | Suction-Side | 73.226 | 113.354 | 90 |
| 103 | Suction-Side | 73.293 | 113.840 | 90 |
| 104 | Suction-Side | 73.356 | 114.329 | 90 |
| 105 | Suction-Side | 73.405 | 114.817 | 90 |
| 106 | Suction-Side | 73.410 | 115.306 | 90 |
| 107 | Suction-Side | 73.336 | 115.793 | 90 |
| 108 | Suction-Side | 73.178 | 116.256 | 90 |
| 109 | Suction-Side | 72.840 | 116.597 | 90 |
| 110 | Pressure-Side | −4.855 | −4.006 | 90 |
| 111 | Pressure-Side | −4.742 | −2.580 | 90 |
| 112 | Pressure-Side | −4.333 | −1.209 | 90 |
| 113 | Pressure-Side | −3.672 | 0.061 | 90 |
| 114 | Pressure-Side | −2.821 | 1.212 | 90 |
| 115 | Pressure-Side | −1.825 | 2.240 | 90 |
| 116 | Pressure-Side | −0.721 | 3.154 | 90 |
| 117 | Pressure-Side | 0.460 | 3.965 | 90 |
| 118 | Pressure-Side | 1.675 | 4.726 | 90 |
| 119 | Pressure-Side | 2.877 | 5.506 | 90 |
| 120 | Pressure-Side | 4.062 | 6.310 | 90 |
| 121 | Pressure-Side | 5.235 | 7.135 | 90 |
| 122 | Pressure-Side | 6.395 | 7.977 | 90 |
| 123 | Pressure-Side | 7.540 | 8.837 | 90 |
| 124 | Pressure-Side | 8.672 | 9.717 | 90 |
| 125 | Pressure-Side | 9.791 | 10.613 | 90 |
| 126 | Pressure-Side | 10.895 | 11.526 | 90 |
| 127 | Pressure-Side | 11.987 | 12.453 | 90 |
| 128 | Pressure-Side | 13.066 | 13.397 | 90 |
| 129 | Pressure-Side | 14.131 | 14.355 | 90 |
| 130 | Pressure-Side | 15.183 | 15.329 | 90 |
| 131 | Pressure-Side | 16.223 | 16.314 | 90 |
| 132 | Pressure-Side | 17.252 | 17.314 | 90 |
| 133 | Pressure-Side | 18.265 | 18.326 | 90 |
| 134 | Pressure-Side | 19.268 | 19.350 | 90 |
| 135 | Pressure-Side | 20.259 | 20.385 | 90 |
| 136 | Pressure-Side | 21.237 | 21.433 | 90 |
| 137 | Pressure-Side | 22.203 | 22.491 | 90 |
| 138 | Pressure-Side | 23.158 | 23.559 | 90 |
| 139 | Pressure-Side | 24.102 | 24.638 | 90 |
| 140 | Pressure-Side | 25.035 | 25.725 | 90 |
| 141 | Pressure-Side | 25.957 | 26.823 | 90 |
| 142 | Pressure-Side | 26.868 | 27.930 | 90 |
| 143 | Pressure-Side | 27.767 | 29.044 | 90 |
| 144 | Pressure-Side | 28.657 | 30.168 | 90 |
| 145 | Pressure-Side | 29.535 | 31.300 | 90 |
| 146 | Pressure-Side | 30.405 | 32.439 | 90 |
| 147 | Pressure-Side | 31.264 | 33.586 | 90 |
| 148 | Pressure-Side | 32.113 | 34.740 | 90 |
| 149 | Pressure-Side | 32.953 | 35.902 | 90 |
| 150 | Pressure-Side | 33.782 | 37.070 | 90 |
| 151 | Pressure-Side | 34.602 | 38.245 | 90 |
| 152 | Pressure-Side | 35.416 | 39.426 | 90 |
| 153 | Pressure-Side | 36.218 | 40.613 | 90 |
| 154 | Pressure-Side | 37.012 | 41.806 | 90 |
| 155 | Pressure-Side | 37.797 | 43.005 | 90 |
| 156 | Pressure-Side | 38.573 | 44.210 | 90 |
| 157 | Pressure-Side | 39.342 | 45.419 | 90 |
| 158 | Pressure-Side | 40.101 | 46.634 | 90 |
| 159 | Pressure-Side | 40.853 | 47.855 | 90 |
| 160 | Pressure-Side | 41.597 | 49.079 | 90 |
| 161 | Pressure-Side | 42.333 | 50.309 | 90 |
| 162 | Pressure-Side | 43.061 | 51.542 | 90 |
| 163 | Pressure-Side | 43.782 | 52.781 | 90 |
| 164 | Pressure-Side | 44.496 | 54.025 | 90 |
| 165 | Pressure-Side | 45.202 | 55.271 | 90 |
| 166 | Pressure-Side | 45.901 | 56.522 | 90 |
| 167 | Pressure-Side | 46.593 | 57.777 | 90 |
| 168 | Pressure-Side | 47.278 | 59.037 | 90 |
| 169 | Pressure-Side | 47.956 | 60.298 | 90 |
| 170 | Pressure-Side | 48.628 | 61.565 | 90 |
| 171 | Pressure-Side | 49.293 | 62.834 | 90 |
| 172 | Pressure-Side | 49.952 | 64.107 | 90 |
| 173 | Pressure-Side | 50.603 | 65.383 | 90 |
| 174 | Pressure-Side | 51.249 | 66.662 | 90 |
| 175 | Pressure-Side | 51.888 | 67.945 | 90 |
| 176 | Pressure-Side | 52.522 | 69.230 | 90 |
| 177 | Pressure-Side | 53.149 | 70.518 | 90 |
| 178 | Pressure-Side | 53.772 | 71.810 | 90 |
| 179 | Pressure-Side | 54.388 | 73.104 | 90 |
| 180 | Pressure-Side | 54.998 | 74.399 | 90 |
| 181 | Pressure-Side | 55.603 | 75.699 | 90 |
| 182 | Pressure-Side | 56.203 | 77.000 | 90 |
| 183 | Pressure-Side | 56.798 | 78.305 | 90 |
| 184 | Pressure-Side | 57.387 | 79.612 | 90 |
| 185 | Pressure-Side | 57.970 | 80.921 | 90 |
| 186 | Pressure-Side | 58.549 | 82.231 | 90 |
| 187 | Pressure-Side | 59.123 | 83.544 | 90 |
| 188 | Pressure-Side | 59.691 | 84.860 | 90 |
| 189 | Pressure-Side | 60.256 | 86.176 | 90 |
| 190 | Pressure-Side | 60.816 | 87.496 | 90 |
| 191 | Pressure-Side | 61.371 | 88.817 | 90 |
| 192 | Pressure-Side | 61.921 | 90.141 | 90 |
| 193 | Pressure-Side | 62.467 | 91.465 | 90 |
| 194 | Pressure-Side | 63.009 | 92.792 | 90 |
| 195 | Pressure-Side | 63.546 | 94.121 | 90 |
| 196 | Pressure-Side | 64.079 | 95.451 | 90 |
| 197 | Pressure-Side | 64.607 | 96.783 | 90 |
| 198 | Pressure-Side | 65.132 | 98.117 | 90 |
| 199 | Pressure-Side | 65.653 | 99.451 | 90 |
| 200 | Pressure-Side | 66.169 | 100.788 | 90 |
| 201 | Pressure-Side | 66.682 | 102.126 | 90 |
| 202 | Pressure-Side | 67.191 | 103.466 | 90 |
| 203 | Pressure-Side | 67.697 | 104.807 | 90 |
| 204 | Pressure-Side | 68.199 | 106.149 | 90 |
| 205 | Pressure-Side | 68.697 | 107.493 | 90 |
| 206 | Pressure-Side | 69.192 | 108.837 | 90 |

TABLE I-continued

Non-dimensionalized (%)

| N | Location | X | Y | Z |
|---|---|---|---|---|
| 207 | Pressure-Side | 69.684 | 110.184 | 90 |
| 208 | Pressure-Side | 70.172 | 111.532 | 90 |
| 209 | Pressure-Side | 70.657 | 112.880 | 90 |
| 210 | Pressure-Side | 70.825 | 113.351 | 90 |
| 211 | Pressure-Side | 70.993 | 113.823 | 90 |
| 212 | Pressure-Side | 71.159 | 114.294 | 90 |
| 213 | Pressure-Side | 71.328 | 114.766 | 90 |
| 214 | Pressure-Side | 71.509 | 115.232 | 90 |
| 215 | Pressure-Side | 71.732 | 115.679 | 90 |
| 216 | Pressure-Side | 72.021 | 116.088 | 90 |
| 217 | Pressure-Side | 72.377 | 116.440 | 90 |
| 218 | Pressure-Side | 72.840 | 116.597 | 90 |
| 1 | Suction-Side | −5.395 | −4.454 | 100 |
| 2 | Suction-Side | −5.109 | −6.192 | 100 |
| 3 | Suction-Side | −4.407 | −7.809 | 100 |
| 4 | Suction-Side | −3.392 | −9.251 | 100 |
| 5 | Suction-Side | −2.154 | −10.508 | 100 |
| 6 | Suction-Side | −0.761 | −11.593 | 100 |
| 7 | Suction-Side | 0.742 | −12.518 | 100 |
| 8 | Suction-Side | 2.322 | −13.303 | 100 |
| 9 | Suction-Side | 3.962 | −13.962 | 100 |
| 10 | Suction-Side | 5.644 | −14.496 | 100 |
| 11 | Suction-Side | 7.361 | −14.909 | 100 |
| 12 | Suction-Side | 9.103 | −15.191 | 100 |
| 13 | Suction-Side | 10.863 | −15.337 | 100 |
| 14 | Suction-Side | 12.628 | −15.343 | 100 |
| 15 | Suction-Side | 14.388 | −15.205 | 100 |
| 16 | Suction-Side | 16.131 | −14.928 | 100 |
| 17 | Suction-Side | 17.848 | −14.515 | 100 |
| 18 | Suction-Side | 19.531 | −13.980 | 100 |
| 19 | Suction-Side | 21.170 | −13.327 | 100 |
| 20 | Suction-Side | 22.767 | −12.572 | 100 |
| 21 | Suction-Side | 24.314 | −11.722 | 100 |
| 22 | Suction-Side | 25.813 | −10.788 | 100 |
| 23 | Suction-Side | 27.264 | −9.781 | 100 |
| 24 | Suction-Side | 28.666 | −8.708 | 100 |
| 25 | Suction-Side | 30.021 | −7.577 | 100 |
| 26 | Suction-Side | 31.332 | −6.393 | 100 |
| 27 | Suction-Side | 32.599 | −5.165 | 100 |
| 28 | Suction-Side | 33.826 | −3.895 | 100 |
| 29 | Suction-Side | 35.013 | −2.588 | 100 |
| 30 | Suction-Side | 36.163 | −1.246 | 100 |
| 31 | Suction-Side | 37.276 | 0.123 | 100 |
| 32 | Suction-Side | 38.356 | 1.521 | 100 |
| 33 | Suction-Side | 39.405 | 2.941 | 100 |
| 34 | Suction-Side | 40.422 | 4.384 | 100 |
| 35 | Suction-Side | 41.410 | 5.849 | 100 |
| 36 | Suction-Side | 42.370 | 7.331 | 100 |
| 37 | Suction-Side | 43.302 | 8.831 | 100 |
| 38 | Suction-Side | 44.208 | 10.346 | 100 |
| 39 | Suction-Side | 45.090 | 11.876 | 100 |
| 40 | Suction-Side | 45.949 | 13.419 | 100 |
| 41 | Suction-Side | 46.785 | 14.974 | 100 |
| 42 | Suction-Side | 47.599 | 16.541 | 100 |
| 43 | Suction-Side | 48.391 | 18.120 | 100 |
| 44 | Suction-Side | 49.164 | 19.707 | 100 |
| 45 | Suction-Side | 49.918 | 21.304 | 100 |
| 46 | Suction-Side | 50.652 | 22.909 | 100 |
| 47 | Suction-Side | 51.369 | 24.523 | 100 |
| 48 | Suction-Side | 52.069 | 26.145 | 100 |
| 49 | Suction-Side | 52.752 | 27.773 | 100 |
| 50 | Suction-Side | 53.418 | 29.408 | 100 |
| 51 | Suction-Side | 54.069 | 31.050 | 100 |
| 52 | Suction-Side | 54.706 | 32.697 | 100 |
| 53 | Suction-Side | 55.326 | 34.350 | 100 |
| 54 | Suction-Side | 55.934 | 36.008 | 100 |
| 55 | Suction-Side | 56.528 | 37.671 | 100 |
| 56 | Suction-Side | 57.109 | 39.339 | 100 |
| 57 | Suction-Side | 57.678 | 41.011 | 100 |
| 58 | Suction-Side | 58.234 | 42.686 | 100 |
| 59 | Suction-Side | 58.779 | 44.365 | 100 |
| 60 | Suction-Side | 59.311 | 46.050 | 100 |
| 61 | Suction-Side | 59.832 | 47.737 | 100 |
| 62 | Suction-Side | 60.342 | 49.427 | 100 |
| 63 | Suction-Side | 60.844 | 51.121 | 100 |
| 64 | Suction-Side | 61.334 | 52.817 | 100 |
| 65 | Suction-Side | 61.814 | 54.516 | 100 |
| 66 | Suction-Side | 62.285 | 56.218 | 100 |
| 67 | Suction-Side | 62.746 | 57.922 | 100 |
| 68 | Suction-Side | 63.200 | 59.629 | 100 |
| 69 | Suction-Side | 63.644 | 61.338 | 100 |
| 70 | Suction-Side | 64.079 | 63.050 | 100 |
| 71 | Suction-Side | 64.506 | 64.763 | 100 |
| 72 | Suction-Side | 64.926 | 66.478 | 100 |
| 73 | Suction-Side | 65.337 | 68.196 | 100 |
| 74 | Suction-Side | 65.740 | 69.914 | 100 |
| 75 | Suction-Side | 66.136 | 71.635 | 100 |
| 76 | Suction-Side | 66.525 | 73.358 | 100 |
| 77 | Suction-Side | 66.908 | 75.082 | 100 |
| 78 | Suction-Side | 67.283 | 76.808 | 100 |
| 79 | Suction-Side | 67.651 | 78.535 | 100 |
| 80 | Suction-Side | 68.013 | 80.263 | 100 |
| 81 | Suction-Side | 68.368 | 81.992 | 100 |
| 82 | Suction-Side | 68.718 | 83.723 | 100 |
| 83 | Suction-Side | 69.061 | 85.455 | 100 |
| 84 | Suction-Side | 69.399 | 87.189 | 100 |
| 85 | Suction-Side | 69.730 | 88.924 | 100 |
| 86 | Suction-Side | 70.057 | 90.658 | 100 |
| 87 | Suction-Side | 70.377 | 92.396 | 100 |
| 88 | Suction-Side | 70.692 | 94.133 | 100 |
| 89 | Suction-Side | 71.000 | 95.871 | 100 |
| 90 | Suction-Side | 71.304 | 97.611 | 100 |
| 91 | Suction-Side | 71.604 | 99.350 | 100 |
| 92 | Suction-Side | 71.899 | 101.092 | 100 |
| 93 | Suction-Side | 72.190 | 102.834 | 100 |
| 94 | Suction-Side | 72.475 | 104.576 | 100 |
| 95 | Suction-Side | 72.754 | 106.319 | 100 |
| 96 | Suction-Side | 73.028 | 108.064 | 100 |
| 97 | Suction-Side | 73.301 | 109.809 | 100 |
| 98 | Suction-Side | 73.572 | 111.554 | 100 |
| 99 | Suction-Side | 73.831 | 113.300 | 100 |
| 100 | Suction-Side | 74.086 | 115.048 | 100 |
| 101 | Suction-Side | 74.159 | 115.524 | 100 |
| 102 | Suction-Side | 74.232 | 116.002 | 100 |
| 103 | Suction-Side | 74.302 | 116.480 | 100 |
| 104 | Suction-Side | 74.365 | 116.958 | 100 |
| 105 | Suction-Side | 74.411 | 117.438 | 100 |
| 106 | Suction-Side | 74.411 | 117.921 | 100 |
| 107 | Suction-Side | 74.336 | 118.398 | 100 |
| 108 | Suction-Side | 74.175 | 118.852 | 100 |
| 109 | Suction-Side | 73.833 | 119.171 | 100 |
| 110 | Pressure-Side | −5.395 | −4.454 | 100 |
| 111 | Pressure-Side | −5.281 | −2.997 | 100 |
| 112 | Pressure-Side | −4.861 | −1.598 | 100 |
| 113 | Pressure-Side | −4.186 | −0.300 | 100 |
| 114 | Pressure-Side | −3.315 | 0.875 | 100 |
| 115 | Pressure-Side | −2.297 | 1.927 | 100 |
| 116 | Pressure-Side | −1.166 | 2.858 | 100 |
| 117 | Pressure-Side | 0.039 | 3.689 | 100 |
| 118 | Pressure-Side | 1.267 | 4.487 | 100 |
| 119 | Pressure-Side | 2.481 | 5.306 | 100 |
| 120 | Pressure-Side | 3.677 | 6.150 | 100 |
| 121 | Pressure-Side | 4.861 | 7.012 | 100 |
| 122 | Pressure-Side | 6.030 | 7.894 | 100 |
| 123 | Pressure-Side | 7.187 | 8.791 | 100 |
| 124 | Pressure-Side | 8.330 | 9.707 | 100 |
| 125 | Pressure-Side | 9.459 | 10.638 | 100 |
| 126 | Pressure-Side | 10.575 | 11.588 | 100 |
| 127 | Pressure-Side | 11.677 | 12.551 | 100 |
| 128 | Pressure-Side | 12.766 | 13.530 | 100 |
| 129 | Pressure-Side | 13.843 | 14.523 | 100 |
| 130 | Pressure-Side | 14.907 | 15.529 | 100 |
| 131 | Pressure-Side | 15.958 | 16.548 | 100 |
| 132 | Pressure-Side | 16.996 | 17.581 | 100 |
| 133 | Pressure-Side | 18.023 | 18.625 | 100 |
| 134 | Pressure-Side | 19.036 | 19.682 | 100 |
| 135 | Pressure-Side | 20.039 | 20.750 | 100 |
| 136 | Pressure-Side | 21.029 | 21.829 | 100 |
| 137 | Pressure-Side | 22.008 | 22.918 | 100 |
| 138 | Pressure-Side | 22.976 | 24.017 | 100 |
| 139 | Pressure-Side | 23.931 | 25.126 | 100 |
| 140 | Pressure-Side | 24.876 | 26.244 | 100 |

TABLE I-continued

Non-dimensionalized (%)

| N | Location | X | Y | Z |
|---|---|---|---|---|
| 141 | Pressure-Side | 25.811 | 27.372 | 100 |
| 142 | Pressure-Side | 26.734 | 28.509 | 100 |
| 143 | Pressure-Side | 27.647 | 29.654 | 100 |
| 144 | Pressure-Side | 28.549 | 30.807 | 100 |
| 145 | Pressure-Side | 29.442 | 31.967 | 100 |
| 146 | Pressure-Side | 30.325 | 33.136 | 100 |
| 147 | Pressure-Side | 31.197 | 34.313 | 100 |
| 148 | Pressure-Side | 32.059 | 35.496 | 100 |
| 149 | Pressure-Side | 32.912 | 36.686 | 100 |
| 150 | Pressure-Side | 33.757 | 37.883 | 100 |
| 151 | Pressure-Side | 34.592 | 39.086 | 100 |
| 152 | Pressure-Side | 35.417 | 40.296 | 100 |
| 153 | Pressure-Side | 36.235 | 41.511 | 100 |
| 154 | Pressure-Side | 37.043 | 42.732 | 100 |
| 155 | Pressure-Side | 37.841 | 43.957 | 100 |
| 156 | Pressure-Side | 38.634 | 45.190 | 100 |
| 157 | Pressure-Side | 39.416 | 46.428 | 100 |
| 158 | Pressure-Side | 40.192 | 47.670 | 100 |
| 159 | Pressure-Side | 40.957 | 48.918 | 100 |
| 160 | Pressure-Side | 41.717 | 50.170 | 100 |
| 161 | Pressure-Side | 42.468 | 51.427 | 100 |
| 162 | Pressure-Side | 43.211 | 52.689 | 100 |
| 163 | Pressure-Side | 43.947 | 53.955 | 100 |
| 164 | Pressure-Side | 44.676 | 55.225 | 100 |
| 165 | Pressure-Side | 45.398 | 56.500 | 100 |
| 166 | Pressure-Side | 46.112 | 57.777 | 100 |
| 167 | Pressure-Side | 46.820 | 59.059 | 100 |
| 168 | Pressure-Side | 47.520 | 60.345 | 100 |
| 169 | Pressure-Side | 48.214 | 61.635 | 100 |
| 170 | Pressure-Side | 48.901 | 62.929 | 100 |
| 171 | Pressure-Side | 49.582 | 64.224 | 100 |
| 172 | Pressure-Side | 50.256 | 65.525 | 100 |
| 173 | Pressure-Side | 50.924 | 66.828 | 100 |
| 174 | Pressure-Side | 51.585 | 68.134 | 100 |
| 175 | Pressure-Side | 52.241 | 69.444 | 100 |
| 176 | Pressure-Side | 52.891 | 70.755 | 100 |
| 177 | Pressure-Side | 53.534 | 72.071 | 100 |
| 178 | Pressure-Side | 54.172 | 73.389 | 100 |
| 179 | Pressure-Side | 54.805 | 74.710 | 100 |
| 180 | Pressure-Side | 55.431 | 76.033 | 100 |
| 181 | Pressure-Side | 56.053 | 77.360 | 100 |
| 182 | Pressure-Side | 56.669 | 78.687 | 100 |
| 183 | Pressure-Side | 57.279 | 80.018 | 100 |
| 184 | Pressure-Side | 57.884 | 81.352 | 100 |
| 185 | Pressure-Side | 58.485 | 82.688 | 100 |
| 186 | Pressure-Side | 59.080 | 84.026 | 100 |
| 187 | Pressure-Side | 59.670 | 85.366 | 100 |
| 188 | Pressure-Side | 60.256 | 86.709 | 100 |
| 189 | Pressure-Side | 60.837 | 88.053 | 100 |
| 190 | Pressure-Side | 61.414 | 89.399 | 100 |
| 191 | Pressure-Side | 61.985 | 90.746 | 100 |
| 192 | Pressure-Side | 62.553 | 92.096 | 100 |
| 193 | Pressure-Side | 63.116 | 93.448 | 100 |
| 194 | Pressure-Side | 63.673 | 94.802 | 100 |
| 195 | Pressure-Side | 64.228 | 96.157 | 100 |
| 196 | Pressure-Side | 64.779 | 97.515 | 100 |
| 197 | Pressure-Side | 65.325 | 98.874 | 100 |
| 198 | Pressure-Side | 65.866 | 100.233 | 100 |
| 199 | Pressure-Side | 66.405 | 101.595 | 100 |
| 200 | Pressure-Side | 66.939 | 102.959 | 100 |
| 201 | Pressure-Side | 67.470 | 104.324 | 100 |
| 202 | Pressure-Side | 67.999 | 105.689 | 100 |
| 203 | Pressure-Side | 68.521 | 107.057 | 100 |
| 204 | Pressure-Side | 69.042 | 108.426 | 100 |
| 205 | Pressure-Side | 69.557 | 109.796 | 100 |
| 206 | Pressure-Side | 70.070 | 111.168 | 100 |
| 207 | Pressure-Side | 70.579 | 112.541 | 100 |
| 208 | Pressure-Side | 71.086 | 113.915 | 100 |
| 209 | Pressure-Side | 71.591 | 115.290 | 100 |
| 210 | Pressure-Side | 71.767 | 115.777 | 100 |
| 211 | Pressure-Side | 71.942 | 116.265 | 100 |
| 212 | Pressure-Side | 72.116 | 116.751 | 100 |
| 213 | Pressure-Side | 72.293 | 117.240 | 100 |
| 214 | Pressure-Side | 72.481 | 117.723 | 100 |
| 215 | Pressure-Side | 72.705 | 118.189 | 100 |
| 216 | Pressure-Side | 72.994 | 118.618 | 100 |
| 217 | Pressure-Side | 73.361 | 118.989 | 100 |
| 218 | Pressure-Side | 73.833 | 119.171 | 100 |

With reference to FIG. 4 and with continuing reference to FIG. 3, suction side 132 and/or pressure side 134 of airfoil 130 has trailing edge 138 having a nominal profile that can be expressed substantially in accordance with at least a portion of Cartesian coordinates, i.e., X, Y, Z coordinates, set forth in TABLE II. That is, rather than an entire airfoil profile as stated in TABLE I, a trailing edge 138 profile may be provided in combination with other airfoil embodiments. Trailing edge 138 is generally semi-elliptical.

Again, "profile" is the range of the variation between measured points on an airfoil surface and the ideal position listed in TABLE II. The actual profile on a manufactured turbine nozzle may be different from that defined by TABLE II, and the design is robust to this variation, meaning that mechanical and aerodynamic function are not impaired. A + or −5% profile tolerance is used herein.

The Cartesian coordinate system of X, Y and Z values given in TABLE II below defines the profile of the turbine nozzle trailing edge 138 at various locations along its height. Referring again to FIG. 4, plurality of cross sections 160-170 along span or height H correspond to Z coordinate values of chord lines. A cross section of airfoil 130 at trailing edge 138 at each cross section 160-170 can be described by a respective set of X and Y coordinates (from TABLE II). For example, 10 points can be listed for each cross section 160-170 on each of the pressure side and the suction side, though it should be apparent that more or fewer points can be used for each cross section 160-170, and more or fewer cross sections can be used, as may be desired and/or appropriate.

The coordinate values are stated as non-dimensional values of from 0% to 100% (percentages in TABLE II) convertible to distances by multiplying the values by a height H of airfoil 130 expressed in units of distance. While the X, Y, and Z coordinate values in TABLE II have been expressed in normalized or non-dimensionalized form, it should be apparent that any or all of the coordinate values could instead be expressed in distance units so long as the proportions are maintained.

To convert an X, Y or Z value of TABLE II to a respective X, Y or Z coordinate value in units of distance, such as inches or meters, the non-dimensional X, Y or Z value given in TABLE II can be multiplied by a height H of airfoil 130 in such units of distance. Hence, the trailing edge profile can be applied to airfoils of different heights H. By connecting the X and Y values with smooth continuing arcs, each profile cross section at each height Z (i.e., cross sections 160-170) can be fixed. The trailing edge profiles of the various surface locations between the heights Z (in TABLE II) can be determined by smoothly connecting adjacent profile sections to one another, thus forming the trailing edge profile with a desired elliptical shape. Further, it is noted that where a trailing edge profile section uses Z coordinate values not expressly stated in TABLE II, appropriate coordinate values can be mathematically extrapolated from TABLE II.

The values in TABLE II are generated and shown to three decimal places for determining the nominal profile of trailing edge 138 along at least one of a suction side or a pressure side of airfoil 130 at ambient, non-operating, or non-hot conditions and do not take any coatings or fillets 140, 142 (FIG. 3) into account, though embodiments could account for other conditions, coatings, and/or fillets. The Cartesian coordinate values have an origin at an innermost point 172 (FIGS. 4 and 5) of leading edge 136 of airfoil 130 at the junction of airfoil 130 with a top surface of endwall 122. As shown in FIG. 5, it is understood that innermost point 172 may be covered by fillet 140 and that innermost point 172 is one of the points of cross section 160. Further, as shown in FIG. 4, cross sections 160 or 170 may be covered by fillet 140, 142, respectively.

While the Cartesian values in TABLE II provide Z coordinate values at 10% increments between 0% and 100%, only a portion of Cartesian coordinate values set forth in TABLE II may be employed. In one example, the trailing edge profile sections may use a portion of Z coordinate values defined within 10% and 90% of the height of the airfoil, i.e., from cross sections 161 to 169. In another example, the trailing edge profile sections may use a portion of the Cartesian coordinate values defined within 5% and 95% of the height of the airfoil, i.e., from a plane midway between cross sections 160 and 161 to a plane midway between cross sections 169 and 170. Any portion of Cartesian coordinate values of X, Y and Z set forth in TABLE II may be employed, e.g., from 20% to 30%, 37%-50%, etc.

FIG. 6 shows a perspective view of a nozzle 112 that employs only a selected portion of Cartesian coordinate values of X, Y and Z set forth in TABLE II. For example, a nozzle 112 may be made using coordinate values that represent a selection section of trailing edge 138 of airfoil 130 from 40% of the height to 55% of the height, as shown by shading in FIG. 6. As shown in FIG. 6, a nozzle 112 that has, for example, a selected section of trailing edge 138 of airfoil 130 may have an imaginary origin 172' that dictates where a selected portion, e.g., 40%-55%, of the Cartesian coordinate values of X, Y and Z set forth in TABLE II are employed.

TABLE II

| Non-dimensionalized (%) | | | | |
|---|---|---|---|---|
| N | Location | X | Y | Z |
| 100 | Suction-Side | 72.959 | 95.851 | 0 |
| 101 | Suction-Side | 73.054 | 96.362 | 0 |
| 102 | Suction-Side | 73.149 | 96.871 | 0 |
| 103 | Suction-Side | 73.242 | 97.380 | 0 |
| 104 | Suction-Side | 73.336 | 97.889 | 0 |
| 105 | Suction-Side | 73.425 | 98.399 | 0 |
| 106 | Suction-Side | 73.465 | 98.917 | 0 |
| 107 | Suction-Side | 73.423 | 99.429 | 0 |
| 108 | Suction-Side | 73.276 | 99.926 | 0 |
| 109 | Suction-Side | 72.938 | 100.315 | 0 |
| 209 | Pressure-Side | 70.669 | 96.853 | 0 |
| 210 | Pressure-Side | 70.844 | 97.307 | 0 |
| 211 | Pressure-Side | 71.018 | 97.763 | 0 |
| 212 | Pressure-Side | 71.190 | 98.220 | 0 |
| 213 | Pressure-Side | 71.364 | 98.675 | 0 |
| 214 | Pressure-Side | 71.552 | 99.125 | 0 |
| 215 | Pressure-Side | 71.788 | 99.550 | 0 |
| 216 | Pressure-Side | 72.092 | 99.932 | 0 |
| 217 | Pressure-Side | 72.471 | 100.234 | 0 |
| 218 | Pressure-Side | 72.938 | 100.315 | 0 |
| 100 | Suction-Side | 71.954 | 97.184 | 10 |
| 101 | Suction-Side | 72.045 | 97.703 | 10 |
| 102 | Suction-Side | 72.134 | 98.221 | 10 |
| 103 | Suction-Side | 72.221 | 98.739 | 10 |
| 104 | Suction-Side | 72.310 | 99.258 | 10 |
| 105 | Suction-Side | 72.395 | 99.777 | 10 |
| 106 | Suction-Side | 72.435 | 100.303 | 10 |
| 107 | Suction-Side | 72.393 | 100.831 | 10 |
| 108 | Suction-Side | 72.247 | 101.341 | 10 |
| 109 | Suction-Side | 71.907 | 101.742 | 10 |
| 209 | Pressure-Side | 69.677 | 98.288 | 10 |
| 210 | Pressure-Side | 69.847 | 98.742 | 10 |
| 211 | Pressure-Side | 70.018 | 99.194 | 10 |
| 212 | Pressure-Side | 70.184 | 99.650 | 10 |
| 213 | Pressure-Side | 70.350 | 100.105 | 10 |
| 214 | Pressure-Side | 70.537 | 100.552 | 10 |
| 215 | Pressure-Side | 70.772 | 100.975 | 10 |
| 216 | Pressure-Side | 71.071 | 101.356 | 10 |
| 217 | Pressure-Side | 71.444 | 101.662 | 10 |
| 218 | Pressure-Side | 71.907 | 101.742 | 10 |
| 100 | Suction-Side | 71.373 | 99.053 | 20 |
| 101 | Suction-Side | 71.453 | 99.547 | 20 |
| 102 | Suction-Side | 71.534 | 100.040 | 20 |
| 103 | Suction-Side | 71.616 | 100.534 | 20 |
| 104 | Suction-Side | 71.693 | 101.028 | 20 |
| 105 | Suction-Side | 71.754 | 101.524 | 20 |
| 106 | Suction-Side | 71.772 | 102.022 | 20 |
| 107 | Suction-Side | 71.708 | 102.519 | 20 |
| 108 | Suction-Side | 71.551 | 102.994 | 20 |
| 109 | Suction-Side | 71.208 | 103.343 | 20 |
| 209 | Pressure-Side | 68.993 | 99.731 | 20 |
| 210 | Pressure-Side | 69.163 | 100.197 | 20 |
| 211 | Pressure-Side | 69.331 | 100.662 | 20 |
| 212 | Pressure-Side | 69.499 | 101.128 | 20 |
| 213 | Pressure-Side | 69.669 | 101.592 | 20 |
| 214 | Pressure-Side | 69.856 | 102.051 | 20 |
| 215 | Pressure-Side | 70.079 | 102.491 | 20 |
| 216 | Pressure-Side | 70.374 | 102.889 | 20 |
| 217 | Pressure-Side | 70.742 | 103.220 | 20 |
| 218 | Pressure-Side | 71.208 | 103.343 | 20 |
| 100 | Suction-Side | 71.156 | 101.010 | 30 |
| 101 | Suction-Side | 71.227 | 101.479 | 30 |
| 102 | Suction-Side | 71.297 | 101.948 | 30 |
| 103 | Suction-Side | 71.367 | 102.417 | 30 |
| 104 | Suction-Side | 71.436 | 102.887 | 30 |
| 105 | Suction-Side | 71.488 | 103.358 | 30 |
| 106 | Suction-Side | 71.485 | 103.835 | 30 |
| 107 | Suction-Side | 71.414 | 104.319 | 30 |
| 108 | Suction-Side | 71.241 | 104.788 | 30 |
| 109 | Suction-Side | 70.873 | 105.101 | 30 |
| 209 | Pressure-Side | 68.595 | 101.091 | 30 |
| 210 | Pressure-Side | 68.778 | 101.592 | 30 |
| 211 | Pressure-Side | 68.959 | 102.092 | 30 |
| 212 | Pressure-Side | 69.137 | 102.594 | 30 |
| 213 | Pressure-Side | 69.316 | 103.095 | 30 |
| 214 | Pressure-Side | 69.505 | 103.594 | 30 |
| 215 | Pressure-Side | 69.724 | 104.077 | 30 |
| 216 | Pressure-Side | 70.016 | 104.522 | 30 |
| 217 | Pressure-Side | 70.387 | 104.907 | 30 |
| 218 | Pressure-Side | 70.873 | 105.101 | 30 |
| 100 | Suction-Side | 71.168 | 102.853 | 40 |
| 101 | Suction-Side | 71.235 | 103.324 | 40 |
| 102 | Suction-Side | 71.300 | 103.792 | 40 |
| 103 | Suction-Side | 71.365 | 104.263 | 40 |
| 104 | Suction-Side | 71.430 | 104.733 | 40 |
| 105 | Suction-Side | 71.476 | 105.205 | 40 |
| 106 | Suction-Side | 71.466 | 105.683 | 40 |
| 107 | Suction-Side | 71.387 | 106.166 | 40 |
| 108 | Suction-Side | 71.206 | 106.631 | 40 |
| 109 | Suction-Side | 70.825 | 106.920 | 40 |
| 209 | Pressure-Side | 68.513 | 102.672 | 40 |
| 210 | Pressure-Side | 68.702 | 103.196 | 40 |
| 211 | Pressure-Side | 68.890 | 103.718 | 40 |
| 212 | Pressure-Side | 69.076 | 104.242 | 40 |
| 213 | Pressure-Side | 69.261 | 104.764 | 40 |
| 214 | Pressure-Side | 69.451 | 105.287 | 40 |
| 215 | Pressure-Side | 69.671 | 105.797 | 40 |
| 216 | Pressure-Side | 69.959 | 106.270 | 40 |
| 217 | Pressure-Side | 70.333 | 106.684 | 40 |
| 218 | Pressure-Side | 70.825 | 106.920 | 40 |
| 100 | Suction-Side | 71.295 | 104.622 | 50 |
| 101 | Suction-Side | 71.359 | 105.091 | 50 |
| 102 | Suction-Side | 71.422 | 105.560 | 50 |

TABLE II-continued

| | | Non-dimensionalized (%) | | |
|---|---|---|---|---|
| N | Location | X | Y | Z |
| 103 | Suction-Side | 71.484 | 106.028 | 50 |
| 104 | Suction-Side | 71.546 | 106.497 | 50 |
| 105 | Suction-Side | 71.589 | 106.968 | 50 |
| 106 | Suction-Side | 71.579 | 107.444 | 50 |
| 107 | Suction-Side | 71.503 | 107.926 | 50 |
| 108 | Suction-Side | 71.331 | 108.392 | 50 |
| 109 | Suction-Side | 70.966 | 108.708 | 50 |
| 209 | Pressure-Side | 68.718 | 104.666 | 50 |
| 210 | Pressure-Side | 68.896 | 105.169 | 50 |
| 211 | Pressure-Side | 69.074 | 105.671 | 50 |
| 212 | Pressure-Side | 69.251 | 106.174 | 50 |
| 213 | Pressure-Side | 69.427 | 106.677 | 50 |
| 214 | Pressure-Side | 69.613 | 107.178 | 50 |
| 215 | Pressure-Side | 69.831 | 107.664 | 50 |
| 216 | Pressure-Side | 70.119 | 108.112 | 50 |
| 217 | Pressure-Side | 70.485 | 108.502 | 50 |
| 218 | Pressure-Side | 70.966 | 108.708 | 50 |
| 100 | Suction-Side | 71.432 | 105.953 | 60 |
| 101 | Suction-Side | 71.499 | 106.462 | 60 |
| 102 | Suction-Side | 71.565 | 106.971 | 60 |
| 103 | Suction-Side | 71.631 | 107.480 | 60 |
| 104 | Suction-Side | 71.696 | 107.988 | 60 |
| 105 | Suction-Side | 71.757 | 108.497 | 60 |
| 106 | Suction-Side | 71.770 | 109.011 | 60 |
| 107 | Suction-Side | 71.711 | 109.527 | 60 |
| 108 | Suction-Side | 71.555 | 110.038 | 60 |
| 109 | Suction-Side | 71.209 | 110.435 | 60 |
| 209 | Pressure-Side | 69.080 | 106.891 | 60 |
| 210 | Pressure-Side | 69.239 | 107.346 | 60 |
| 211 | Pressure-Side | 69.398 | 107.803 | 60 |
| 212 | Pressure-Side | 69.557 | 108.259 | 60 |
| 213 | Pressure-Side | 69.720 | 108.713 | 60 |
| 214 | Pressure-Side | 69.899 | 109.161 | 60 |
| 215 | Pressure-Side | 70.119 | 109.589 | 60 |
| 216 | Pressure-Side | 70.405 | 109.980 | 60 |
| 217 | Pressure-Side | 70.757 | 110.308 | 60 |
| 218 | Pressure-Side | 71.209 | 110.435 | 60 |
| 100 | Suction-Side | 71.709 | 107.490 | 70 |
| 101 | Suction-Side | 71.782 | 108.032 | 70 |
| 102 | Suction-Side | 71.855 | 108.572 | 70 |
| 103 | Suction-Side | 71.928 | 109.113 | 70 |
| 104 | Suction-Side | 71.997 | 109.653 | 70 |
| 105 | Suction-Side | 72.058 | 110.196 | 70 |
| 106 | Suction-Side | 72.088 | 110.741 | 70 |
| 107 | Suction-Side | 72.040 | 111.284 | 70 |
| 108 | Suction-Side | 71.890 | 111.811 | 70 |
| 109 | Suction-Side | 71.558 | 112.232 | 70 |
| 209 | Pressure-Side | 69.416 | 108.754 | 70 |
| 210 | Pressure-Side | 69.573 | 109.207 | 70 |
| 211 | Pressure-Side | 69.730 | 109.659 | 70 |
| 212 | Pressure-Side | 69.889 | 110.112 | 70 |
| 213 | Pressure-Side | 70.052 | 110.563 | 70 |
| 214 | Pressure-Side | 70.230 | 111.008 | 70 |
| 215 | Pressure-Side | 70.454 | 111.432 | 70 |
| 216 | Pressure-Side | 70.745 | 111.817 | 70 |
| 217 | Pressure-Side | 71.103 | 112.139 | 70 |
| 218 | Pressure-Side | 71.558 | 112.232 | 70 |
| 100 | Suction-Side | 72.245 | 109.604 | 80 |
| 101 | Suction-Side | 72.318 | 110.137 | 80 |
| 102 | Suction-Side | 72.390 | 110.670 | 80 |
| 103 | Suction-Side | 72.463 | 111.202 | 80 |
| 104 | Suction-Side | 72.534 | 111.735 | 80 |
| 105 | Suction-Side | 72.595 | 112.269 | 80 |
| 106 | Suction-Side | 72.622 | 112.805 | 80 |
| 107 | Suction-Side | 72.570 | 113.340 | 80 |
| 108 | Suction-Side | 72.420 | 113.858 | 80 |
| 109 | Suction-Side | 72.085 | 114.265 | 80 |
| 209 | Pressure-Side | 69.951 | 110.772 | 80 |
| 210 | Pressure-Side | 70.108 | 111.225 | 80 |
| 211 | Pressure-Side | 70.264 | 111.677 | 80 |
| 212 | Pressure-Side | 70.419 | 112.131 | 80 |
| 213 | Pressure-Side | 70.580 | 112.582 | 80 |
| 214 | Pressure-Side | 70.763 | 113.024 | 80 |
| 215 | Pressure-Side | 70.988 | 113.449 | 80 |
| 216 | Pressure-Side | 71.273 | 113.833 | 80 |
| 217 | Pressure-Side | 71.629 | 114.158 | 80 |
| 218 | Pressure-Side | 72.085 | 114.265 | 80 |
| 100 | Suction-Side | 73.088 | 112.382 | 90 |
| 101 | Suction-Side | 73.158 | 112.869 | 90 |
| 102 | Suction-Side | 73.226 | 113.354 | 90 |
| 103 | Suction-Side | 73.293 | 113.840 | 90 |
| 104 | Suction-Side | 73.356 | 114.329 | 90 |
| 105 | Suction-Side | 73.405 | 114.817 | 90 |
| 106 | Suction-Side | 73.410 | 115.306 | 90 |
| 107 | Suction-Side | 73.336 | 115.793 | 90 |
| 108 | Suction-Side | 73.178 | 116.256 | 90 |
| 109 | Suction-Side | 72.840 | 116.597 | 90 |
| 209 | Pressure-Side | 70.657 | 112.880 | 90 |
| 210 | Pressure-Side | 70.825 | 113.351 | 90 |
| 211 | Pressure-Side | 70.993 | 113.823 | 90 |
| 212 | Pressure-Side | 71.159 | 114.294 | 90 |
| 213 | Pressure-Side | 71.328 | 114.766 | 90 |
| 214 | Pressure-Side | 71.509 | 115.232 | 90 |
| 215 | Pressure-Side | 71.732 | 115.679 | 90 |
| 216 | Pressure-Side | 72.021 | 116.088 | 90 |
| 217 | Pressure-Side | 72.377 | 116.440 | 90 |
| 218 | Pressure-Side | 72.840 | 116.597 | 90 |
| 100 | Suction-Side | 74.086 | 115.048 | 100 |
| 101 | Suction-Side | 74.159 | 115.524 | 100 |
| 102 | Suction-Side | 74.232 | 116.002 | 100 |
| 103 | Suction-Side | 74.302 | 116.480 | 100 |
| 104 | Suction-Side | 74.365 | 116.958 | 100 |
| 105 | Suction-Side | 74.411 | 117.438 | 100 |
| 106 | Suction-Side | 74.411 | 117.921 | 100 |
| 107 | Suction-Side | 74.336 | 118.398 | 100 |
| 108 | Suction-Side | 74.175 | 118.852 | 100 |
| 109 | Suction-Side | 73.833 | 119.171 | 100 |
| 209 | Pressure-Side | 71.591 | 115.290 | 100 |
| 210 | Pressure-Side | 71.767 | 115.777 | 100 |
| 211 | Pressure-Side | 71.942 | 116.265 | 100 |
| 212 | Pressure-Side | 72.116 | 116.751 | 100 |
| 213 | Pressure-Side | 72.293 | 117.240 | 100 |
| 214 | Pressure-Side | 72.481 | 117.723 | 100 |
| 215 | Pressure-Side | 72.705 | 118.189 | 100 |
| 216 | Pressure-Side | 72.994 | 118.618 | 100 |
| 217 | Pressure-Side | 73.361 | 118.989 | 100 |
| 218 | Pressure-Side | 73.833 | 119.171 | 100 |

The disclosed airfoil shape or trailing edge shape provides a unique profile to achieve: 1) interaction between other stages in turbine 108 (FIG. 1); 2) aerodynamic efficiency; and 3) normalized aerodynamic and mechanical nozzle or airfoil loadings. The disclosed loci of points defined in TABLE I or TABLE II allow GT system 100 or any other suitable turbine system to run in an efficient, safe and smooth manner. As also noted, any scale of the disclosed airfoil 130 may be adopted as long as: 1) interaction between other stages in the pressure turbine 108 (FIG. 1); 2) aerodynamic efficiency; and 3) normalized aerodynamic and mechanical nozzle or airfoil loadings, are maintained in the scaled turbine.

Airfoil 130 or trailing edge described herein thus improves overall GT system 100 efficiency. Specifically, airfoil 130 provides a desired turbine efficiency lapse rate (ISO, hot, cold, part load, etc.). Airfoil 130 also meets all aeromechanical and stress requirements. Turbine nozzle 112 described herein has very specific aerodynamic design requirements. Significant cross-functional design effort was required to meet these design goals. Airfoil 130 of turbine nozzle 112 thus possesses a specific shape to meet aerodynamic, mechanical, and heat transfer requirements in an efficient and cost effective manner.

The apparatus and devices of the present disclosure are not limited to any one particular turbomachine, engine, turbine, jet engine, power generation system or other system, and may be used with other turbomachines such as aircraft systems, power generation systems and/or systems (e.g., combined cycle, simple cycle, nuclear reactor, etc.). Additionally, the apparatus of the present disclosure may be used with other systems not described herein that may benefit from the increased efficiency of the apparatus and devices described herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

We claim:

1. A turbine nozzle comprising:
an airfoil having: a suction side, a pressure side opposing the suction side, a leading edge spanning between the pressure side and the suction side, and a trailing edge opposing the leading edge and spanning between the pressure side and the suction side; and
at least one endwall connected with the airfoil along the suction side, the pressure side, the trailing edge and the leading edge,
wherein at least one of a suction side or a pressure side of the airfoil has a shape having a nominal profile in accordance with at least a portion of Cartesian coordinate values of X, Y and Z set forth in Table I, wherein the Cartesian coordinate values are non-dimensional values of from 0% to 100% convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the nominal profile,
wherein the shape having the nominal profile in accordance with the at least a portion of Cartesian coordinate values of X, Y and Z set forth in TABLE I includes the airfoil profile sections defined within 10% and 90% of the height of the airfoil.

2. The turbine nozzle of claim 1, further comprising a fillet connecting a surface of the at least one endwall to a surface of the airfoil.

3. The turbine nozzle of claim 1, wherein the at least one endwall includes an inner endwall or an outer endwall.

4. The turbine nozzle of claim 1, wherein the turbine nozzle includes a first stage nozzle.

5. The turbine nozzle of claim 1, wherein the shape having the nominal profile in accordance with the at least a portion of Cartesian coordinate values of X, Y and Z set forth in TABLE I includes the airfoil profile sections defined within 5% and 95% of the height of the airfoil.

6. A static nozzle section for a turbine, the static nozzle section comprising:
a set of static nozzles, the set of static nozzles including at least one nozzle having:
an airfoil having: a suction side, a pressure side opposing the suction side, a leading edge spanning between the pressure side and the suction side, and a trailing edge opposing the leading edge and spanning between the pressure side and the suction side; and
at least one endwall connected with the airfoil along the suction side, the pressure side, the trailing edge and the leading edge,
wherein at least one of a suction side or a pressure side of the airfoil has a shape having a nominal profile in accordance with at least a portion of Cartesian coordinate values of X, Y and Z set forth in TABLE I, wherein the Cartesian coordinate values are non-dimensional values of from 0% to 100% convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the nominal profile,
wherein the shape having the nominal profile in accordance with the at least a portion of Cartesian coordinate values of X, Y and Z set forth in TABLE I includes the airfoil profile sections defined within 10% and 90% of the height of the airfoil.

7. The static nozzle section of claim 6, further comprising a fillet connecting a surface of the at least one endwall to a surface of the airfoil.

8. The static nozzle section of claim 6, wherein the at least one endwall includes an inner endwall or an outer endwall.

9. The static nozzle section of claim 6, wherein the static nozzle section is a first stage nozzle section.

10. The static nozzle section of claim 6, wherein the shape having the nominal profile in accordance with at least a portion of Cartesian coordinate values of X, Y and Z set forth in Table I includes the airfoil profile sections defined within 5% and 95% of the height of the airfoil.

11. A turbine nozzle comprising:
an airfoil having: a suction side, a pressure side opposing the suction side, a leading edge spanning between the pressure side and the suction side, and a trailing edge opposing the leading edge and spanning between the pressure side and the suction side; and
at least one endwall connected with the airfoil along the suction side, the pressure side, the trailing edge and the leading edge, wherein at least one of a suction side or a pressure side of the airfoil has a trailing edge shape having a nominal profile in accordance with at least a portion of Cartesian coordinate values of X, Y and Z set forth in TABLE II, wherein the Cartesian coordinate values are non-dimensional values of from 0% to 100% convertible to distances by multiplying the values by a height of the airfoil expressed in units of distance, and wherein X and Y values connected by smooth continuing arcs define trailing edge profile sections at each distance Z along at least a portion of the airfoil, the trailing edge profile sections at the Z distances being joined smoothly with one another to form the nominal profile of the trailing edge shape, wherein the shape having the nominal profile in accordance with the at least a portion of Cartesian coordinate values of X, Y and Z set forth in TABLE I includes the airfoil profile sections defined within 10% and 90% of the height of the airfoil.

12. The turbine nozzle of claim 11, further comprising a fillet connecting a surface of the at least one endwall to a surface of the airfoil.

13. The turbine nozzle of claim 11, wherein the at least one endwall includes an inner endwall or an outer endwall.

14. The turbine nozzle of claim 11, wherein the turbine nozzle includes a first stage nozzle.

15. The turbine nozzle of claim 11, wherein the trailing edge shape having the nominal profile in accordance with the at least a portion of Cartesian coordinate values of X, Y and Z set forth in TABLE II includes the trailing edge profile sections defined within 5% and 95% of the height of the airfoil.

* * * * *